(12) United States Patent
Tomioka et al.

(10) Patent No.: US 12,498,542 B2
(45) Date of Patent: Dec. 16, 2025

(54) IMAGING LENS AND IMAGING APPARATUS

(71) Applicant: FUJIFILM Corporation, Tokyo (JP)

(72) Inventors: Ukyo Tomioka, Saitama (JP); Toshihiro Aoi, Saitama (JP)

(73) Assignee: FUJIFILM Corporation, Tokyo (JP)

(*) Notice: Subject to any disclaimer, the term of this patent is extended or adjusted under 35 U.S.C. 154(b) by 296 days.

(21) Appl. No.: 18/492,722

(22) Filed: Oct. 23, 2023

(65) Prior Publication Data

US 2024/0176102 A1 May 30, 2024

(30) Foreign Application Priority Data

Oct. 26, 2022 (JP) .................. 2022-171806

(51) Int. Cl.
| | |
|---|---|
| *G02B 13/00* | (2006.01) |
| *G02B 9/08* | (2006.01) |
| *G02B 9/64* | (2006.01) |
| *G02B 27/00* | (2006.01) |

(52) U.S. Cl.
CPC ........... *G02B 9/08* (2013.01); *G02B 27/0025* (2013.01)

(58) Field of Classification Search
CPC ........ G02B 9/08; G02B 9/64; G02B 13/0045; G02B 13/04; G02B 13/06; G02B 27/0025
See application file for complete search history.

(56) References Cited

FOREIGN PATENT DOCUMENTS

| | | |
|---|---|---|
| JP | 2014-052503 A | 3/2014 |
| JP | 2016-184136 A | 10/2016 |

*Primary Examiner* — Jack Dinh
(74) *Attorney, Agent, or Firm* — Studebaker Brackett PLLC

(57) ABSTRACT

An imaging lens consisting of, in order from an object side to an image side: a front group; a stop; and a rear group that has a refractive power, wherein: the front group and the rear group are combined and include at least five negative lenses and at least three positive lenses, a lens closest to the object side in the front group is a first lens as a negative meniscus lens which has a convex surface facing toward the object side, a lens, which is second from the object side in the front group, is a second lens as a negative lens which has a concave surface facing toward the image side, and the front group includes at least three negative lenses, which include the first lens and the second lens, and at least one positive lens. The imaging lens satisfies predetermined conditional expressions.

20 Claims, 48 Drawing Sheets

IMAGING LENS AND IMAGING APPARATUS

CROSS-REFERENCE TO RELATED APPLICATIONS

This application claims priority from Japanese Application No. 2022-171806, filed on Oct. 26, 2022, the entire disclosure of which is incorporated herein by reference.

BACKGROUND

Technical Field

The technique of the present disclosure relates to an imaging lens and an imaging apparatus.

Related Art

As an imaging lens applicable to an imaging apparatus such as a digital camera, for example, lens systems described in JP2016-184136A and JP2014-052503A are known.

In recent years, there has been a demand for an imaging lens having a small size and favorable optical performance.

SUMMARY

The present disclosure provides an imaging lens, which has a small size and maintaining favorable optical performance, and an imaging apparatus comprising the imaging lens.

According to a first aspect of the present disclosure, there is provided an imaging lens consisting of, in order from an object side to an image side: a front group; a stop; and a rear group that has a refractive power. The front group and the rear group are combined and include at least five negative lenses and at least three positive lenses, a lens closest to the object side in the front group is a first lens as a negative meniscus lens which has a convex surface facing toward the object side, a lens, which is second from the object side in the front group, is a second lens as a negative lens which has a concave surface facing toward the image side, and the front group includes at least three negative lenses, which include the first lens and the second lens, and at least one positive lens. Assuming that a maximum half angle of view in a state where an infinite distance object is in focus is ωm, a back focal length of a whole system at an air-equivalent distance in a state where the infinite distance object is in focus is Bf, a focal length of the whole system in a state where the infinite distance object is in focus is f, a sum of a distance on an optical axis from a lens surface closest to the object side to a lens surface closest to the image side and the back focal length at the air-equivalent distance in a state where the infinite distance object is in focus is TL, and a unit of ωm is degree, Conditional Expressions (1), (2), (3), and (4) are satisfied, which are represented by $$65 < \omega m < 130 \quad (1),$$

$$0.25 < Bf/(2 \times f \times \sin(\omega m/2)) < 2 \quad (2),$$

$$4 < TL/f < 8.5 \quad (3), \text{ and}$$

$$0.05 < Bf/TL < 0.35 \quad (4).$$

According to a second aspect of the present disclosure, in the first aspect, assuming that a focal length of the front group in a state where the infinite distance object is in focus is ff, it is preferable that Conditional Expression (5) is satisfied, which is represented by $$-0.4 < f/ff < 0.4 \quad (5).$$

According to a third aspect of the present disclosure, in the first aspect, assuming that a focal length of the rear group in a state where the infinite distance object is in focus is fr, it is preferable that Conditional Expression (6) is satisfied, which is represented by $$0.1 < f/fr < 1.3 \quad (6).$$

According to a fourth aspect of the present disclosure, in the first aspect, assuming that a distance on the optical axis from the lens surface closest to the object side to the stop in a state where the infinite distance object is in focus is Ts, it is preferable that Conditional Expression (7) is satisfied, which is represented by $$0.1 < Ts/TL < 0.9 \quad (7).$$

According to a fifth aspect of the present disclosure, in the first aspect, assuming that a focal length of the first lens is fL1, it is preferable that Conditional Expression (8) is satisfied, which is represented by $$-0.6 < f/fL1 < -0.1 \quad (8).$$

According to a sixth aspect of the present disclosure, in the first aspect, assuming that a focal length of the second lens is fL2, it is preferable that Conditional Expression (9) is satisfied, which is represented by $$-1 < f/fL2 < -0.1 \quad (9).$$

According to a seventh aspect of the present disclosure, in the first aspect, assuming that
 a paraxial curvature radius of an object side surface of the first lens is RL1f, and
 a paraxial curvature radius of an image side surface of the first lens is RL1r,
 it is preferable that Conditional Expression (10) is satisfied, which is represented by $$1 < (RL1f + RL1r)/(RL1f - RL1r) < 3.5 \quad (10).$$

According to an eighth aspect of the present disclosure, in the first aspect, it is preferable that the second lens is a negative meniscus lens which has a convex surface facing toward the object side.

According to a ninth aspect of the present disclosure, in the eighth aspect, assuming that
 a paraxial curvature radius of an object side surface of the second lens is RL2f, and
 a paraxial curvature radius of an image side surface of the second lens is RL2r,
 it is preferable that Conditional Expression (11) is satisfied, which is represented by $$1 < (RL2f + RL2r)/(RL2f - RL2r) < 4.5 \quad (11).$$

According to a tenth aspect of the present disclosure, in the first aspect, assuming that a refractive index of the first lens at a d line is NdL1, it is preferable that Conditional Expression (12) is satisfied, which is represented by $$1.43 < NdL1 < 1.95 \quad (12).$$

According to an eleventh aspect of the present disclosure, in the first aspect, assuming that an open F number of the imaging lens in a state where the infinite distance object is in focus is FNo, it is preferable that Conditional Expression (13) is satisfied, which is represented by $$2.5 < FNo/\sin(\omega m/2) < 6 \quad (13).$$

According to a twelfth aspect of the present disclosure, in the first aspect, assuming that a central thickness of each lens included in the rear group is D, Conditional Expression (14) is represented by $$0.155 < D/TL \qquad (14),\text{ and}$$

it is preferable that the number of lenses, each of which satisfies Conditional Expression (14) and has a positive refractive power, is equal to or less than 1.

According to a thirteenth aspect of the present disclosure, in the twelfth aspect, it is preferable that Conditional Expression (3-1) is satisfied, which is represented by $$4.4 < TL/f < 6.7 \qquad (3\text{-}1).$$

According to a fourteenth aspect of the present disclosure, in the first aspect, it is preferable that a lens closest to the image side in the rear group is a lens which has a convex surface facing toward the image side.

According to a fifteenth aspect of the present disclosure, in the first aspect, assuming that an effective diameter of an object side surface of the first lens is ED, it is preferable that Conditional Expression (15) is satisfied, which is represented by $$1.5 < ED/(2 \times f \times \sin(\omega m/2)) < 5 \qquad (15).$$

According to a sixteenth aspect of the present disclosure, in the first aspect, it is preferable that the front group includes a cemented lens.

According to a seventeenth aspect of the present disclosure, in the first aspect, it is preferable that a lens closest to the image side in the front group is a lens which has a concave surface facing toward the object side.

According to an eighteenth aspect of the present disclosure, in the first aspect, it is preferable that in the rear group, the number of cemented surfaces to which lenses adjacent to each other are cemented is equal to or less than 2.

According to a nineteenth aspect of the present disclosure, in the first aspect, it is preferable that the front group or the rear group includes at least one lens which moves along the optical axis during focusing.

According to a twentieth aspect of the present disclosure, there is provided an imaging apparatus comprising the imaging lens according to any one of the first to nineteenth aspects.

In the present specification, it should be noted that the terms "consisting of" and "consists of" mean that the lens may include not only the above-mentioned constituent elements but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the term "group which has a positive refractive power" means that the group has a positive refractive power as a whole. Similarly, the term "group which has a negative refractive power" means that the group has a negative refractive power as a whole. The terms "front group" and "rear group" are not limited to a configuration consisting of a plurality of lenses, but may consist of only one lens.

The terms "lens which has a positive refractive power" and "a positive lens" are synonymous. The terms "lens which has a negative refractive power" and "a negative lens" are synonymous. The terms "negative meniscus lens" and "negative lens having a meniscus shape" are synonymous. The term "a single lens" means one lens that is not cemented. The number of lenses described above is the number of lenses as constituent elements. For example, it is assumed that the number of lenses in a cemented lens in which a plurality of single lenses having different materials are cemented is represented by the number of single lenses constituting the cemented lens. Here, a compound aspherical lens (that is, a lens in which a spherical lens and an aspherical film formed on the spherical lens are integrally formed and function as one aspherical lens as a whole) is not regarded as cemented lenses, but the compound aspherical lens is regarded as one lens. The sign of the refractive power and the surface shape of the lens including the aspherical surface will be considered in terms of the paraxial region unless otherwise specified.

In the present specification, the term "whole system" means an imaging lens. The "focal length" used in the conditional expressions is a paraxial focal length. Unless otherwise specified, the "distance on the optical axis" used in conditional expression is considered as a geometrical length rather than air-equivalent length. Regarding the sign of the curvature radius, the sign of the curvature radius of the surface having a convex surface facing toward the object side is positive and the sign of the curvature radius of the surface having a convex surface facing toward the image side is negative. The values used in the conditional expressions are values in a case where the d line is used as a reference in a state where the infinite distance object is in focus unless otherwise specified. The "back focal length in terms of the air-equivalent distance" is the air-equivalent distance on the optical axis from the lens surface closest to the image side in the whole system to the image plane in a state where the infinite distance object is in focus.

The "d line", "C line" and "F line" described in the present specification are emission lines. It is assumed that the d line wavelength is 587.56 nm (nanometers), the C line wavelength is 656.27 nm (nanometers), and the F line wavelength is 486.13 nm (nanometers). The partial dispersion ratio θgF between the g line and the F line of a certain lens is defined by θgF=(Ng−NF)/(NF−NC), where Ng, NF, and NC are the refractive indexes of the lens at the g line, the F line, and the C line.

According to the present disclosure, it is possible to provide an imaging lens, which has a small size and maintaining favorable optical performance, and an imaging apparatus comprising the imaging lens.

DETAILED DESCRIPTION

Figure 1:
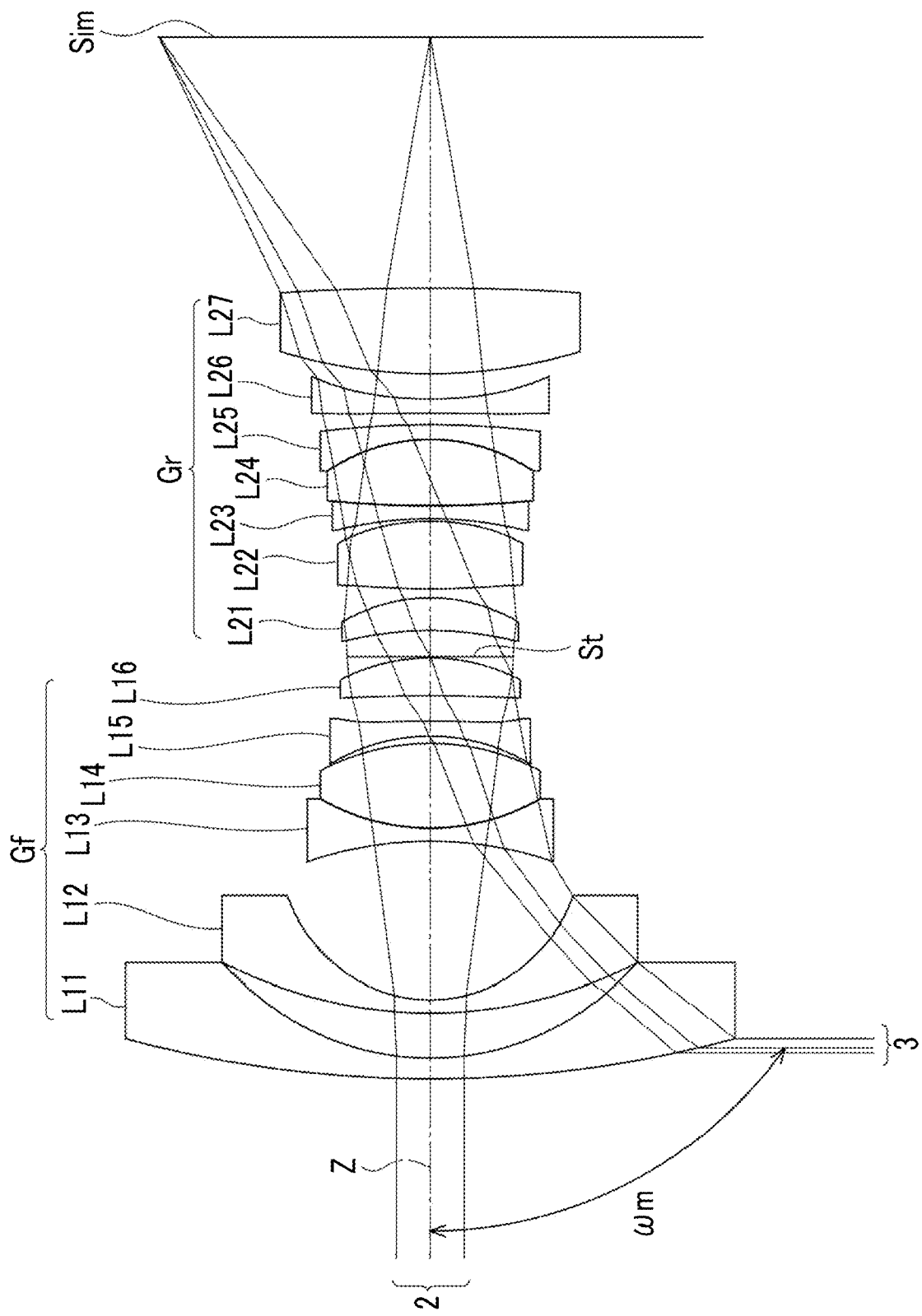
FIG. 1 is a cross-sectional view showing a configuration and a luminous flux of an imaging lens according to an embodiment, which corresponds to the imaging lens of Example 1.
Figure 2:
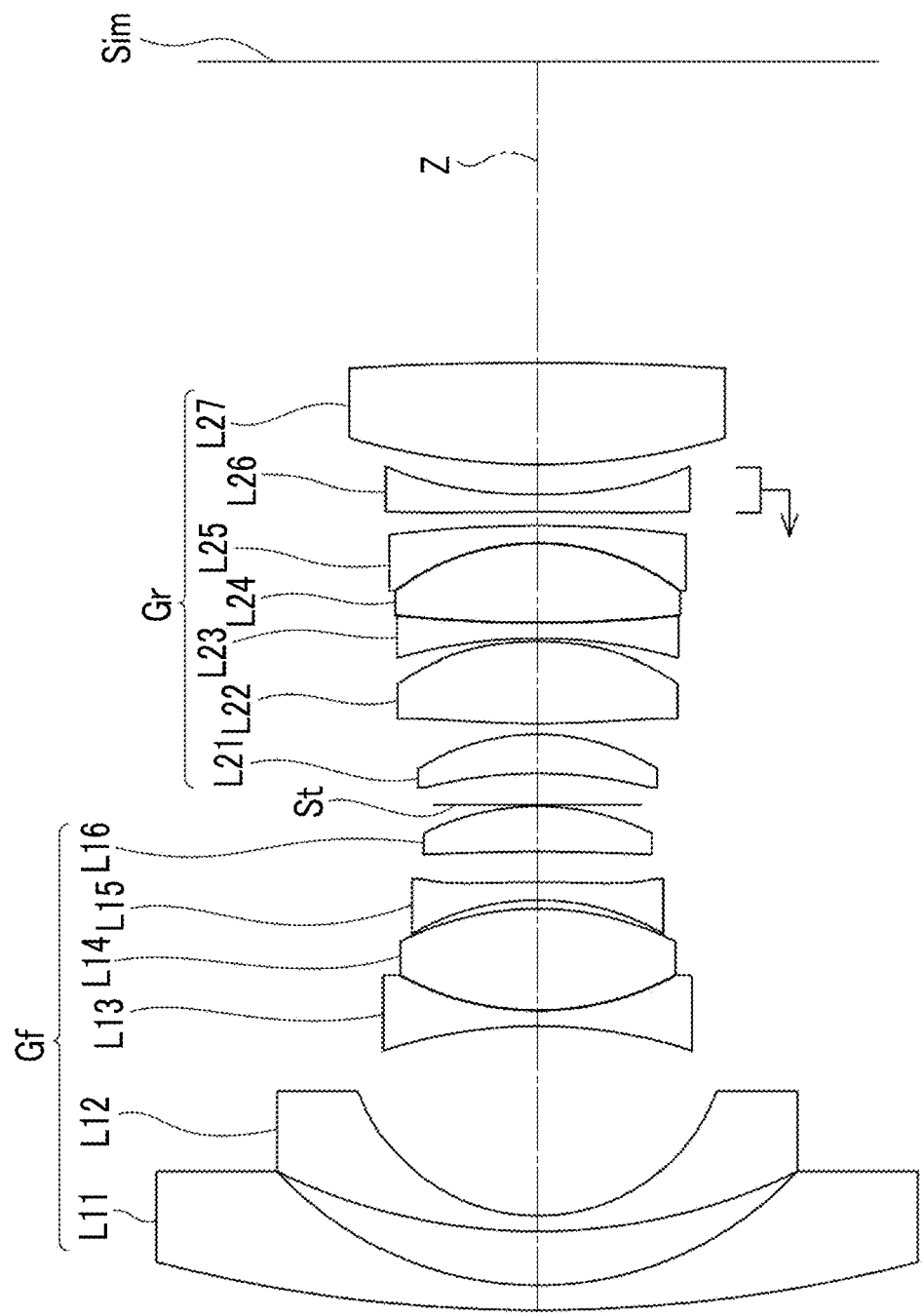
FIG. 2 is a cross-sectional view showing a configuration of an imaging lens of Example 1.

Hereinafter, embodiments of the present disclosure will be described with reference to the accompanying drawings. FIG. 1 is a cross-sectional view showing a configuration and a luminous flux of an imaging lens according to an embodiment of the present disclosure. FIG. 1 shows, as the luminous flux, an on-axis luminous flux 2 and a luminous flux 3 with a maximum half angle of view ωm. FIG. 2 is a cross-sectional view showing the configuration of the imaging lens of FIG. 1. FIGS. 1 and 2 show states where the infinite distance object is in focus, the left side thereof is an object side, and the right side thereof is an image side. In the present specification, an object at an infinity distance on the optical axis Z from the object to the lens surface closest to the object side is referred to as an "infinite distance object". The example shown in FIG. 1 corresponds to an imaging lens according to Example 1 to be described later.

The imaging lens according to the present embodiment consists of, in order from the object side to the image side, a front group Gf, an aperture stop St, and a rear group Gr which has a refractive power. Further, in the imaging lens according to the present embodiment, the front group Gf and the rear group Gr are combined, and include at least five negative lenses and at least three positive lenses. In such a case, the configuration is advantageous for suppressing various aberrations.

For example, the lens groups of the imaging lenses of FIGS. 1 and 2 are configured as follows. The front group Gf consists of six lenses L11 to L16 in order from the object side to the image side. The rear group Gr consists of seven lenses L21 to L27 in order from the object side to the image side. The aperture stop St in FIGS. 1 and 2 does not indicate a shape and a size thereof, but indicates a position thereof in the optical axis direction.

A lens closest to the object side in the front group Gf is a first lens as a negative meniscus lens which has a convex surface facing toward the object side. A lens, which is second from the object side in the front group Gf, is a second lens as a negative lens which has a concave surface facing toward the image side. In such a case, the configuration is advantageous for achieving an increase in angle of view. More specifically, it is preferable that the second lens is a negative meniscus lens which has a convex surface facing toward the object side. In such a case, the configuration is more advantageous for achieving a further increase in angle of view. For example, in the imaging lenses of FIGS. 1 and 2, the lens L11 corresponds to the first lens, and the lens L12 corresponds to the second lens.

The front group Gf includes at least three negative lenses, which include the first lens and the second lens, and at least one positive lens. In such a case, the configuration is advantageous for suppressing various aberrations while ensuring a wide angle of view.

It is preferable that the front group Gf includes a cemented lens. In such a case, the configuration is advantageous for suppressing chromatic aberration.

It is preferable that a lens closest to the image side in the front group Gf is a lens which has a concave surface facing toward the object side. In such a case, the configuration is advantageous for suppressing astigmatism.

It is preferable that a lens closest to the image side in the rear group Gr is a lens which has a convex surface facing toward the image side. In such a case, the back focal length is prevented from becoming excessively long. Therefore, the configuration is advantageous for achieving reduction in total length of the optical system.

In the rear group Gr, it is preferable that the number of cemented surfaces to which lenses adjacent to each other are cemented is equal to or less than 2. In such a case, the configuration is advantageous for suppressing various aberrations other than the chromatic aberration.

It is preferable that the front group Gf or the rear group Gr includes at least one lens which moves along the optical axis Z during focusing. Focusing is performed by movement of at least one lens included in the front group Gf or the rear group Gr. By providing such a focusing function, it is possible to provide a high additional value as the imaging lens. Examples 1 to 9 and 19 to 22 to be described later correspond to the configuration. For example, in the imaging lenses of FIGS. 1 and 2, during focusing from the infinite distance object to the closest object, the lens L26 included in the rear group Gr moves toward the object side along the optical axis Z, and the lens remains stationary with respect to an image plane Sim. In FIG. 2, the parentheses and the arrow pointing to the left below the lens L26 indicate that the lens L26 moves toward the object side during focusing from the infinite distance object to the closest object.

Hereinafter, preferable configurations of the imaging lens of the present disclosure relating to conditional expressions will be described. In the following description of conditional expressions, in order to avoid redundancy, the same symbol is used for the same definition, and the duplicate description of the symbol is omitted. In the following description, the "imaging lens according to the embodiment of the present disclosure" is also simply referred to as an "imaging lens" in order to avoid redundancy.

Assuming that a maximum half angle of view in a state where the infinite distance object is in focus is ωm and the unit of ωm is degrees, it is preferable that the imaging lens satisfies Conditional Expression (1). By not allowing the corresponding value of Conditional Expression (1) to be equal to or less than the lower limit thereof, a wide angle of view can be ensured. Therefore, high additional value can be achieved as the imaging lens. By not allowing the corresponding value of Conditional Expression (1) to be equal to or greater than the upper limit thereof, it is easy to achieve a balance between optical performance and reduction in size.

$$65<\omega m<130 \tag{1}$$

In order to obtain more favorable characteristics, it is preferable to use any of 75, 80, or 85, instead of 65 which is the lower limit of Conditional Expression (1). Further, it is preferable to use any of 125, 120, or 115, instead of 130 which is the upper limit of Conditional Expression (1).

Assuming that a back focal length of the whole system at an air-equivalent distance in a state where the infinite distance object is in focus is Bf and a focal length of the whole system in a state where the infinite distance object is in focus is f, it is preferable that the imaging lens satisfies Conditional Expression (2). By not allowing the corresponding value of Conditional Expression (2) to be equal to or less than the lower limit thereof, it is possible to suppress an increase in diameter of the lens closest to the image side in the rear group Gr. By not allowing the corresponding value of Conditional Expression (2) to be equal to or greater than the upper limit thereof, the back focal length is prevented from becoming excessively long. As a result, the configuration is advantageous for achieving reduction in total length of the optical system.

$$0.25<Bf/(2\times f\times \sin(\omega m/2))<2 \tag{2}$$

In order to obtain more favorable characteristics, it is preferable to use any of 0.27, 0.29, 0.31, 0.33, 0.35, or 0.37, instead of 0.25 which is the lower limit of Conditional Expression (2). Further, it is preferable to use any of 1.8, 1.6, 1.4, 1.2, 1, or 0.95, instead of 2 which is the upper limit of Conditional Expression (2).

Assuming that a sum of the back focal length in terms of the air-equivalent distance and a distance on the optical axis from a lens surface closest to the object side to a lens surface closest to the image side in a state where the infinite distance object is in focus is TL, it is preferable that the imaging lens satisfies Conditional Expression (3). By not allowing the corresponding value of Conditional Expression (3) to be equal to or less than the lower limit thereof, the configuration is advantageous for suppressing various aberrations. By not allowing the corresponding value of Conditional Expression (3) to be equal to or greater than the upper limit thereof, the configuration is advantageous for achieving reduction in total length of the optical system.

$$4<TL/f<8.5 \tag{3}$$

In order to obtain more favorable characteristics, it is preferable to use any of 4.2, 4.4, 4.6, or 4.8, instead of 4 which is the lower limit of Conditional Expression (3). Further, it is preferable to use any of 7.5, 6.7, 6.4, or 6.3, instead of 8.5 which is the upper limit of Conditional Expression (3). For example, it is more preferable that the imaging lens satisfies Conditional Expression (3-1).

$$4.4<TL/f<6.7 \tag{3-1}$$

It is preferable that the imaging lens satisfies Conditional Expression (4). By not allowing the corresponding value of Conditional Expression (4) to be equal to or less than the lower limit thereof, it is possible to suppress an increase in diameter of the lens on the image side of the rear group Gr. By not allowing the corresponding value of Conditional Expression (4) to be equal to or greater than the upper limit thereof, the back focal length is prevented from becoming excessively long. As a result, the configuration is advantageous for achieving reduction in total length of the optical system.

$$0.05<Bf/TL<0.35 \tag{4}$$

In order to obtain more favorable characteristics, it is preferable to use any of 0.07, 0.09, or 0.11, instead of 0.05 which is the lower limit of Conditional Expression (4). Further, it is preferable to use any of 0.33, 0.3, or 0.28, instead of 0.35 which is the upper limit of Conditional Expression (4).

Assuming that a focal length of the front group Gf in a state where the infinite distance object is in focus is ff, it is preferable that the imaging lens satisfies Conditional Expression (5). By not allowing the corresponding value of Conditional Expression (5) to be equal to or less than the lower limit thereof, the negative refractive power of the front group Gf is prevented from becoming excessively strong. As a result, the configuration is advantageous for achieving reduction in total length of the optical system, and it is easy to ensure the amount of peripheral light. By not allowing the corresponding value of Conditional Expression (5) to be equal to or greater than the upper limit thereof, the positive refractive power of the front group Gf is prevented from becoming excessively strong. As a result, it is easy to correct spherical aberration and field curvature.

$$-0.4 < f/ff < 0.4 \quad (5)$$

In order to obtain more favorable characteristics, it is preferable to use any of −0.3, −0.2, or −0.1, instead of −0.4 which is the lower limit of Conditional Expression (5). Further, it is preferable to use any of 0.3, 0.2, or 0.1, instead of 0.4 which is the upper limit of Conditional Expression (5).

Assuming that a focal length of the rear group Gr in a state where the infinite distance object is in focus is fr, it is preferable that the imaging lens satisfies Conditional Expression (6). By not allowing the corresponding value of Conditional Expression (6) to be equal to or less than the lower limit thereof, the positive refractive power of the rear group Gr is prevented from becoming excessively weak. As a result, the configuration is advantageous for achieving reduction in total length of the optical system, and it is easy to correct spherical aberration. By not allowing the corresponding value of Conditional Expression (6) to be equal to or greater than the upper limit thereof, the positive refractive power of the rear group Gr is prevented from becoming excessively strong. As a result, it is possible to prevent spherical aberration from being excessively corrected.

$$0.1 < f/fr < 1.3 \quad (6)$$

In order to obtain more favorable characteristics, it is preferable to use any of 0.2, 0.3, or 0.4, instead of 0.1 which is the lower limit of Conditional Expression (6). Further, it is preferable to use any of 1.1, 0.9, or 0.7, instead of 1.3 which is the upper limit of Conditional Expression (6).

Assuming that a distance on the optical axis Z from the lens surface closest to the object side to the aperture stop St in a state where the infinite distance object is in focus is Ts, it is preferable that the imaging lens satisfies Conditional Expression (7). By not allowing the corresponding value of Conditional Expression (7) to be equal to or less than the lower limit thereof, an object side space more sufficient than the aperture stop St can be ensured. Therefore, an appropriate number of lenses are disposed. Thereby, the imaging lens can be configured without forcibly reducing an absolute value of the curvature radius of the lens. Thereby, it is easy to suitably correct various aberrations. By not allowing the corresponding value of Conditional Expression (7) to be equal to or greater than the upper limit thereof, the position of the aperture stop St can be prevented from becoming excessively close to the image plane Sim. As a result, it is possible to prevent the incidence angle of the off-axis principal ray, which is incident to the imaging element disposed on the image plane Sim in the imaging apparatus, from becoming excessively large.

$$0.1 < Ts/TL < 0.9 \quad (7)$$

In order to obtain more favorable characteristics, it is preferable to use any of 0.2, 0.25, or 0.3, instead of 0.1 which is the lower limit of Conditional Expression (7). Further, it is preferable to use any of 0.8, 0.7, or 0.6, instead of 0.9 which is the upper limit of Conditional Expression (7).

Assuming that a focal length of the first lens is fL1, it is preferable that the imaging lens satisfies Conditional Expression (8). By not allowing the corresponding value of Conditional Expression (8) to be equal to or less than the lower limit thereof, the negative refractive power of the first lens is prevented from becoming excessively strong. As a result, it is easy to achieve an increase in angle of view. By not allowing the corresponding value of Conditional Expression (8) to be equal to or greater than the upper limit thereof, the negative refractive power of the first lens is prevented from becoming excessively weak. As a result, it is easy to satisfactorily correct astigmatism.

$$-0.6 < f/fL1 < -0.1 \quad (8)$$

In order to obtain more favorable characteristics, it is preferable to use any of −0.5, −0.45, or −0.4, instead of −0.6 which is the lower limit of Conditional Expression (8). Further, it is preferable to use any of −0.15, −0.2, or −0.25, instead of −0.1 which is the upper limit of Conditional Expression (8).

Assuming that a focal length of the second lens is fL2, it is preferable that the imaging lens satisfies Conditional Expression (9). By not allowing the corresponding value of Conditional Expression (9) to be equal to or less than the lower limit thereof, the negative refractive power of the second lens is prevented from becoming excessively strong. As a result, it is easy to achieve an increase in angle of view. By not allowing the corresponding value of Conditional Expression (9) to be equal to or greater than the upper limit thereof, the negative refractive power of the second lens is prevented from becoming excessively weak. As a result, it is easy to satisfactorily correct astigmatism.

$$-1 < f/fL2 < -0.1 \quad (9)$$

In order to obtain more favorable characteristics, it is preferable to use any of −0.95, −0.9, and −0.85, instead of −1 which is the lower limit of Conditional Expression (9). Further, it is preferable to use any of −0.2, −0.25, or −0.3, instead of −0.1 which is the upper limit of Conditional Expression (9).

Assuming that a paraxial curvature radius of an object side surface of the first lens is RL1f and a paraxial curvature radius of an image side surface of the first lens is RL1r, it is preferable that the imaging lens satisfies Conditional Expression (10). Conditional Expression (10) defines a shape factor of the lens. By not allowing the corresponding value of Conditional Expression (10) to be equal to or less than the lower limit thereof, it is easy to satisfactorily correct astigmatism. By not allowing the corresponding value of Conditional Expression (10) to be equal to or greater than the upper limit thereof, it is easy to satisfactorily correct spherical aberration. Further, by not allowing the corresponding value of Conditional Expression (10) to be equal to or greater than the upper limit thereof, the refractive power of the first lens is prevented from becoming excessively weak. As a result, it is easy to achieve an increase in angle of view.

$$1 < (RL1f + RL1r)/(RL1f - RL1r) < 3.5 \quad (10)$$

In order to obtain more favorable characteristics, it is preferable to use any of 1.1, 1.2, or 1.4, instead of 1 which is the lower limit of Conditional Expression (10). Further, it is preferable to use any of 3, 2.7, or 2.4, instead of 3.5 which is the upper limit of Conditional Expression (10).

In a case where the second lens is a negative meniscus lens which has a convex surface facing toward the object side, assuming that a paraxial curvature radius of an object side surface of the second lens is RL2f and a paraxial curvature radius of an image side surface of the second lens is RL2r, it is preferable that the imaging lens satisfies Conditional Expression (11). Conditional Expression (11) defines a shape factor of the lens. By not allowing the corresponding value of Conditional Expression (11) to be equal to or less than the lower limit thereof, it is easy to satisfactorily correct astigmatism. By not allowing the corresponding value of Conditional Expression (11) to be equal to or greater than the upper limit thereof, it is easy to satisfactorily correct spherical aberration. Further, by not allowing the corresponding value of Conditional Expression (11) to be equal to or greater than the upper limit thereof, the refractive power of the second lens is prevented from becoming excessively weak. As a result, it is easy to achieve an increase in angle of view.

$$1<(RL2f+RL2r)/(RL2f-RL2r)<4.5 \quad (11)$$

In order to obtain more favorable characteristics, it is preferable to use any of 1.05, 1.1, or 1.15, instead of 1 which is the lower limit of Conditional Expression (11). Further, it is preferable to use any of 4, 3.7, or 3.5, instead of 4.5 which is the upper limit of Conditional Expression (11).

Assuming that a refractive index of the first lens at the d line is NdL1, it is preferable that the imaging lens satisfies Conditional Expression (12). By not allowing the corresponding value of Conditional Expression (12) to be equal to or less than the lower limit thereof, the refractive index of the first lens at the d line is prevented from becoming excessively low. As a result, the imaging lens can be configured without forcibly reducing the absolute value of the curvature radius of the first lens. Thereby, the configuration is advantageous for suppressing occurrence of off-axis aberration, and the configuration is advantageous for achieving reduction in total length of the optical system. By not allowing the corresponding value of Conditional Expression (12) to be equal to or greater than the upper limit thereof, a material of which dispersion is not excessively large can be selected as the first lens. As a result, it is easy to correct lateral chromatic aberration.

$$1.43<NdL1<1.95 \quad (12)$$

In order to obtain more favorable characteristics, it is preferable to use any of 1.5 or 1.55, instead of 1.43 which is the lower limit of Conditional Expression (12). Further, it is preferable to use any of 1.84 or 1.72, instead of 1.95 which is the upper limit of Conditional Expression (12).

Assuming that an open F number of the imaging lens in a state where the infinite distance object is in focus is FNo, it is preferable that the imaging lens satisfies Conditional Expression (13). By not allowing the corresponding value of Conditional Expression (13) to be equal to or less than the lower limit thereof, it is easy to suppress an increase in number of lenses and suppress an increase in size of the lens system while obtaining favorable optical performance. By not allowing the corresponding value of Conditional Expression (13) to be equal to or greater than the upper limit thereof, the angle of view can be widened, or the open F number can be reduced. Therefore, the imaging lens can be used for a wide range of applications, and can be made as a high value imaging lens.

$$2.5<FNo/\sin(\omega m/2)<6 \quad (13)$$

In order to obtain more favorable characteristics, it is preferable to use any of 3, 3.3, or 3.5, instead of 2.5 which is the lower limit of Conditional Expression (13). Further, it is preferable to use any of 5.3, 4.7, or 4.3, instead of 6 which is the upper limit of Conditional Expression (13).

In the imaging lens, assuming that a central thickness of each lens included in the rear group Gr is D, it is preferable that the number of lenses each of which satisfies Conditional Expression (14) and has a positive refractive power is equal to or less than 1. The central thickness is a thickness on the optical axis. By making the number of lenses each of which has a large central thickness that satisfy Conditional Expression (14) equal to or less than 1, a larger number of lenses can be disposed in a limited space in the optical system. Therefore, the configuration is advantageous for achieving reduction in various aberrations. Further, by making the number of lenses each of which has a large central thickness equal to or less than 1, the configuration is advantageous for achieving reduction in weight.

$$0.155<D/TL \quad (14)$$

Assuming that an effective diameter of the object side surface of the first lens is ED, it is preferable that the imaging lens satisfies Conditional Expression (15). By not allowing the corresponding value of Conditional Expression (15) to be equal to or less than the lower limit thereof, the diameter of the first lens is prevented from becoming excessively small. As a result, the configuration is advantageous for ensuring the angle of view and ensuring the amount of peripheral light. By not allowing the corresponding value of Conditional Expression (15) to be equal to or greater than the upper limit thereof, the diameter of the first lens is prevented from becoming excessively large. As a result, it is easy to achieve reduction in size.

$$1.5<ED/(2\times f\times \sin(\omega m/2))<5 \quad (15)$$

In order to obtain more favorable characteristics, it is preferable to use any of 1.7, 1.9, or 2, instead of 1.5 which is the lower limit of Conditional Expression (15). Further, it is preferable to use any of 4.5, 4, or 3.8, instead of 5 which is the upper limit of Conditional Expression (15).

In the present specification, twice the distance to the optical axis Z from the intersection between the lens surface and the ray passing through the outermost side among rays incident onto the lens surface from the object side and emitted to the image side is the "effective diameter" of the lens surface. The "outer side" here is the radial outside centered on the optical axis Z, that is, the side separated from the optical axis Z.

Figure 3:
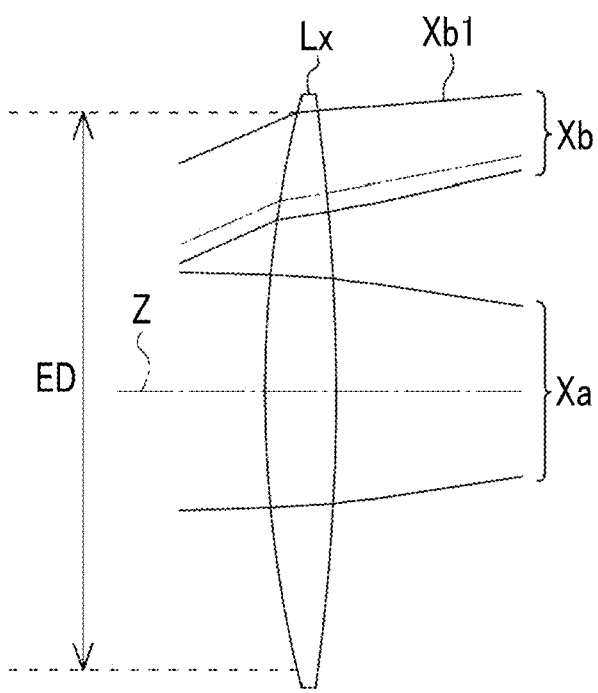
FIG. 3 is a diagram for explaining an effective diameter.

As an explanatory diagram, FIG. 3 shows an example of an effective diameter ED. In FIG. 3, the left side is the object side, and the right side is the image side. FIG. 3 shows an on-axis luminous flux Xa and an off-axis luminous flux Xb passing through the lens Lx. In the example of FIG. 3, a ray Xb1, which is the upper ray of the off-axis luminous flux Xb, is the ray passing through the outermost side. Therefore, in the example of FIG. 3, twice the distance to the optical axis Z from the intersection between the ray Xb1 and the object side surface of the lens Lx is the effective diameter ED of the object side surface of the lens Lx. In addition, in FIG. 3, the upper ray of the off-axis luminous flux Xb is the ray passing through the outermost side, but which ray is the ray passing through the outermost side depends on the optical system.

The above-mentioned preferable configurations and available configurations including the configurations relating to the conditional expressions may be any combination, and it is preferable to optionally adopt the configurations in accordance with required specification.

For example, in a preferred aspect of the present disclosure, the imaging lens consists of, in order from the object side to the image side, a front group Gf, an aperture stop St, and a rear group Gr that has a refractive power. The front group Gf and the rear group Gr are combined and include at least five negative lenses and at least three positive lenses.

A lens closest to the object side in the front group Gf is a first lens as a negative meniscus lens which has a convex surface facing toward the object side. A lens, which is second from the object side in the front group Gf, is a second lens as a negative lens which has a concave surface facing toward the image side. The front group Gf includes at least three negative lenses, which include the first lens and the second lens, and at least one positive lens. With such a configuration, the imaging lens satisfies Conditional Expressions (1), (2), (3), and (4).

Next, examples of the imaging lens of the present disclosure will be described, with reference to the drawings. The reference numerals attached to the lenses in the cross-sectional views of each example are used independently for each example in order to avoid complication of description and drawings due to an increase in number of digits of the reference numerals. Therefore, even in a case where common reference numerals are attached in the drawings of different examples, constituent elements do not necessarily have a common configuration.

Example 1

FIG. 2 is a cross-sectional view of a configuration of the imaging lens of Example 1, and an illustration method and a configuration thereof are as described above. Therefore, some description is not repeated herein. The imaging lens of Example 1 consists of, in order from the object side to the image side, the front group Gf that has a positive refractive power, the aperture stop St, and the rear group Gr that has a positive refractive power. The front group Gf consists of six lenses L11 to L16 in order from the object side to the image side. The rear group Gr consists of seven lenses L21 to L27 in order from the object side to the image side. During focusing from the infinite distance object to the closest object, the lens L26 moves along the optical axis Z toward the object side, and the other lenses remain stationary with respect to the image plane Sim. Hereinafter, parentheses and arrows are written under the lens which moves during focusing, and are not written under the lens which remains stationary during focusing.

Regarding the imaging lens of Example 1, Table 1 shows basic lens data, Table 2 shows specifications, Table 3 shows variable surface spacings, and Table 4 shows aspherical coefficients thereof.

The table of basic lens data will be described as follows. The column of Sn shows surface numbers in a case where the surface closest to the object side is the first surface and the number is increased one by one toward the image side. The column of R shows a curvature radius of each surface. The column of D shows a surface spacing between each surface and the surface adjacent to the image side on the optical axis. The column of Nd shows a refractive index of each constituent element at the d line. The column of vd shows an Abbe number of each constituent element based on the d line. The column of θgF shows a partial dispersion ratio of each constituent element between the g line and the F line.

The table of basic lens data also shows the aperture stop St, and in the column of the surface number of the surface corresponding to the aperture stop St, the surface number and (St) are noted. In the column of R, the sign of the curvature radius of the convex surface facing toward the object side is positive and the sign of the curvature radius of the convex surface facing toward the image side is negative. In the column of D, the symbol DD[ ] is used for each variable surface spacing during focusing, and the object side surface number of the spacing is given in [ ] and is noted. A value at the bottom cell of the column of D indicates a spacing between the image plane Sim and the surface closest to the image side in the table.

Table 2 shows a focal length f of the whole system, a back focal length Bf, an open F number FNo., and a maximum total angle of view 2ωm. [°] in the cell of the maximum total angle of view 2ωm means that the unit thereof is a degree. The values shown in Table 2 are based on the d line. Table 2 shows values in a state where the infinite distance object is in focus.

Table 3 shows variable surface spacings during focusing. The column of "Infinity" shows surface spacings in a state where the infinite distance object is in focus. The right cells of the cells of "Infinity" show absolute values of the imaging magnification in a state where the close object is in focus, and the column thereof shows the variable surface spacings in a state where the close object is in focus.

In the table of the basic lens data, a mark * is added to a surface number of the aspherical surface, and a numerical value of a paraxial curvature radius is written in the cell of a curvature radius of the aspherical surface. In Table 4, the row of Sn shows surface numbers of the aspherical surfaces, and the rows of KA and Am (m is an integer of 3 or more) shows numerical values of the aspherical coefficients for each aspherical surface. The "E±n" (n is an integer) in numerical values of the aspherical coefficients of Table 3 indicates "×10$^{±n}$". KA and Am are the aspherical coefficients in the aspherical surface expression represented by the following expression.

$$Zd = C \times h^2 / \{1(1-KA \times C^2 \times h^2)^{1/2}\} + \Sigma Am \times h^m$$

Here,

Zd is an aspherical surface depth (a length of a perpendicular from a point on an aspherical surface at height h to a plane that is perpendicular to the optical axis and that is in contact with the vertex of the aspherical surface), h is a height (a distance from the optical axis to the lens surface), C is a reciprocal of the paraxial curvature radius, KA and Am are aspherical coefficients, and Σ in the aspherical surface expression means the sum with respect to m.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | vd | θgF |
|---|---|---|---|---|---|
| 1 | 97.1738 | 1.5892 | 1.55032 | 75.50 | 0.54001 |
| 2 | 22.4459 | 3.4508 | | | |
| 3 | 37.8696 | 1.0000 | 1.49700 | 81.61 | 0.53887 |
| 4 | 12.2014 | 12.1235 | | | |
| 5 | −31.6432 | 0.9998 | 1.49700 | 81.61 | 0.53887 |
| 6 | 18.3416 | 6.5015 | 1.51680 | 64.20 | 0.53430 |
| 7 | −19.4513 | 0.5537 | | | |
| *8 | −16.5079 | 1.1477 | 1.49710 | 81.56 | 0.53848 |
| *9 | −91.0790 | 1.9460 | | | |
| 10 | −148.1160 | 2.9085 | 1.52841 | 76.45 | 0.53954 |
| 11 | −16.2344 | 0.0998 | | | |

TABLE 1-continued

Example 1

| Sn | R | D | Nd | νd | θgF |
|---|---|---|---|---|---|
| 12(St) | ∞ | 1.9975 | | | |
| 13 | −29.4149 | 2.5087 | 1.49700 | 81.61 | 0.53887 |
| 14 | −14.2981 | 0.6840 | | | |
| *15 | 56.7648 | 5.1917 | 1.49710 | 81.56 | 0.53848 |
| *16 | −19.4165 | 0.1906 | | | |
| 17 | −32.6129 | 0.9998 | 1.58144 | 40.89 | 0.57680 |
| 18 | 87.2166 | 5.0918 | 1.49700 | 81.61 | 0.53887 |
| 19 | −15.0846 | 1.1184 | 1.56732 | 42.84 | 0.57436 |
| 20 | −76.5435 | DD[20] | | | |
| *21 | −814.3231 | 1.1125 | 1.80610 | 40.73 | 0.56940 |
| *22 | 33.9374 | DD[22] | | | |
| 23 | 42.9991 | 6.5090 | 1.49700 | 81.61 | 0.53887 |
| 24 | −203.1744 | 19.2362 | | | |

TABLE 2

Example 1

| F | 15.15 |
|---|---|
| Bf | 19.24 |
| FNo. | 2.82 |
| 2ωm[°] | 180.0 |

TABLE 3

Example 1

| | Infinity | 0.03 times |
|---|---|---|
| DD[20] | 0.8740 | 1.2464 |
| DD[22] | 1.9222 | 1.5498 |

TABLE 4

Example 1

| Sn | 8 | 9 | 15 |
|---|---|---|---|
| KA | 1.0000000E+00 | 1.0000000E+00 | 1.0000000E+00 |
| A3 | 4.4408921E−16 | 9.9746600E−19 | 1.7347235E−19 |
| A4 | 1.5612791E−05 | 3.1659105E−05 | −5.1458661E−05 |
| A5 | −9.7151369E−05 | 3.7497562E−06 | −5.4300591E−06 |
| A6 | 4.0254368E−05 | 3.6304510E−06 | 9.5530885E−07 |
| A7 | −7.8708450E−06 | 1.4401598E−07 | 5.2366553E−08 |
| A8 | 9.5918626E−07 | −8.0058236E−08 | −2.6068111E−08 |
| A9 | −7.1680920E−08 | −4.7866311E−10 | −1.4798625E−10 |
| A10 | −2.5809556E−10 | 8.4382090E−10 | 4.2060185E−10 |
| A11 | 8.0733575E−10 | −9.4236841E−13 | −7.4440397E−12 |
| A12 | −7.6212907E−11 | −5.1297632E−12 | −3.4331289E−12 |
| A13 | −5.0041862E−14 | 1.3849208E−14 | 7.5832951E−14 |
| A14 | 4.3377963E−13 | 1.8849429E−14 | 1.5423923E−14 |
| A15 | −2.0222426E−14 | −4.8895437E−17 | −3.3000728E−16 |
| A16 | −7.0979833E−16 | −4.1324299E−17 | −3.8794682E−17 |
| A17 | 7.3893175E−17 | 7.8159523E−20 | 7.0253205E−19 |
| A18 | −5.5827881E−19 | 4.9780383E−20 | 5.0781486E−20 |
| A19 | −8.2163150E−20 | −4.8667619E−23 | −5.9939536E−22 |
| A20 | 1.8950672E−21 | −2.5366733E−23 | −2.6399023E−23 |

| Sn | 16 | 21 | 22 |
|---|---|---|---|
| KA | 1.0000000E+00 | 1.0000000E+00 | 1.0000000E+00 |
| A3 | −5.2041704E−19 | 1.0842022E−19 | 2.7105054E−20 |
| A4 | −7.7986749E−05 | −6.1025162E−05 | 2.3614997E−05 |
| A5 | −1.2009691E−05 | 5.7742579E−06 | 5.3918094E−07 |
| A6 | 1.2150169E−06 | 1.0904572E−06 | 5.5524645E−07 |
| A7 | 3.0756146E−07 | −8.2627970E−08 | 3.2964734E−08 |
| A8 | −3.3284369E−08 | −3.6993364E−09 | −6.8724505E−09 |
| A9 | −4.2741365E−09 | 6.2886416E−10 | −5.3226325E−10 |
| A10 | 5.5913462E−10 | −6.7776161E−11 | 1.5224978E−11 |
| A11 | 3.2235641E−11 | −3.2330901E−12 | 3.5791297E−12 |
| A12 | −5.0929958E−12 | 8.4119563E−13 | 1.6218770E−13 |
| A13 | −1.5610149E−13 | 1.0908563E−14 | −1.3284314E−14 |
| A14 | 2.7056034E−14 | −4.2421127E−15 | −1.2452010E−15 |
| A15 | 4.7926214E−16 | −2.3087409E−17 | 2.8244983E−17 |
| A16 | −8.5186691E−17 | 1.1246063E−17 | 3.6989097E−18 |
| A17 | −8.4139630E−19 | 2.7772644E−20 | −3.2148123E−20 |
| A18 | 1.4851339E−19 | −1.5421312E−20 | −5.2386815E−21 |
| A19 | 6.3920644E−22 | −1.4483800E−23 | 1.5131890E−23 |
| A20 | −1.1083589E−22 | 8.6416093E−24 | 2.9300990E−24 |

Figure 4:
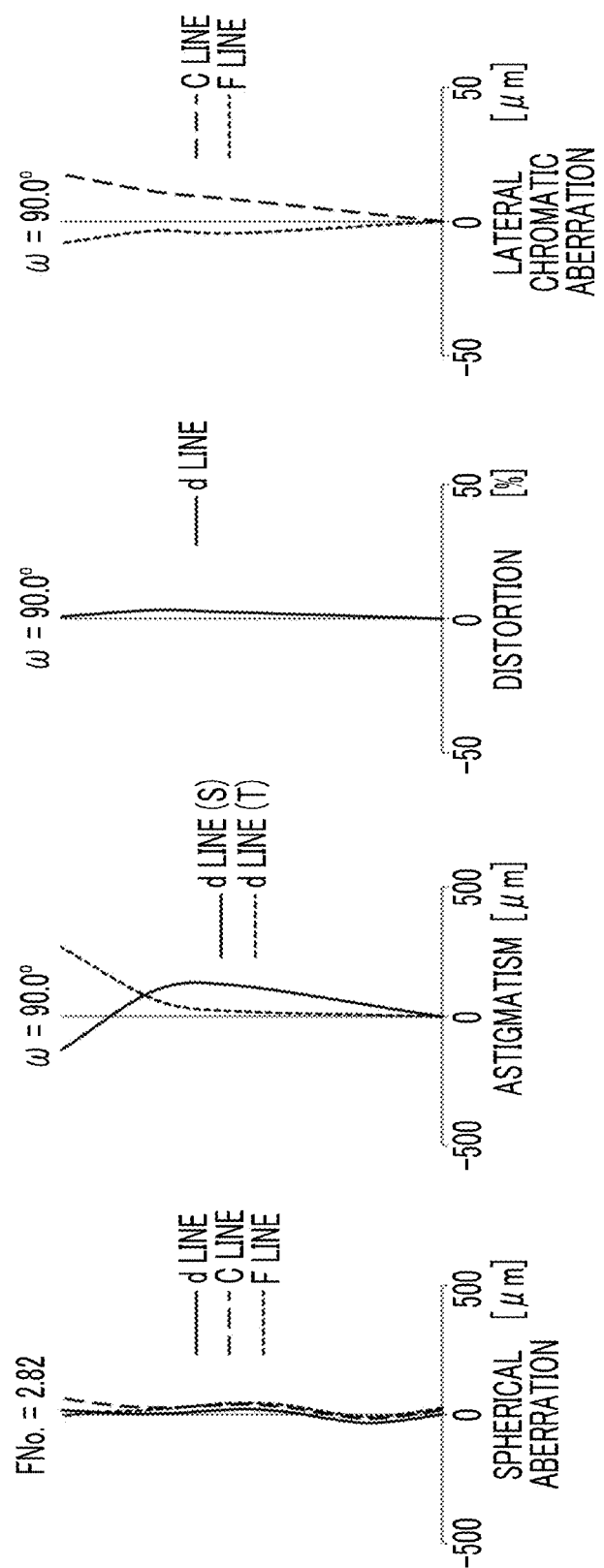
FIG. 4 is a diagram showing aberrations of the imaging lens of Example 1.

FIG. 4 shows aberration diagrams of the imaging lens of Example 1 in a state where the infinite distance object is in focus. FIG. 4 shows the spherical aberration, the astigmatism, the distortion, and lateral chromatic aberration, in order from the left. In the spherical aberration diagram, aberrations at the d line, the C line, and the F line are indicated by the solid line, the long broken line, and the short broken line, respectively. In the astigmatism diagram, aberration in the sagittal direction at the d line is indicated by the solid line, and aberration in the tangential direction at the d line is indicated by the short broken line. In the distortion diagram, aberration at the d line is indicated by the solid line. In the lateral chromatic aberration diagram, the aberrations at the C line and the F line are indicated by the long broken line and the short broken line, respectively. In the spherical aberration diagram, the value of the open F number is shown after "FNo.=", and in the other aberration diagrams, the value of the maximum half angle of view is shown after "ω=". In the aberration diagrams, FNo. and ω respectively correspond to FNo and ωm of the above-mentioned conditional expressions.

Symbols, meanings, description methods, and illustration methods of the respective data pieces according to Example 1 are the same as those in the following examples unless otherwise specified. Therefore, in the following description, repeated description will not be given.

Example 2

Figure 5:
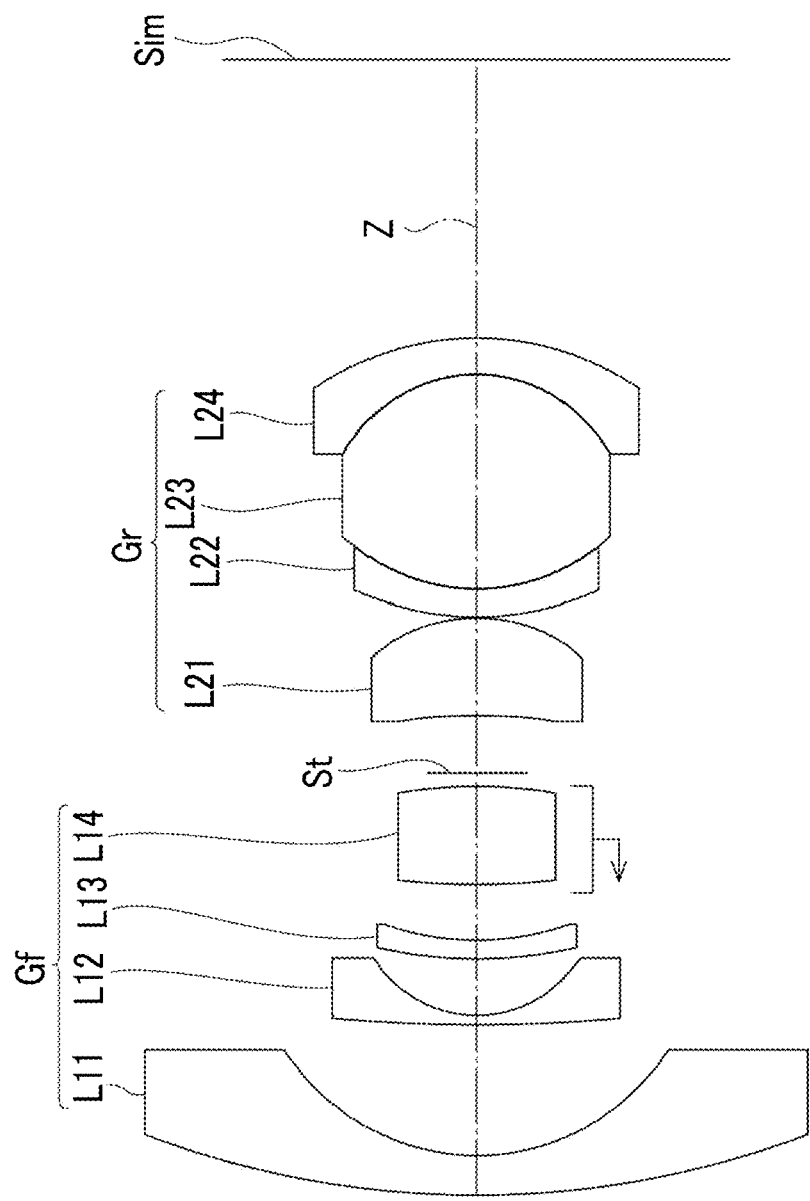
FIG. 5 is a cross-sectional view showing a configuration of an imaging lens of Example 2.

FIG. 5 is a cross-sectional view of a configuration of an imaging lens of Example 2 in a state where the infinite distance object is in focus. The imaging lens of Example 2 consists of, in order from the object side to the image side, the front group Gf that has a negative refractive power, the aperture stop St, and the rear group Gr that has a positive refractive power. The front group Gf consists of four lenses L11 to L14 in order from the object side to the image side. The rear group Gr consists of four lenses L21 to L24 in order from the object side to the image side. During focusing from the infinite distance object to the closest object, the lens L14 moves toward the object side along the optical axis Z.

Figure 6:
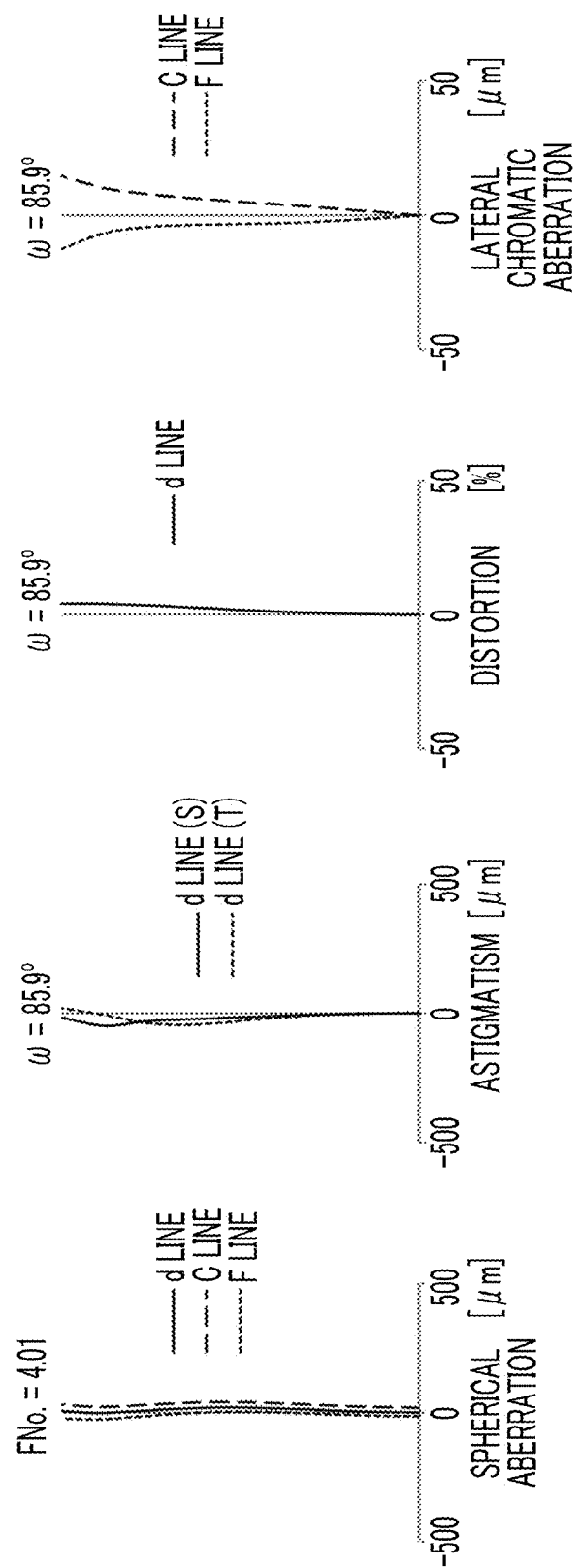
FIG. 6 is a diagram showing aberrations of the imaging lens of Example 2.

Regarding the imaging lens of Example 2, Table 5 shows basic lens data, Table 6 shows specifications, Table 7 shows variable surface spacings, and Table 8 shows aspherical coefficients thereof. Further, FIG. 6 shows aberration diagrams.

TABLE 5

| Example 2 | | | | | |
|---|---|---|---|---|---|
| Sn | R | D | Nd | vd | θgF |
| 1 | 54.7052 | 2.1390 | 1.43599 | 67.00 | 0.52556 |
| 2 | 13.0780 | 7.0444 | | | |
| 3 | 91.7711 | 0.5000 | 1.54071 | 57.08 | 0.54740 |
| 4 | 6.9970 | 3.0560 | | | |
| 5 | 26.6600 | 1.0000 | 1.53775 | 74.70 | 0.52344 |
| 6 | 16.3000 | DD[6] | | | |
| 7 | 42.7763 | 5.2865 | 1.83661 | 45.31 | 0.55944 |
| 8 | −27.9532 | DD[8] | | | |
| 9(St) | ∞ | 3.0961 | | | |
| *10 | −41.3628 | 5.2476 | 1.45854 | 87.47 | 0.53362 |
| *11 | −9.7965 | 0.0500 | | | |
| 12 | 16.9451 | 1.4892 | 1.93707 | 35.04 | 0.58285 |
| 13 | 11.3819 | 11.5443 | 1.44207 | 89.97 | 0.53195 |
| 14 | −8.7112 | 1.9611 | 1.92778 | 28.30 | 0.60387 |
| 15 | −16.7539 | 15.0000 | | | |

TABLE 6

| Example 2 | |
|---|---|
| F | 10.02 |
| Bf | 15.00 |
| FNo. | 4.01 |
| 2ωm[°] | 171.8 |

TABLE 7

| Example 2 | | |
|---|---|---|
| | Infinity | 0.02 times |
| DD[6] | 3.0000 | 3.1238 |
| DD[8] | 0.7155 | 0.5917 |

TABLE 8

| Example 2 | | |
|---|---|---|
| Sn | 10 | 11 |
| KA | 6.0441100E+01 | 1.9259630E+00 |
| A4 | −3.6912232E−05 | 1.1237431E−04 |
| A6 | 2.5002438E−06 | 5.8494004E−07 |
| A8 | −2.2736700E−07 | −9.4224783E−10 |

Example 3

Figure 7:
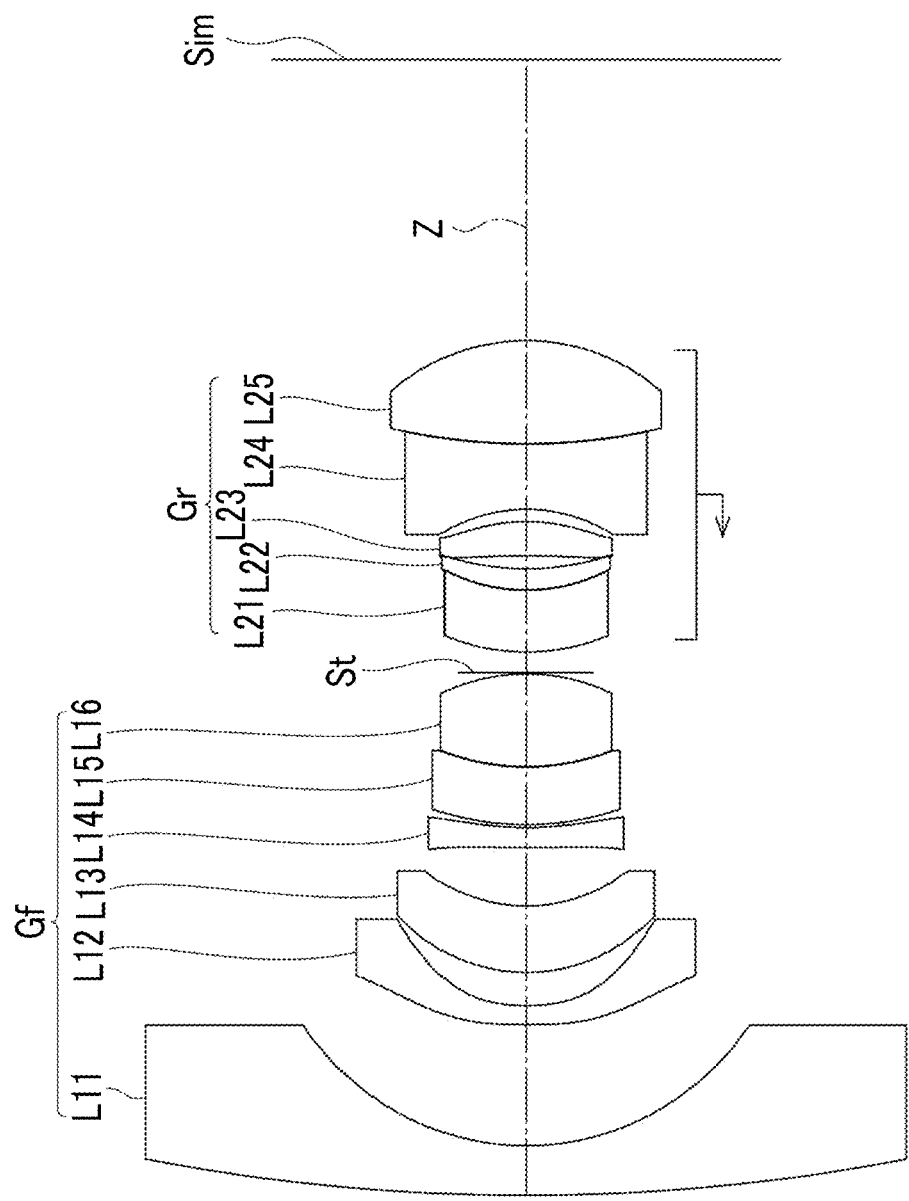
FIG. 7 is a cross-sectional view showing a configuration of an imaging lens of Example 3.

FIG. 7 is a cross-sectional view of a configuration of the imaging lens of Example 3 in a state where the infinite distance object is in focus. The imaging lens of Example 3 negative refractive power, the aperture stop St, and the rear group Gr that has a positive refractive power. The front group Gf consists of six lenses L11 to L16 in order from the object side to the image side. The rear group Gr consists of five lenses L21 to L25 in order from the object side to the image side. During focusing from the infinite distance object to the closest object, the rear group Gr (lenses L21 to L25) moves integrally toward the object side along the optical axis Z. Here, the phrase "moves integrally" means to move by the same amount in the same direction at the same time.

Figure 8:
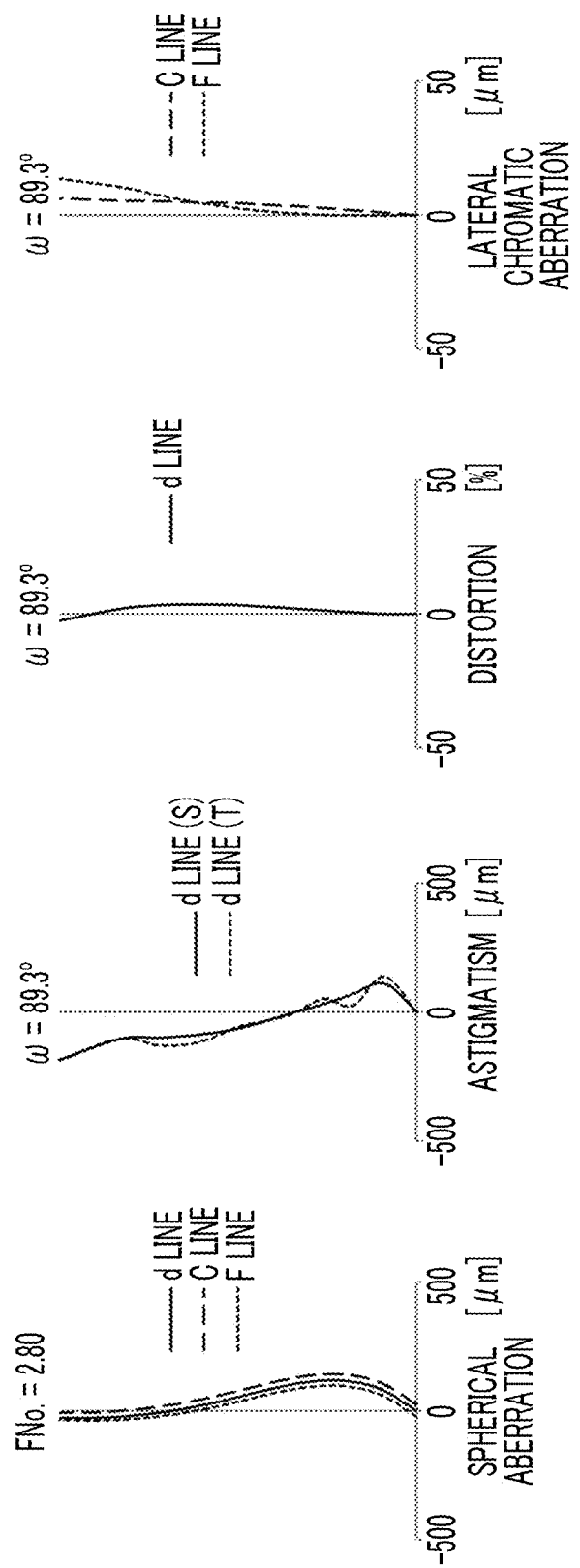
FIG. 8 is a diagram showing aberrations of the imaging lens of Example 3.

Regarding the imaging lens of Example 3, Table 9 shows basic lens data, Table 10 shows specifications, Table 11 shows variable surface spacings, and Table 12 shows aspherical coefficients thereof. Further, FIG. 8 shows aberration diagrams.

TABLE 9

| Example 3 | | | | | |
|---|---|---|---|---|---|
| Sn | R | D | Nd | vd | θgF |
| 1 | 118.5208 | 2.6649 | 1.51633 | 64.14 | 0.53531 |
| 2 | 15.3493 | 6.5164 | | | |
| *3 | 62.6303 | 1.0210 | 1.72903 | 54.04 | 0.54474 |
| *4 | 11.8886 | 1.7860 | | | |
| 5 | 10.0003 | 3.5835 | 1.96300 | 24.11 | 0.62126 |
| 6 | 9.5411 | 3.1375 | | | |
| *7 | 107.4752 | 1.0794 | 1.80610 | 40.73 | 0.56940 |
| *8 | 18.7375 | 0.1575 | | | |
| 9 | 17.0609 | 3.1116 | 1.95906 | 17.47 | 0.65993 |
| 10 | 13.7356 | 4.9979 | 1.57135 | 52.95 | 0.55544 |
| 11 | −11.4335 | 0.0768 | | | |
| 12(St) | ∞ | DD[12] | | | |
| 13 | 12.2165 | 3.2874 | 1.95906 | 17.47 | 0.65993 |
| 14 | 10.3821 | 1.1462 | 1.49700 | 81.54 | 0.53748 |

TABLE 9-continued

Example 3

| Sn | R | D | Nd | vd | θgF |
|---|---|---|---|---|---|
| 15 | 15.6509 | 0.6951 | | | |
| *16 | −52.0202 | 1.8465 | 1.88202 | 37.22 | 0.57699 |
| *17 | −10.2435 | 0.6584 | | | |
| 18 | −9.3478 | 3.5247 | 1.69895 | 30.13 | 0.60298 |
| 19 | 34.8558 | 5.5559 | 1.61800 | 63.32 | 0.54271 |
| 20 | −11.9013 | DD[20] | | | |

TABLE 10

Example 3

| | |
|---|---|
| f | 10.37 |
| Bf | 15.12 |
| FNo. | 2.80 |
| 2ωm[°] | 178.6 |

TABLE 11

Example 3

| | Infinity | 0.02 times |
|---|---|---|
| DD[12] | 1.1000 | 0.4780 |
| DD[20] | 15.1205 | 15.7425 |

TABLE 12

Example 3

| Sn | 3 | 4 | 7 |
|---|---|---|---|
| KA | −3.3643193E+00 | 1.4150260E+00 | 3.1183240E+00 |
| A3 | 9.1099135E−04 | 1.0231934E−03 | 1.8940376E−04 |
| A4 | 4.2827226E−04 | 1.3150195E−03 | −1.4330443E−04 |
| A5 | 4.9048740E−04 | −4.5660051E−04 | −9.7177091E−05 |
| A6 | −1.6454392E−04 | 3.9398030E−04 | 2.8167435E−05 |
| A7 | 1.7408845E−05 | −1.4247246E−04 | −2.0141223E−06 |
| A8 | −4.0949279E−07 | 2.3249989E−05 | −6.4025783E−07 |
| A9 | −1.4924199E−08 | −1.5661041E−06 | 7.1334778E−09 |
| A10 | −4.4871008E−09 | −2.5074084E−08 | 2.2656617E−08 |
| A11 | 4.2021201E−10 | 1.3565403E−08 | −2.4393327E−09 |
| A12 | −2.4412777E−11 | −2.3073506E−09 | 2.3089453E−09 |
| A13 | 9.5961569E−12 | 3.4471123E−10 | −8.7087105E−10 |
| A14 | −1.3265218E−12 | −3.0196603E−11 | 1.3105215E−10 |
| A15 | 7.3074975E−14 | 1.2941554E−12 | −9.1944428E−12 |
| A16 | −1.4985350E−15 | −2.0778937E−14 | 2.4084101E−13 |

| Sn | 8 | 16 | 17 |
|---|---|---|---|
| KA | −2.3038632E+00 | 6.7372586E+00 | 1.1846609E+00 |
| A3 | 1.4790621E−05 | −3.5807161E−04 | 2.0301859E−04 |
| A4 | 1.1773709E−04 | 5.6050113E−04 | 4.3373398E−06 |
| A5 | −3.6046819E−04 | −2.7928817E−04 | 2.0952861E−04 |
| A6 | 1.6151258E−04 | 1.0503516E−04 | −1.1253007E−04 |
| A7 | −2.7423792E−05 | −1.7006360E−05 | 3.8951693E−05 |
| A8 | −3.1199823E−06 | −5.2769980E−07 | −5.9073301E−06 |
| A9 | 1.5798970E−06 | 6.0807018E−07 | 6.8950278E−09 |
| A10 | −5.4228749E−08 | 1.1305924E−08 | 1.0560483E−07 |
| A11 | −3.7440537E−08 | −9.6520125E−09 | −1.3361904E−09 |
| A12 | 4.9439954E−09 | −5.5404723E−09 | −7.3658219E−10 |
| A13 | −6.9299625E−11 | 1.5163181E−09 | −3.3952450E−10 |
| A14 | −1.0329437E−11 | −1.0703879E−10 | 8.0240776E−11 |
| A15 | −2.8152351E−12 | 1.5891250E−11 | −1.9158570E−12 |
| A16 | 3.4292901E−13 | −2.7013721E−12 | −3.5871441E−13 |

Example 4

Figure 9:
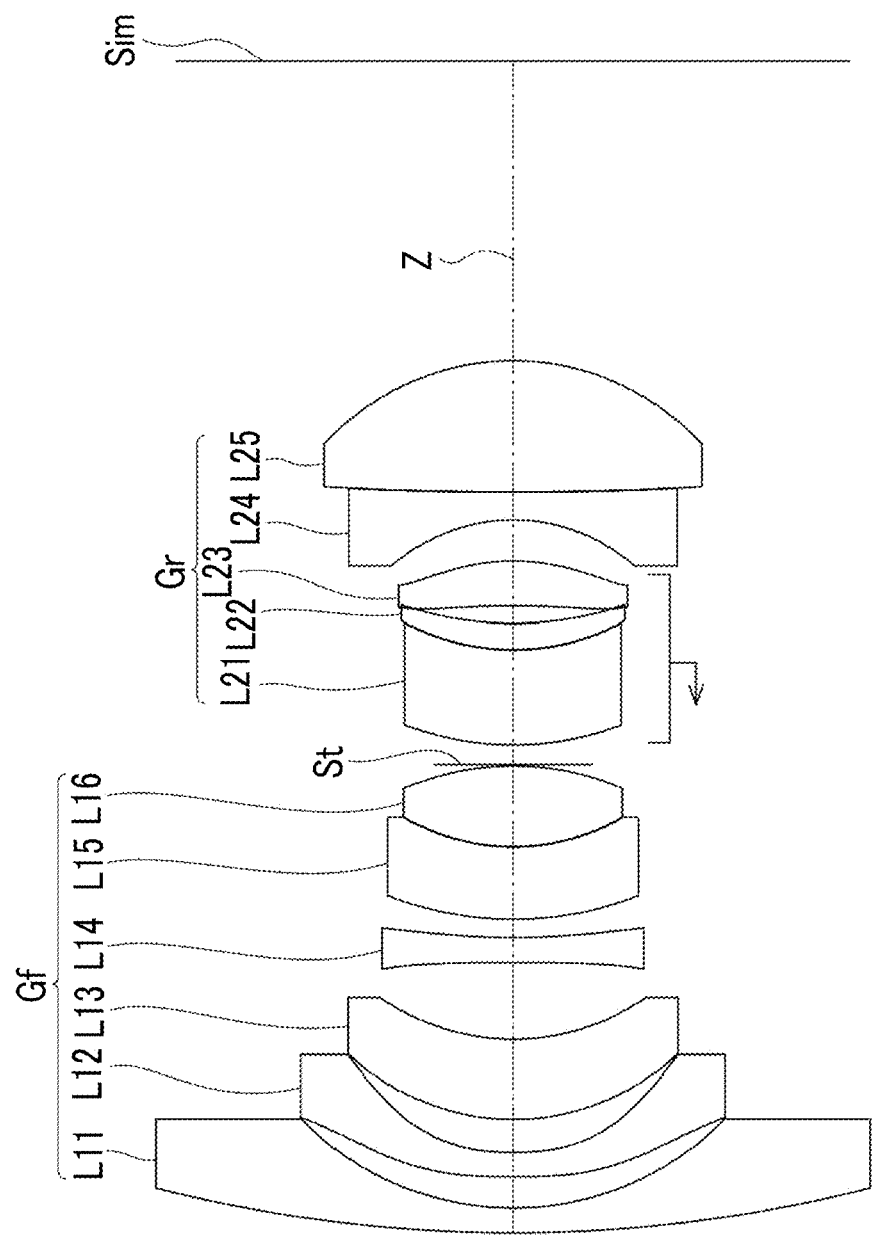
FIG. 9 is a cross-sectional view showing a configuration of an imaging lens of Example 4.

FIG. 9 is a cross-sectional view of a configuration of an imaging lens of Example 4 in a state where the infinite distance object is in focus. The imaging lens of Example 4 consists of, in order from the object side to the image side, the front group Gf that has a negative refractive power, the aperture stop St, and the rear group Gr that has a positive refractive power. The front group Gf consists of six lenses L11 to L16 in order from the object side to the image side. The rear group Gr consists of five lenses L21 to L25 in order from the object side to the image side. During focusing from the infinite distance object to the closest object, the lenses L21 to L23 move integrally toward the object side along the optical axis Z.

Figure 10:
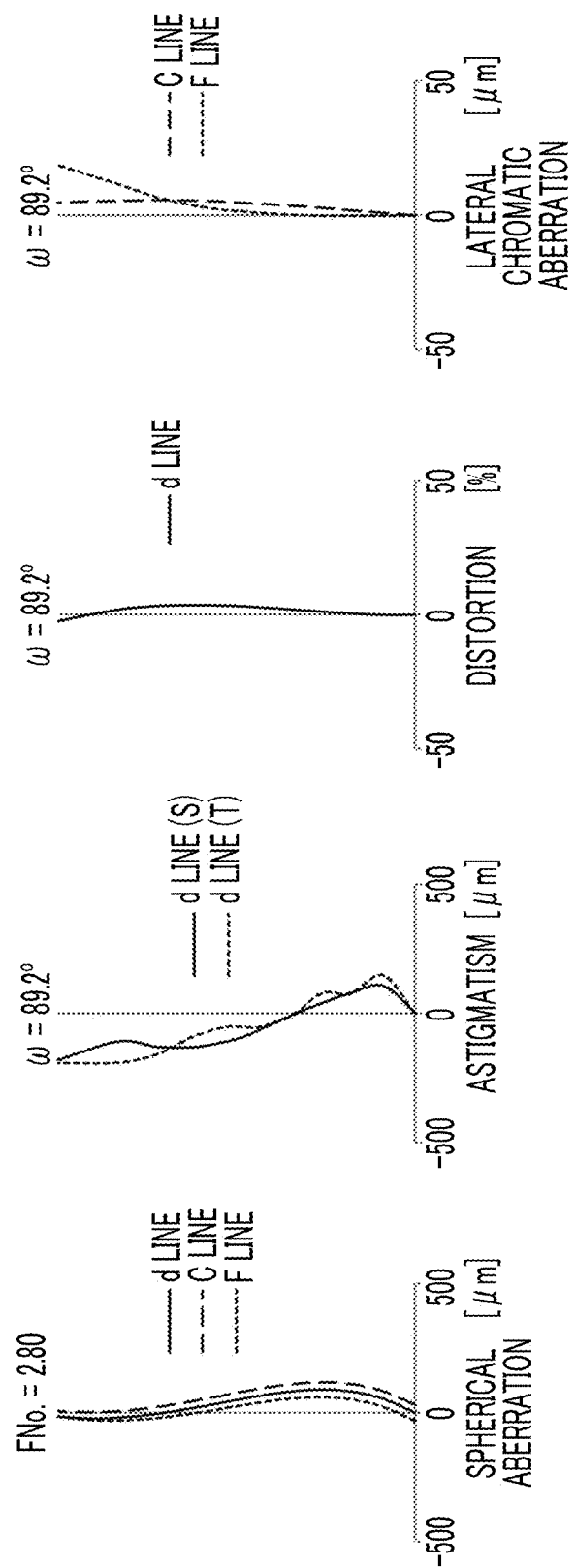
FIG. 10 is a diagram showing aberrations of the imaging lens of Example 4.

Regarding the imaging lens of Example 4, Table 13 shows basic lens data, Table 14 shows specifications, Table 15 shows variable surface spacings, and Table 16 shows aspherical coefficients thereof. Further, FIG. 10 shows aberration diagrams.

TABLE 13

Example 4

| Sn | R | D | Nd | vd | θgF |
|---|---|---|---|---|---|
| 1 | 63.3324 | 1.0181 | 1.57135 | 52.95 | 0.55544 |
| 2 | 12.8822 | 1.2912 | | | |
| *3 | 57.9233 | 1.0000 | 1.77250 | 49.50 | 0.55193 |
| *4 | 12.7889 | 1.3594 | | | |
| 5 | 10.3688 | 3.3066 | 1.92286 | 18.90 | 0.64960 |
| 6 | 10.0431 | 3.1608 | | | |
| *7 | −206.1313 | 1.0316 | 1.73077 | 40.50 | 0.57149 |
| *8 | 29.2003 | 0.7525 | | | |
| 9 | 14.9742 | 2.9896 | 1.95906 | 17.47 | 0.65993 |
| 10 | 9.4569 | 3.3284 | 1.59551 | 39.24 | 0.58043 |
| 11 | −12.0708 | 0.0656 | | | |
| 12(St) | ∞ | DD[12] | | | |
| 13 | 13.0474 | 3.9132 | 1.95906 | 17.47 | 0.65993 |
| 14 | 10.0426 | 1.0800 | 1.65160 | 58.54 | 0.53901 |
| 15 | 15.2703 | 0.7103 | | | |
| *16 | −39.8268 | 1.8448 | 1.85135 | 40.10 | 0.56954 |
| *17 | −9.2309 | DD[17] | | | |
| 18 | −7.9033 | 1.1444 | 1.69895 | 30.13 | 0.60298 |
| 19 | 145.6462 | 5.4185 | 1.75500 | 52.32 | 0.54757 |
| 20 | −11.0110 | 12.3502 | | | |

TABLE 14

Example 4

| | |
|---|---|
| f | 10.36 |
| Bf | 12.35 |
| FNo. | 2.80 |
| 2ωm[°] | 178.4 |

TABLE 15

Example 4

| | Infinity | 0.06 times |
|---|---|---|
| DD[12] | 0.8000 | 0.4780 |
| DD[17] | 1.6939 | 2.0159 |

TABLE 16

Example 4

| Sn | 3 | 4 | 7 |
|---|---|---|---|
| KA | −3.3657560E+00 | 1.4118828E+00 | 3.1183248E+00 |
| A3 | 1.0427520E−03 | 1.2105212E−03 | 1.4428686E−04 |
| A4 | 4.2946029E−04 | 1.3464698E−03 | −1.4351099E−04 |
| A5 | 4.9047846E−04 | −4.6214341E−04 | −9.3364870E−05 |
| A6 | −1.6461577E−04 | 3.9356541E−04 | 2.8961549E−05 |
| A7 | 1.7403530E−05 | −1.4256600E−04 | −1.5759048E−06 |
| A8 | −4.1121047E−07 | 2.3270556E−05 | −6.0893225E−07 |
| A9 | −1.4946075E−08 | −1.5662097E−06 | 9.6719792E−09 |
| A10 | −4.4886250E−09 | −2.4779148E−08 | 2.0457177E−08 |
| A11 | 4.2032567E−10 | 1.3686409E−08 | −2.6705158E−09 |
| A12 | −2.4403673E−11 | −2.3287081E−09 | 2.2686236E−09 |
| A13 | 9.5875555E−12 | 3.4463213E−10 | −8.5542269E−10 |
| A14 | −1.3273457E−12 | −3.0254280E−11 | 1.2987809E−10 |
| A15 | 7.3200858E−14 | 1.2963671E−12 | −9.6643227E−12 |
| A16 | −1.4947280E−15 | −2.0974791E−14 | 3.3244045E−13 |

| Sn | 8 | 16 | 17 |
|---|---|---|---|
| KA | −2.2991422E+00 | 6.7409300E+00 | 1.1875829E+00 |
| A3 | −4.3597084E−05 | −2.8754099E−04 | 2.7662541E−04 |
| A4 | 1.4156819E−04 | 5.3966103E−04 | −1.4265376E−05 |
| A5 | −3.5853138E−04 | −2.8746651E−04 | 2.1070085E−04 |
| A6 | 1.6264602E−04 | 1.0706646E−04 | −1.1177099E−04 |
| A7 | −2.7110965E−05 | −1.6908268E−05 | 3.9307074E−05 |
| A8 | −3.0213814E−06 | −4.8604341E−07 | −5.9090627E−06 |
| A9 | 1.5820011E−06 | 6.1629113E−07 | 3.4414427E−09 |
| A10 | −5.5022631E−08 | 1.1247718E−08 | 1.0639519E−07 |
| A11 | −3.8115632E−08 | −9.6542992E−09 | −1.3343289E−09 |
| A12 | 4.9757660E−09 | −5.5139013E−09 | −6.9385593E−10 |
| A13 | −1.2269548E−10 | 1.5132446E−09 | −3.3604354E−10 |
| A14 | −3.3020748E−12 | −1.0634941E−10 | 8.1828674E−11 |
| A15 | −2.6671782E−12 | 1.5911914E−11 | −1.5985694E−12 |
| A16 | 3.7288018E−13 | −2.6054606E−12 | −2.8534991E−13 |

Example 5

Figure 11:
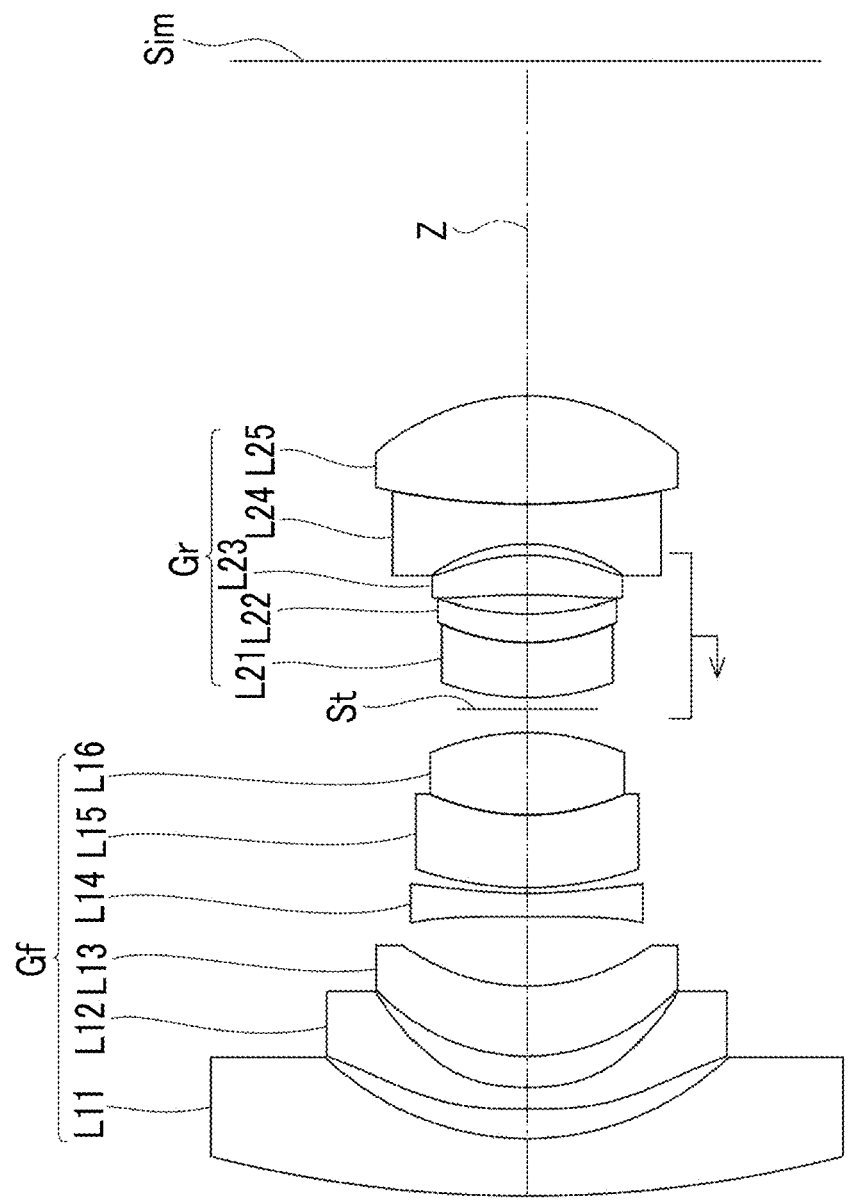
FIG. 11 is a cross-sectional view showing a configuration of an imaging lens of Example 5.

FIG. 11 is a cross-sectional view of a configuration of an imaging lens of Example 5 in a state where the infinite distance object is in focus. The imaging lens of Example 5 consists of, in order from the object side to the image side, the front group Gf that has a negative refractive power, the aperture stop St, and the rear group Gr that has a positive refractive power. The front group Gf consists of six lenses L11 to L16 in order from the the closest object, the aperture stop St and the lenses L21 to L23 move integrally toward the object side along the optical axis Z.

Figure 12:
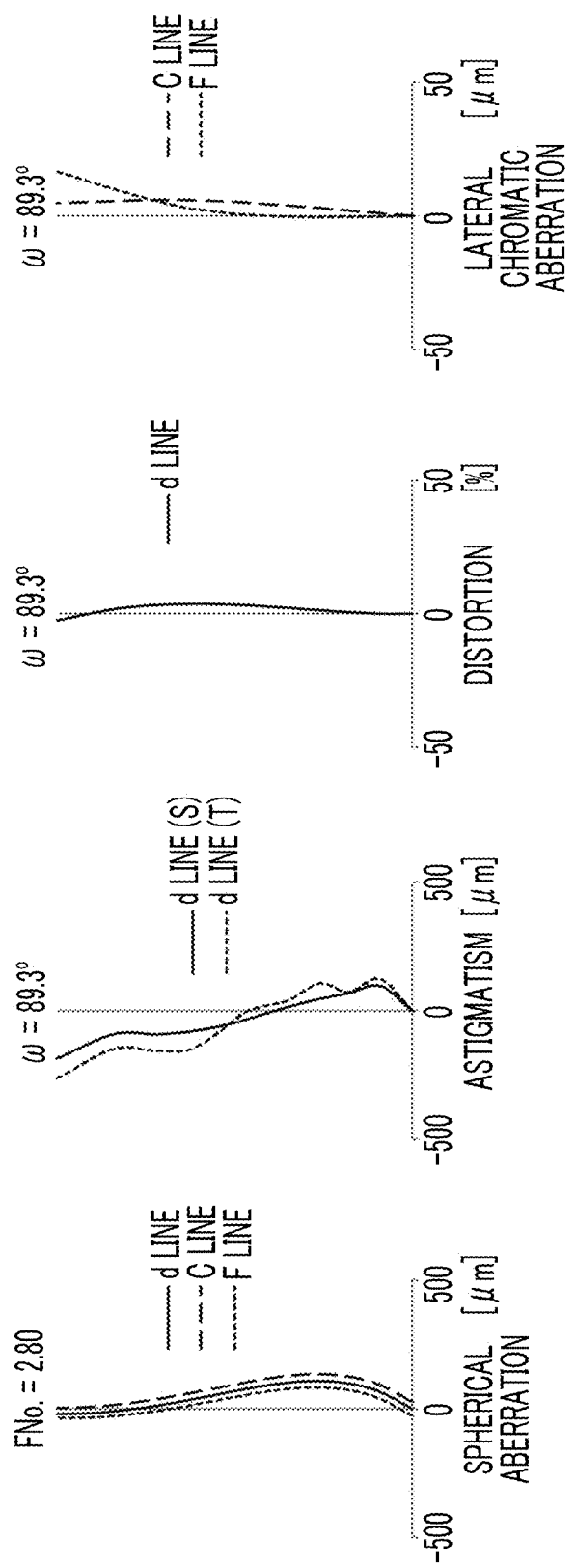
FIG. 12 is a diagram showing aberrations of the imaging lens of Example 5.

Regarding the imaging lens of Example 5, Table 17 shows basic lens data, Table 18 shows specifications, Table 19 shows variable surface spacings, and Table 20 shows aspherical coefficients thereof. Further, FIG. 12 shows aberration diagrams.

TABLE 17

Example 5

| Sn | R | D | Nd | νd | θgF |
|---|---|---|---|---|---|
| 1 | 64.6884 | 2.6649 | 1.61997 | 63.88 | 0.54252 |
| 2 | 14.4739 | 1.3747 | | | |
| *3 | 99.6762 | 1.0000 | 1.82080 | 42.71 | 0.56428 |
| *4 | 13.0726 | 1.4497 | | | |
| 5 | 10.1039 | 3.2535 | 1.92286 | 18.90 | 0.64960 |
| 6 | 10.4710 | 3.2181 | | | |
| *7 | −1110.4407 | 1.0822 | 1.77250 | 49.50 | 0.55193 |
| *8 | 24.3987 | 0.2682 | | | |
| 9 | 17.2749 | 3.3779 | 1.92119 | 23.96 | 0.62025 |
| 10 | 12.0239 | 3.8113 | 1.61772 | 49.81 | 0.56035 |
| 11 | −12.2746 | DD[11] | | | |

TABLE 17-continued

Example 5

| Sn | R | D | Nd | νd | θgF |
|---|---|---|---|---|---|
| 12(St) | ∞ | 0.5352 | | | |
| 13 | 12.6742 | 2.5573 | 1.98613 | 16.48 | 0.66558 |
| 14 | 10.4255 | 1.3222 | 1.63930 | 44.87 | 0.56843 |
| 15 | 14.4144 | 0.8473 | | | |
| *16 | −37.1891 | 1.8379 | 1.85135 | 40.10 | 0.56954 |
| *17 | −9.4282 | DD[17] | | | |
| 18 | −8.2168 | 1.8501 | 1.69895 | 30.05 | 0.60282 |
| 19 | 34.8630 | 5.0233 | 1.75500 | 52.32 | 0.54737 |
| 20 | −11.5008 | 15.5361 | | | |

TABLE 18

Example 5

| f | 10.36 |
|---|---|
| Bf | 15.54 |
| FNo. | 2.80 |
| 2ωm[°] | 178.6 |

TABLE 19

Example 5

| | Infinity | 0.05 times |
|---|---|---|
| DD[11] | 1.0930 | 0.7707 |
| DD[17] | 0.5194 | 0.8417 |

TABLE 20

Example 5

| Sn | 3 | 4 | 7 |
|---|---|---|---|
| KA | −3.3656718E+00 | 1.4119090E+00 | 3.1183955E+00 |
| A3 | 9.1068770E−04 | 1.0044266E−03 | 1.8062847E−04 |
| A4 | 4.2736945E−04 | 1.3144063E−03 | −1.4369068E−04 |
| A5 | 4.9040643E−04 | −4.5680656E−04 | −9.7235763E−05 |
| A6 | −1.6454450E−04 | 3.9404907E−04 | 2.8131202E−05 |
| A7 | 1.7410842E−05 | −1.4249505E−04 | −2.0188794E−06 |
| A8 | −4.0959597E−07 | 2.3242054E−05 | −6.4134441E−07 |
| A90 | −1.4926052E−08 | −1.5653310E−06 | 7.4078682E−09 |
| A10 | −4.4868906E−09 | −2.4836896E−08 | 2.2753789E−08 |
| A11 | 4.2018281E−10 | 1.3589104E−08 | −2.3867979E−09 |
| A12 | −2.4413756E−11 | −2.3121069E−09 | 2.3154764E−09 |
| A13 | 9.5971157E−12 | 3.4284510E−10 | −8.7308161E−10 |
| A14 | −1.3267183E−12 | −3.0035813E−11 | 1.3030082E−10 |
| A15 | 7.3085635E−14 | 1.3028243E−12 | −9.0865739E−12 |
| A16 | −1.4961786E−15 | −2.0814677E−14 | 2.5427438E−13 |

| Sn | 8 | 16 | 17 |
|---|---|---|---|
| KA | −2.2993387E+00 | 6.7408567E+00 | 1.1874400E+00 |
| A3 | 3.7804067E−05 | −3.5436480E−04 | 2.1477612E−04 |
| A4 | 1.1672170E−04 | 5.6099319E−04 | 7.5060755E−06 |
| A5 | −3.6066366E−04 | −2.7923145E−04 | 2.0965275E−04 |
| A6 | 1.6161486E−04 | 1.0504048E−04 | −1.1253216E−04 |
| A7 | −2.7413602E−05 | −1.7008899E−05 | 3.8953201E−05 |
| A8 | −3.1057989E−06 | −5.2800121E−07 | −5.9063021E−06 |
| A9 | 1.5762176E−06 | 6.0803311E−07 | 7.0957684E−09 |
| A10 | −5.3662471E−08 | 1.1307435E−08 | 1.0565156E−07 |
| A11 | −3.7585864E−08 | −9.6430631E−09 | −1.3295764E−09 |
| A12 | 4.9715936E−09 | −5.5383417E−09 | −7.3494175E−10 |
| A13 | −6.7055522E−11 | 1.5169017E−09 | −3.3927709E−10 |
| A14 | −1.0407049E−11 | −1.0696990E−10 | 8.0285344E−11 |
| A15 | −2.8368469E−12 | 1.5915821E−11 | −1.9046189E−12 |
| A16 | 3.3807144E−13 | −2.6998451E−12 | −3.5758042E−13 |

Example 6

Figure 13:
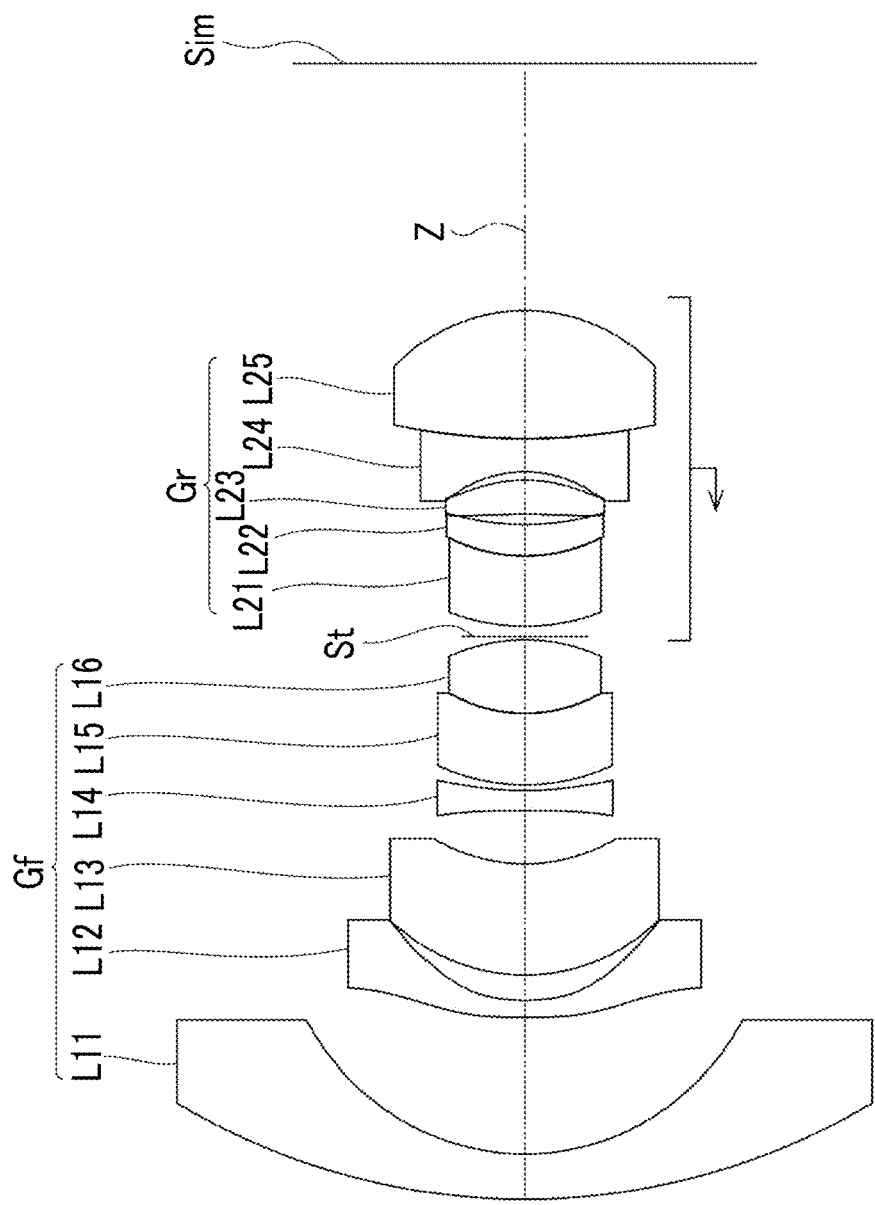
FIG. 13 is a cross-sectional view showing a configuration of an imaging lens of Example 6.

FIG. 13 is a cross-sectional view of a configuration of an imaging lens of Example 6 in a state where the infinite distance object is in focus. The imaging lens of Example 6 consists of, in order from the object side to the image side, the front group Gf that has a negative refractive power, the aperture stop St, and the rear group Gr that has a positive refractive power. The front group Gf consists of six lenses L11 to L16 in order from the the closest object, the aperture stop St and the rear group Gr (lenses L21 to L25) move integrally toward the object side along the optical axis Z.

Figure 14:
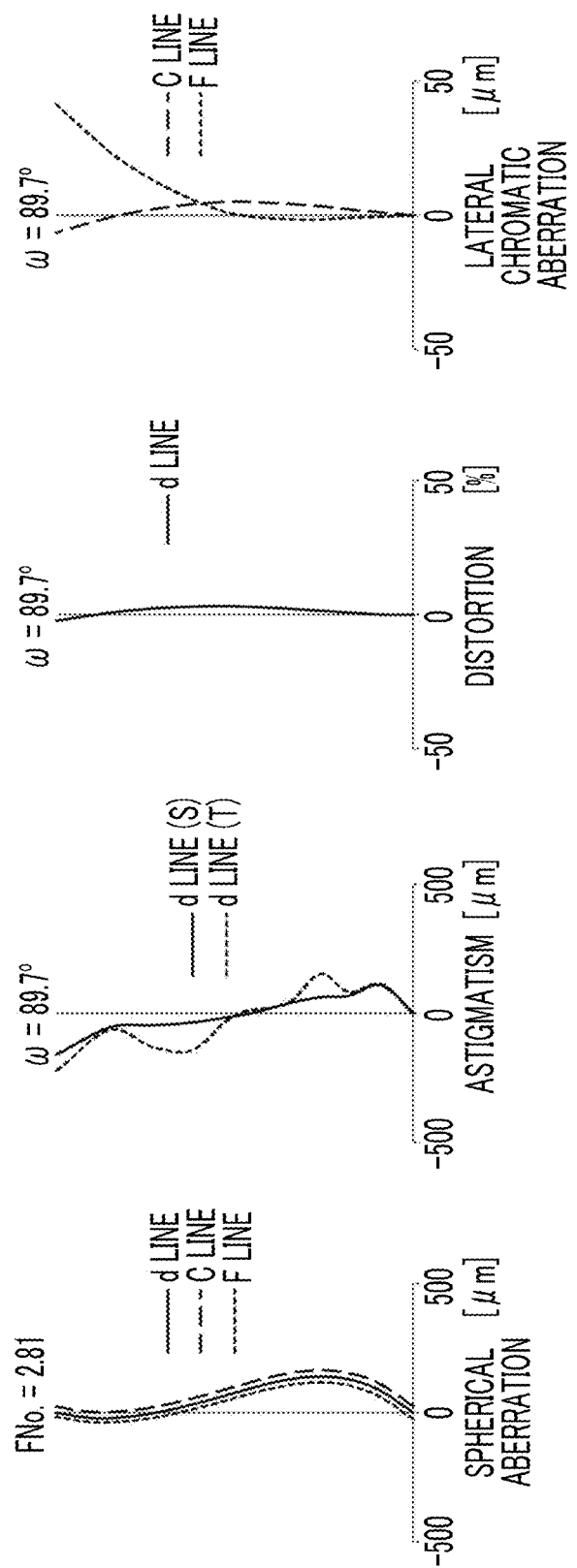
FIG. 14 is a diagram showing aberrations of the imaging lens of Example 6.

Regarding the imaging lens of Example 6, Table 21 shows basic lens data, Table 22 shows specifications, Table 23 shows variable surface spacings, and Table 24 shows aspherical coefficients thereof. Further, FIG. 14 shows aberration diagrams.

TABLE 21

Example 6

| Sn | R | D | Nd | vd | θgF |
|---|---|---|---|---|---|
| 1 | 43.2657 | 2.6652 | 1.80400 | 46.53 | 0.55775 |
| 2 | 15.3489 | 8.0627 | | | |
| *3 | 113.7313 | 1.0000 | 1.71300 | 53.94 | 0.54473 |
| *4 | 13.3093 | 1.4907 | | | |
| 5 | 12.1205 | 6.5631 | 1.96300 | 24.11 | 0.62126 |
| 6 | 11.4170 | 3.1375 | | | |
| *7 | −130.6344 | 1.1828 | 1.75501 | 51.16 | 0.54856 |
| *8 | 19.7228 | 0.3372 | | | |
| 9 | 13.1717 | 4.2139 | 2.00100 | 29.14 | 0.59974 |
| 10 | 9.7248 | 4.3370 | 1.60311 | 60.64 | 0.54148 |
| 11 | −11.6997 | DD[11] | | | |
| 12(St) | ∞ | 0.6000 | | | |
| 13 | 13.3719 | 4.0925 | 1.95906 | 17.47 | 0.65993 |
| 14 | 10.7656 | 1.8592 | 1.69930 | 51.11 | 0.55523 |
| 15 | 17.3428 | 0.6069 | | | |
| *16 | −50.2403 | 2.0100 | 1.88202 | 37.22 | 0.57699 |
| *17 | −9.3976 | 0.4940 | | | |
| 18 | −7.7673 | 1.9557 | 1.68893 | 31.07 | 0.60041 |
| 19 | 40.2925 | 7.5555 | 1.59522 | 67.73 | 0.54426 |
| 20 | −11.4267 | DD[20] | | | |

TABLE 22

Example 6

| | |
|---|---|
| f | 10.31 |
| Bf | 14.57 |
| FNo. | 2.81 |
| 2ωm[°] | 179.4 |

TABLE 23

Example 6

| | Infinity | 0.05 times |
|---|---|---|
| DD[11] | 0.2002 | −0.3150 |
| DD[20] | 14.5681 | 15.0833 |

TABLE 24

Example 6

| Sn | 3 | 4 | 7 |
|---|---|---|---|
| KA | −1.9429358E+01 | 1.5652266E+00 | −1.3197319E+01 |
| A3 | 3.7472754E−04 | 4.1067279E−04 | 1.1613268E−04 |

TABLE 24-continued

Example 6

| A4 | 3.6961455E−04 | 1.1760737E−03 | −1.3973830E−04 |
|---|---|---|---|
| A5 | 4.9058778E−04 | −4.6566748E−04 | −1.0038240E−04 |
| A6 | −1.6448475E−04 | 3.9394176E−04 | 2.8716497E−05 |
| A7 | 1.7407930E−05 | −1.4263800E−04 | −1.2630957E−06 |
| A8 | −4.0732664E−07 | 2.3257677E−05 | −6.8323780E−07 |
| A9 | −1.4671064E−08 | −1.5630856E−06 | 1.3181986E−08 |
| A10 | −4.4832589E−09 | −2.4934097E−08 | 1.9709953E−08 |
| A11 | 4.2338410E−10 | 1.3545504E−08 | −2.3377095E−09 |
| A12 | −2.4750005E−11 | −2.3078942E−09 | 2.2887325E−09 |
| A13 | 9.5618675E−12 | 3.4496344E−10 | −8.5644144E−10 |
| A14 | −1.3306722E−12 | −3.0240296E−11 | 1.2998551E−10 |
| A15 | 7.3312730E−14 | 1.2828140E−12 | −9.6210740E−12 |
| A16 | −1.4683170E−15 | −1.9901381E−14 | 3.1425568E−13 |

| Sn | 8 | 16 | 17 |
|---|---|---|---|
| KA | −2.4428996E+00 | 5.8898228E+00 | 1.1684053E+00 |
| A3 | 2.8102635E−05 | −3.2777886E−04 | 2.2943223E−04 |
| A4 | 1.2328517E−04 | 5.4152783E−04 | −1.5165637E−05 |
| A5 | −3.6762301E−04 | −2.8024858E−04 | 2.0237259E−04 |
| A6 | 1.6249762E−04 | 1.0229198E−04 | −1.1558205E−04 |
| A7 | −2.6577066E−05 | −1.6849748E−05 | 3.8855213E−05 |
| A8 | −2.8348969E−06 | −4.7270127E−07 | −5.7288855E−06 |
| A9 | 1.5212200E−06 | 6.2157198E−07 | 7.2305393E−09 |
| A10 | −5.9313485E−08 | 9.7309489E−09 | 1.0614445E−07 |
| A11 | −3.7003926E−08 | −1.0130245E−08 | −2.3724120E−09 |
| A12 | 4.9022342E−09 | −5.5545018E−09 | −8.9453616E−10 |
| A13 | −5.2972943E−11 | 1.5153905E−09 | −3.2402062E−10 |
| A14 | −8.4990989E−12 | −1.0901659E−10 | 8.0532191E−11 |
| A15 | −2.1916182E−12 | 1.6264125E−11 | −1.1077188E−12 |
| A16 | 2.1128538E−13 | −2.4613670E−12 | −2.0676536E−13 |

Example 7

Figure 15:
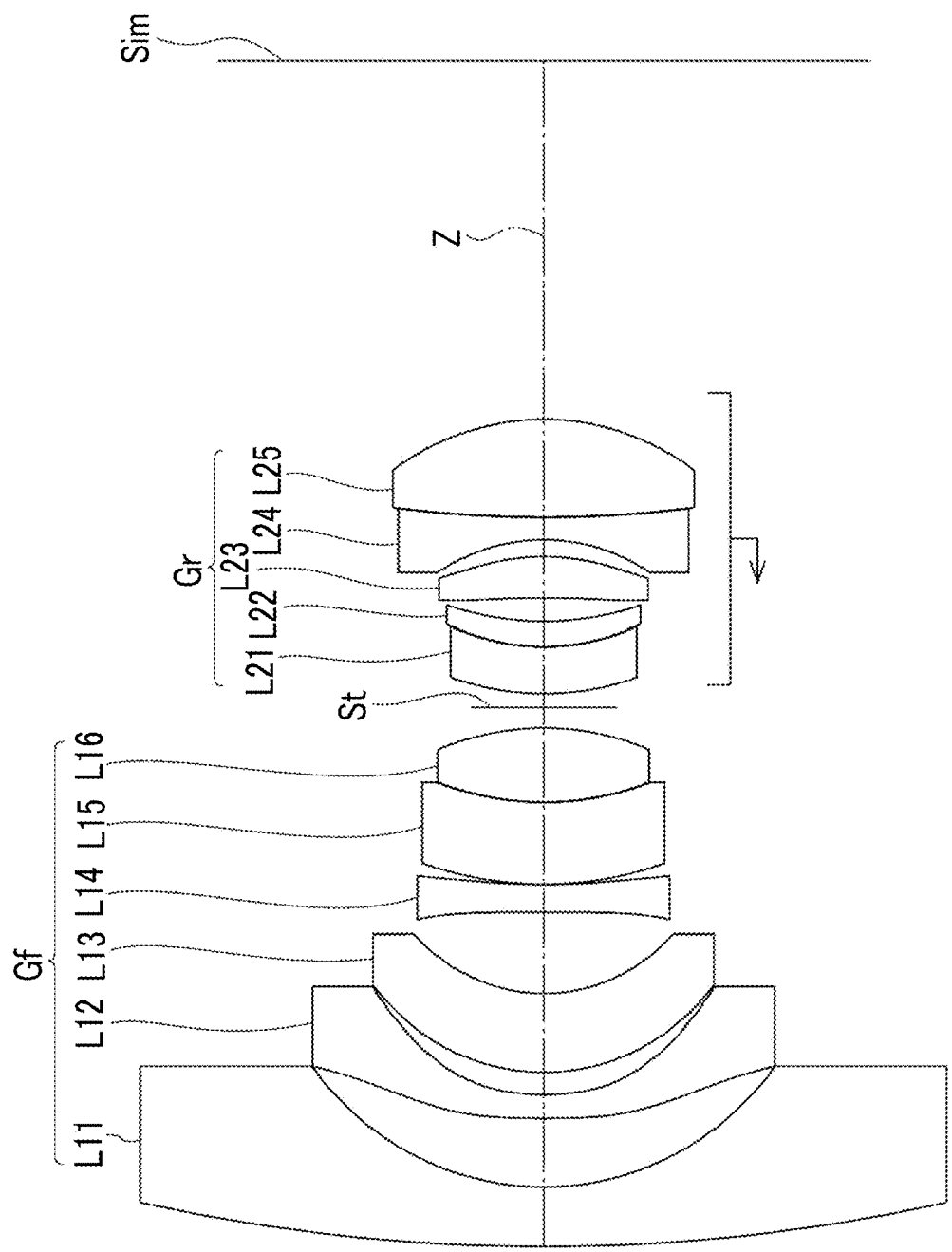
FIG. 15 is a cross-sectional view showing a configuration of an imaging lens of Example 7.

FIG. 15 is a cross-sectional view of a configuration of an imaging lens of Example 7 in a state where the infinite distance object is in focus. The imaging lens of Example 7 consists of, in order from the object side to the image side, the front group Gf that has a negative refractive power, the aperture stop St, and the rear group Gr that has a positive refractive power. The front group Gf consists of six lenses L11 to L16 in order from the object side to the image side. The rear group Gr consists of five lenses L21 to L25 in order from the object to the image side. During focusing from the infinite distance object to the closest object, the rear group Gr (lenses L21 to L25) moves integrally toward the object side along the optical axis Z.

Figure 16:
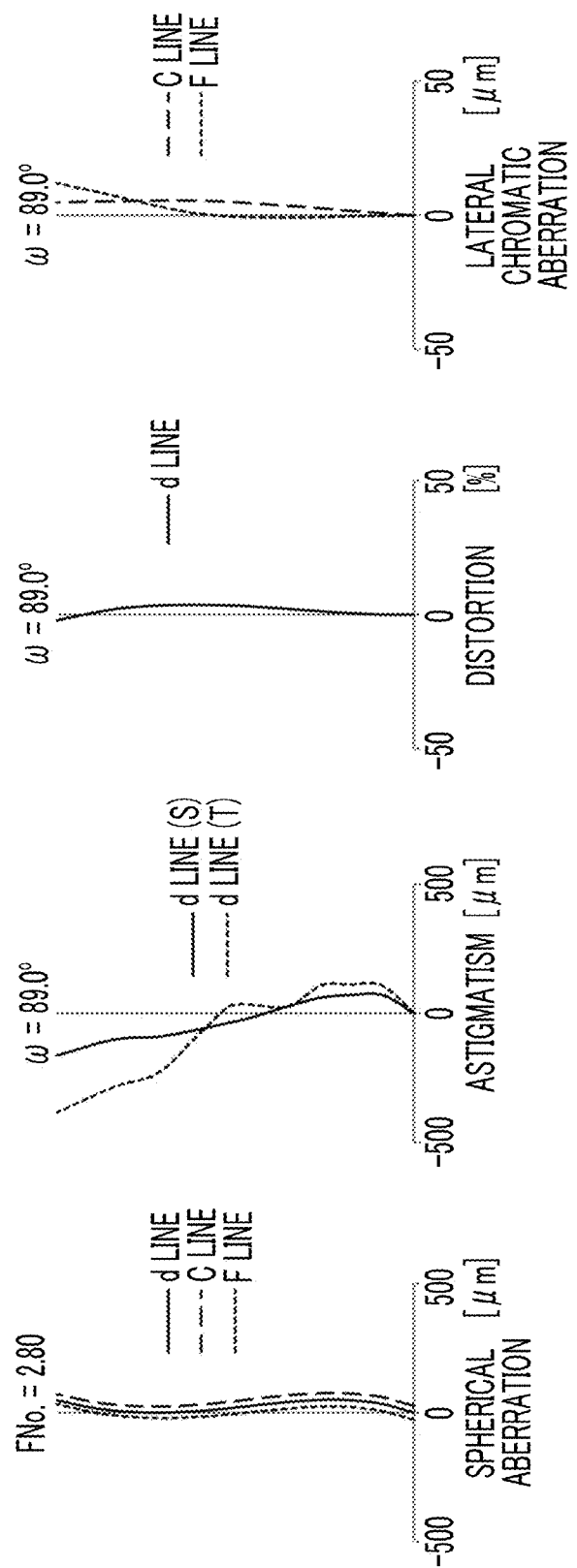
FIG. 16 is a diagram showing aberrations of the imaging lens of Example 7.

Regarding the imaging lens of Example 7, Table 25 shows basic lens data, Table 26 shows specifications, Table 27 shows variable surface spacings, and Table 28 shows aspherical coefficients thereof. Further, FIG. 16 shows aberration diagrams.

TABLE 25

Example 7

| Sn | R | D | Nd | vd | θgF |
|---|---|---|---|---|---|
| 1 | 85.3519 | 2.5054 | 1.48749 | 70.24 | 0.53007 |
| 2 | 12.7455 | 2.8901 | | | |
| *3 | 80.5176 | 1.0000 | 1.49710 | 81.56 | 0.53848 |
| *4 | 12.3799 | 0.9344 | | | |
| 5 | 9.4369 | 3.3160 | 1.95906 | 17.47 | 0.65993 |
| 6 | 7.6656 | 3.4268 | | | |
| *7 | −388.5324 | 1.1586 | 1.80139 | 45.45 | 0.55814 |
| *8 | 28.4099 | 0.0112 | | | |
| 9 | 16.2659 | 3.4494 | 1.96300 | 24.11 | 0.62126 |
| 10 | 13.2441 | 3.1318 | 1.58313 | 59.37 | 0.54345 |
| 11 | −12.1906 | 0.8656 | | | |

TABLE 25-continued

Example 7

| Sn | R | D | Nd | vd | θgF |
|---|---|---|---|---|---|
| 12(St) | ∞ | DD[12] | | | |
| 13 | 12.4406 | 1.9703 | 1.95906 | 17.47 | 0.65993 |
| 14 | 10.1884 | 1.0410 | 1.72916 | 54.68 | 0.54451 |
| 15 | 13.6121 | 0.9795 | | | |
| *16 | −41.5731 | 1.7371 | 1.85400 | 40.38 | 0.56890 |
| *17 | −9.7858 | 0.7083 | | | |
| 18 | −8.5268 | 0.9428 | 1.63980 | 34.47 | 0.59233 |
| 19 | 52.8623 | 4.1200 | 1.72916 | 54.68 | 0.54451 |
| 20 | −11.2981 | DD[20] | | | |

TABLE 26

Example 7

| | |
|---|---|
| f | 10.35 |
| Bf | 15.10 |
| FNo. | 2.80 |
| 2ωm[°] | 178.0 |

TABLE 27

Example 7

| | Infinity | 0.05 times |
|---|---|---|
| DD[12] | 0.5758 | 0.0541 |
| DD[20] | 15.0971 | 15.6188 |

TABLE 28

Example 7

| Sn | 3 | 4 | 7 |
|---|---|---|---|
| KA | −3.3265333E+00 | 1.4313127E+00 | 3.1421118E+00 |
| A3 | 5.1277252E−04 | 5.7906928E−04 | 1.4894419E−04 |
| A4 | 4.1633686E−04 | 1.3988034E−03 | −2.5970119E−04 |
| A5 | 4.8922666E−04 | −4.9328584E−04 | −3.3211712E−05 |
| A6 | −1.6621279E−04 | 3.9284007E−04 | 1.3440429E−05 |
| A7 | 1.7648142E−05 | −1.4239558E−04 | −1.1487541E−06 |
| A8 | −4.0808611E−07 | 2.3365991E−05 | −6.0229595E−07 |
| A9 | −1.5266966E−08 | −1.5783639E−06 | 1.2028733E−08 |
| A10 | −4.5023036E−09 | −2.3194605E−08 | 3.0502874E−08 |
| A11 | 4.1674819E−10 | 1.3450329E−08 | −3.6034348E−09 |
| A12 | −2.4541958E−11 | −2.3173469E−09 | 2.1081754E−09 |
| A13 | 9.5817533E−12 | 3.4362469E−10 | −8.9100788E−10 |
| A14 | −1.3236874E−12 | −3.0226516E−11 | 1.3704273E−10 |
| A15 | 7.3191914E−14 | 1.2880826E−12 | −7.5824803E−12 |
| A16 | −1.4994503E−15 | −1.6932332E−14 | 3.9737915E−14 |

| Sn | 8 | 16 | 17 |
|---|---|---|---|
| KA | −2.2874784E+00 | 6.7748717E+00 | 1.2090548E+00 |
| A3 | −2.0092821E−04 | −1.5940921E−04 | 3.6162477E−04 |
| A4 | 2.5683399E−04 | 5.7954990E−04 | −2.1878011E−05 |
| A5 | −4.0901258E−04 | −2.7551686E−04 | 2.3131922E−04 |
| A6 | 1.7473296E−04 | 1.0525612E−04 | −1.1502163E−04 |
| A7 | −2.9377087E−05 | −1.7228186E−05 | 3.8646394E−05 |
| A8 | −3.1307160E−06 | −5.9210935E−07 | −5.9195514E−06 |
| A9 | 1.6093121E−06 | 6.2018007E−07 | 6.4701071E−09 |
| A10 | −5.0412724E−08 | 9.1355228E−09 | 1.0911851E−07 |
| A11 | −3.7776791E−08 | −9.5822342E−09 | −1.2203809E−09 |
| A12 | 4.8571198E−09 | −5.4752015E−09 | −7.9839053E−10 |
| A13 | −8.9484055E−11 | 1.5253070E−09 | −3.4392065E−10 |
| A14 | −1.2174811E−11 | −1.0680307E−10 | 8.0835631E−11 |
| A15 | −1.3506176E−12 | 1.5734060E−11 | −1.8108470E−12 |
| A16 | 2.7258135E−13 | −2.8328714E−12 | −4.2178007E−13 |

Example 8

Figure 17:
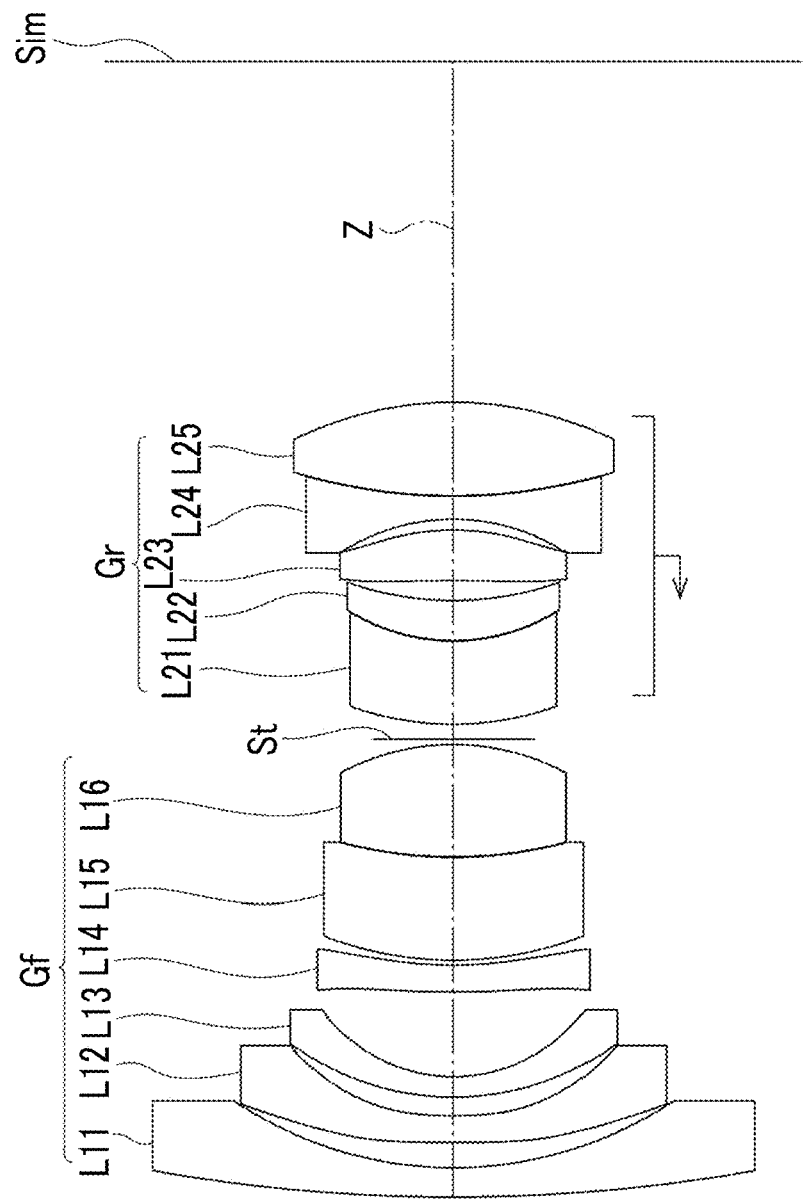
FIG. 17 is a cross-sectional view showing a configuration of an imaging lens of Example 8.

FIG. 17 is a cross-sectional view of a configuration of an imaging lens of Example 8 in a state where the infinite distance object is in focus. The imaging lens of Example 8 consists of, in order from the object side to the image side, the front group Gf that has a negative refractive power, the aperture stop St, and the rear group Gr that has a positive refractive power. The front group Gf consists of six lenses L11 to L16 in order from the object side to the image side. The rear group Gr consists of five lenses L21 to L25 in order from the object to the image side. During focusing from the infinite distance object to the closest object, the rear group Gr (lenses L21 to L25) moves integrally toward the object side along the optical axis Z.

Figure 18:
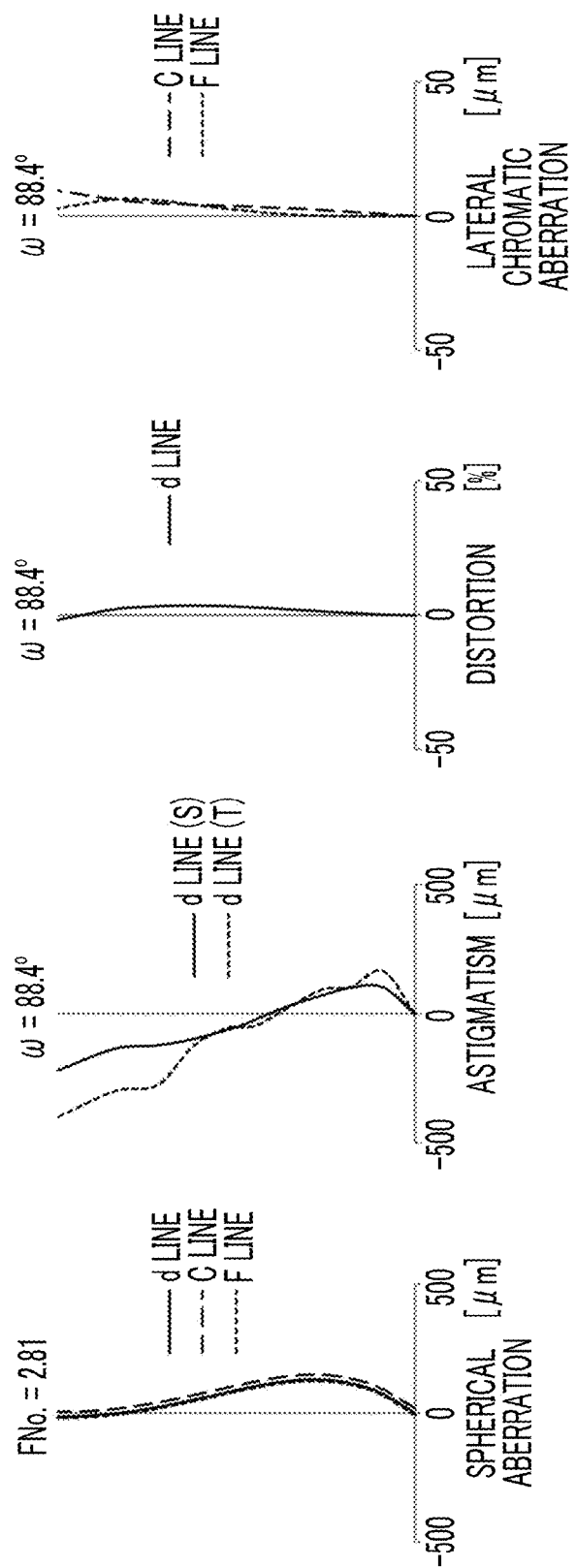
FIG. 18 is a diagram showing aberrations of the imaging lens of Example 8.

Regarding the imaging lens of Example 8, Table 29 shows basic lens data, Table 30 shows specifications, Table 31 shows variable surface spacings, and Table 32 shows aspherical coefficients thereof. Further, FIG. 18 shows aberration diagrams.

TABLE 29

Example 8

| Sn | R | D | Nd | vd | θgF |
|---|---|---|---|---|---|
| 1 | 73.2374 | 1.1554 | 1.57135 | 52.95 | 0.55544 |
| 2 | 16.7655 | 1.0000 | | | |
| *3 | −596.4827 | 1.0429 | 1.62263 | 58.16 | 0.53913 |
| *4 | 18.4514 | 0.7345 | | | |
| 5 | 11.7081 | 0.8000 | 1.43875 | 94.66 | 0.53402 |
| 6 | 6.8564 | 3.3317 | | | |
| *7 | 38.2901 | 1.0537 | 1.68948 | 31.02 | 0.59874 |
| *8 | 16.4409 | 0.1926 | | | |
| 9 | 15.4092 | 4.0178 | 1.95906 | 17.47 | 0.65993 |
| 10 | 18.6792 | 4.4237 | 1.43875 | 94.94 | 0.53433 |
| 11 | −10.1630 | 0.2003 | | | |
| 12(St) | ∞ | DD[12] | | | |
| 13 | 13.1404 | 3.2775 | 1.95906 | 17.47 | 0.65993 |
| 14 | 8.4586 | 1.5826 | 1.95375 | 32.32 | 0.59056 |
| 15 | 13.6351 | 0.7782 | | | |
| *16 | −82.1447 | 1.9938 | 1.72903 | 54.04 | 0.54474 |
| *17 | −9.6097 | 0.4213 | | | |
| 18 | −8.8184 | 0.9159 | 1.59551 | 39.24 | 0.58043 |
| 19 | 23.6165 | 3.6822 | 1.72916 | 54.68 | 0.54451 |
| 20 | −15.3592 | DD[20] | | | |

TABLE 30

Example 8

| | |
|---|---|
| f | 10.36 |
| Bf | 13.36 |
| FNo. | 2.81 |
| 2ωm[°] | 176.8 |

TABLE 31

Example 8

| | Infinity | 0.05 times |
|---|---|---|
| DD[12] | 0.6002 | 0.0815 |
| DD[20] | 13.3555 | 13.8742 |

TABLE 32

Example 8

| Sn | 3 | 4 | 7 |
|---|---|---|---|
| KA | 7.6107354E+02 | 1.6441240E+00 | 6.3037097E+00 |
| A3 | 1.2133737E−03 | 1.0768179E−03 | −5.1383243E−05 |
| A4 | 2.1186708E−04 | 1.2670598E−03 | −1.5477494E−04 |
| A5 | 4.9729745E−04 | −4.8643401E−04 | −1.0621058E−04 |
| A6 | −1.6371966E−04 | 3.9520932E−04 | 2.6028662E−05 |
| A7 | 1.7414233E−05 | −1.4344566E−04 | −1.9387719E−06 |
| A8 | −4.0354400E−07 | 2.3402243E−05 | −6.0458587E−07 |
| A9 | −1.4666357E−08 | −1.5605333E−06 | 1.3444776E−08 |
| A10 | −4.5052291E−09 | −2.3170489E−08 | 2.4504830E−08 |
| A11 | 4.2301926E−10 | 1.3347199E−08 | −2.4285996E−09 |
| A12 | −2.4761754E−11 | −2.3075893E−09 | 2.3293490E−09 |
| A13 | 9.6213203E−12 | 3.4252002E−10 | −8.7515470E−10 |
| A14 | −1.3338187E−12 | −3.1817175E−11 | 1.3036561E−10 |
| A15 | 7.2097208E−14 | 1.4854935E−12 | −1.0116043E−11 |
| A16 | −1.3674987E−15 | −9.9886728E−15 | 3.8247607E−13 |

| Sn | 8 | 16 | 17 |
|---|---|---|---|
| KA | −2.1154684E+00 | 8.8973907E+00 | 1.3209933E+00 |
| A3 | −1.8206538E−04 | −5.8042249E−04 | 3.7158491E−04 |
| A4 | 1.0837081E−04 | 7.5379702E−04 | 7.6248128E−06 |
| A5 | −3.6624396E−04 | −2.9356417E−04 | 2.3038464E−04 |
| A6 | 1.6342415E−04 | 1.0525572E−04 | −1.1081637E−04 |
| A7 | −2.8078966E−05 | −1.6776585E−05 | 3.8775189E−05 |
| A8 | −3.0627888E−06 | −5.2380406E−07 | −5.8404147E−06 |
| A9 | 1.5839454E−06 | 6.2829075E−07 | −9.5231242E−09 |
| A10 | −4.8368112E−08 | 1.5215079E−08 | 1.0983491E−07 |
| A11 | −3.7441908E−08 | −9.6467492E−09 | −9.8137269E−10 |
| A12 | 4.6830645E−09 | −5.5909715E−09 | −6.7639654E−10 |
| A13 | −6.7473424E−11 | 1.5081937E−09 | −3.1729094E−10 |
| A14 | −9.4399356E−12 | −1.1188783E−10 | 7.9119955E−11 |
| A15 | −2.1293784E−12 | 1.6125966E−11 | −1.9163445E−12 |
| A16 | 2.7611921E−13 | −2.5603166E−12 | −3.4295439E−13 |

Example 9

Figure 19:
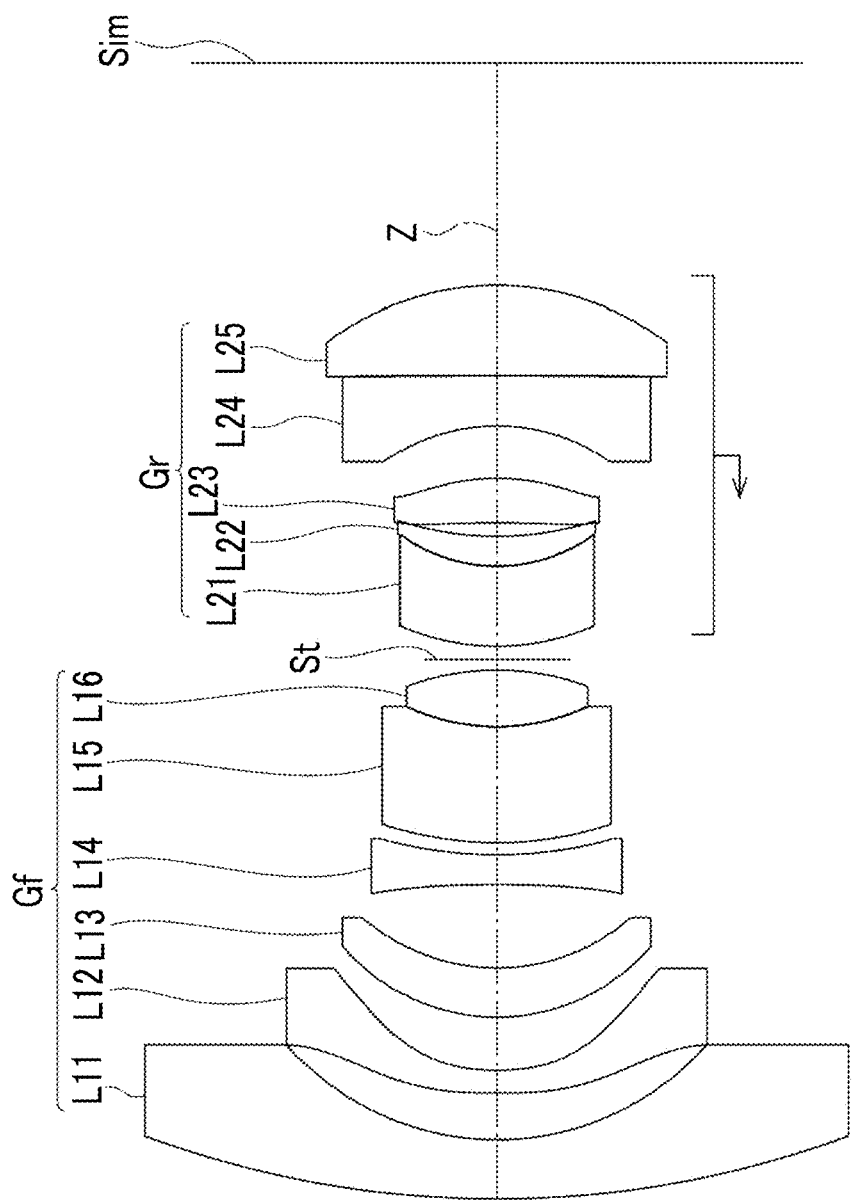
FIG. 19 is a cross-sectional view showing a configuration of an imaging lens of Example 9.

FIG. 19 is a cross-sectional view of a configuration of an imaging lens of Example 9 in a state where the infinite distance object is in focus. The imaging lens of Example 9 consists of, in order from the object side to the image side, the front group Gf that has a negative refractive power, the aperture stop St, and the rear group Gr that has a positive refractive power. The front group Gf consists of six lenses L11 to L16 in order from the object side to the image side. The rear group Gr consists of five lenses L21 to L25 in order from the object to the image side. During focusing from the infinite distance object to the closest object, the rear group Gr (lenses L21 to L25) moves integrally toward the object side along the optical axis Z.

Figure 20:
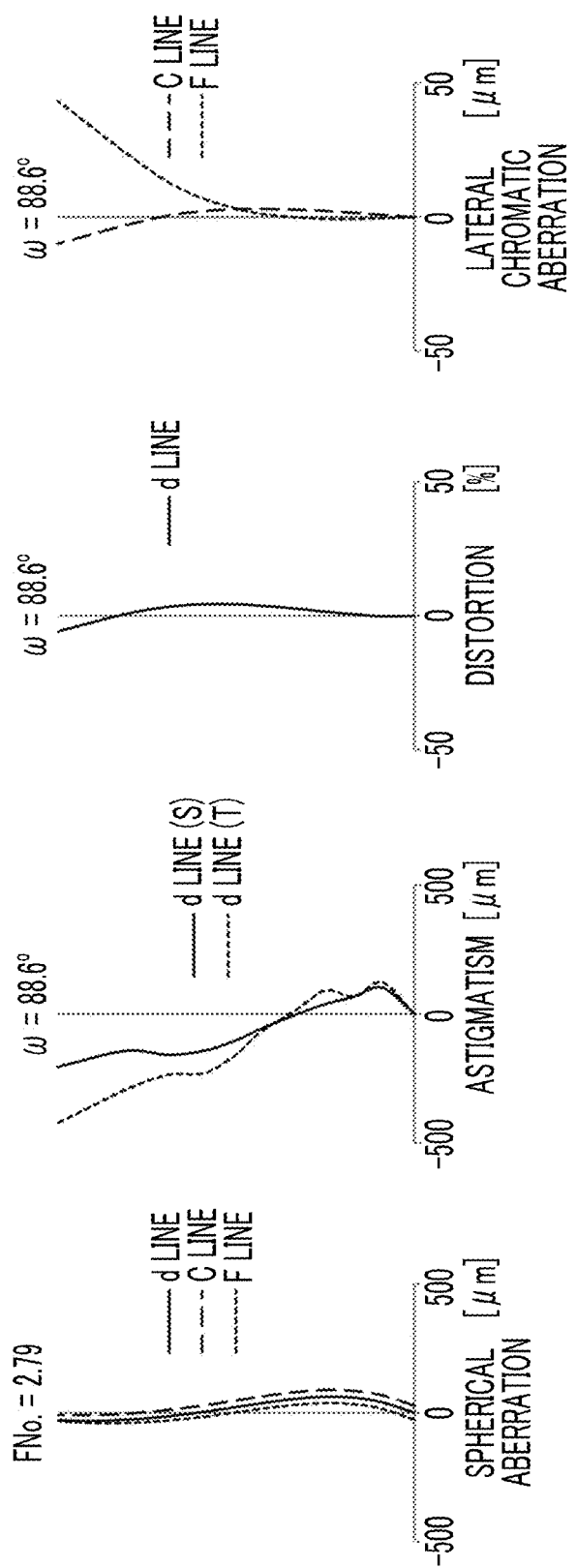
FIG. 20 is a diagram showing aberrations of the imaging lens of Example 9.

Regarding the imaging lens of Example 9, Table 33 shows basic lens data, Table 34 shows specifications, Table 35 shows variable surface spacings, and Table 36 shows aspherical coefficients thereof. Further, FIG. 20 shows aberration diagrams.

TABLE 33

Example 9

| Sn | R | D | Nd | vd | θgF |
|---|---|---|---|---|---|
| 1 | 49.7169 | 2.6649 | 1.49700 | 81.54 | 0.53748 |
| 2 | 13.5614 | 2.1148 | | | |
| *3 | 51.4567 | 1.0268 | 1.69680 | 55.46 | 0.54262 |
| *4 | 11.9920 | 2.3852 | | | |
| 5 | 9.8297 | 2.2182 | 2.00100 | 29.14 | 0.59974 |
| 6 | 9.8727 | 3.7226 | | | |
| *7 | −64.9376 | 1.3475 | 1.49710 | 81.56 | 0.53848 |

TABLE 33-continued

Example 9

| Sn | R | D | Nd | vd | θgF |
|---|---|---|---|---|---|
| *8 | 20.4854 | 0.5437 | | | |
| 9 | 17.6329 | 5.2299 | 1.96300 | 24.11 | 0.62126 |
| 10 | 10.4041 | 2.5586 | 1.60311 | 60.64 | 0.54148 |
| 11 | −12.6649 | 0.4760 | | | |
| 12(St) | ∞ | DD[12] | | | |
| 13 | 11.9069 | 3.6049 | 1.95375 | 32.32 | 0.59056 |
| 14 | 8.0053 | 1.3503 | 1.78800 | 47.37 | 0.55598 |
| 15 | 15.7402 | 0.6091 | | | |
| *16 | −54.2183 | 2.0058 | 1.80610 | 40.73 | 0.56940 |
| *17 | −10.1755 | 2.3627 | | | |
| 18 | −9.5471 | 2.2646 | 1.74000 | 28.30 | 0.60790 |
| 19 | −663.1708 | 4.0426 | 1.75500 | 52.32 | 0.54757 |
| 20 | −13.7554 | DD[20] | | | |

TABLE 34

Example 9

| | |
|---|---|
| f | 10.80 |
| Bf | 10.01 |
| FNo. | 2.79 |
| 2ωm[°] | 177.2 |

TABLE 35

Example 9

| | Infinity | 0.05 times |
|---|---|---|
| DD[12] | 0.6000 | 0.0597 |
| DD[20] | 10.0113 | 10.5516 |

TABLE 36

Example 9

| Sn | 3 | 4 | 7 |
|---|---|---|---|
| KA | −3.8423250E+00 | 1.3993535E+00 | 2.4889624E+00 |
| A3 | 6.9346998E−04 | 9.9508542E−04 | 2.4962587E−04 |
| A4 | 4.4198015E−04 | 1.2888870E−03 | −1.3972247E−04 |
| A5 | 4.8641218E−04 | −4.6234350E−04 | −8.8410269E−05 |
| A6 | −1.6472213E−04 | 3.9372888E−04 | 3.1219691E−05 |
| A7 | 1.7397975E−05 | −1.4260740E−04 | −1.3723563E−06 |
| A8 | −4.0996031E−07 | 2.3245139E−05 | −5.9116929E−07 |
| A9 | −1.5027513E−08 | −1.5632738E−06 | −2.4106233E−08 |
| A10 | −4.4916050E−09 | −2.6204838E−08 | 2.1453837E−08 |
| A11 | 4.2056427E−10 | 1.3820548E−08 | −2.3821349E−09 |
| A12 | −2.4578703E−11 | −2.3295038E−09 | 2.2975152E−09 |
| A13 | 9.6359281E−12 | 3.4439142E−10 | −8.7039307E−10 |
| A14 | −1.3264038E−12 | −3.0191368E−11 | 1.2789196E−10 |
| A15 | 7.2734461E−14 | 1.2947056E−12 | −7.6790475E−12 |
| A16 | −1.4767572E−15 | −2.1050417E−14 | 1.1970268E−13 |

| Sn | 8 | 16 | 17 |
|---|---|---|---|
| KA | −2.3312973E+00 | 6.1929924E+00 | 1.1360746E+00 |
| A3 | −1.8642656E−05 | −1.5778292E−04 | 3.1624296E−04 |
| A4 | 2.1244279E−04 | 5.6403685E−04 | 1.2335393E−05 |
| A5 | −3.4063716E−04 | −2.8219761E−04 | 2.0807406E−04 |
| A6 | 1.6349640E−04 | 1.0429342E−04 | −1.1334257E−04 |
| A7 | −2.7656300E−05 | −1.6480384E−05 | 3.9184222E−05 |
| A8 | −3.0550082E−06 | −5.1868999E−07 | −5.9038338E−06 |
| A9 | 1.5807954E−06 | 6.1191051E−07 | 1.1252181E−08 |
| A10 | −4.5504562E−08 | 1.2312066E−08 | 1.0505227E−07 |
| A11 | −4.0264316E−08 | −9.5073460E−09 | −1.3425138E−09 |
| A12 | 5.6728536E−09 | −5.5377446E−09 | −6.9983430E−10 |
| A13 | −3.5102927E−10 | 1.4927624E−09 | −3.5147090E−10 |
| A14 | 1.0406425E−11 | −1.2373516E−10 | 8.1808750E−11 |

TABLE 36-continued

| | | | |
|---|---|---|---|
| A15 | 3.5954705E−12 | 2.0361216E−11 | −1.7168203E−12 |
| A16 | −4.1138208E−13 | −2.8226907E−12 | −2.8289710E−13 |

Example 10

Figure 21:
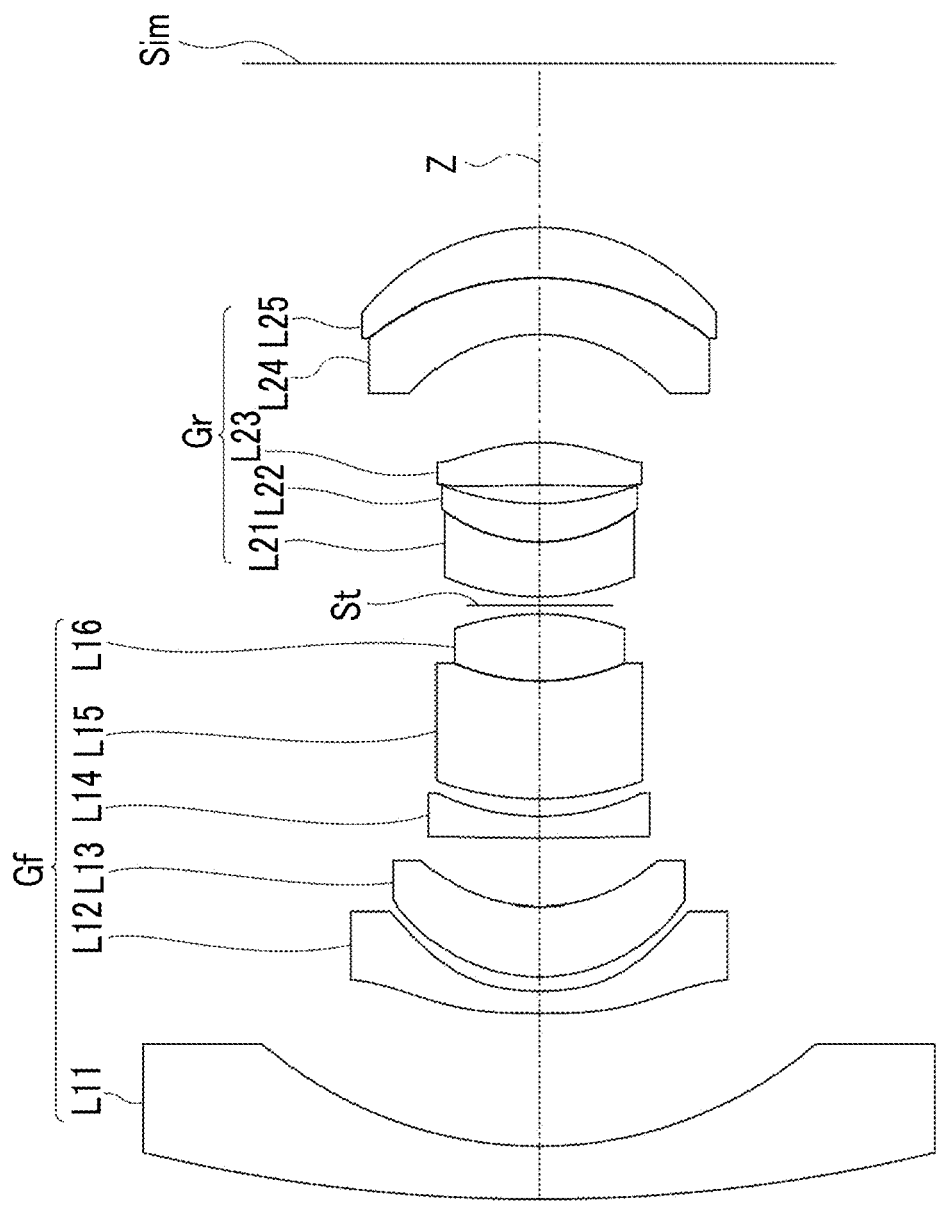
FIG. 21 is a cross-sectional view showing a configuration of an imaging lens of Example 10.

FIG. 21 is a cross-sectional view of a configuration of an imaging lens of Example 10 in a state where the infinite distance object is in focus. The imaging lens of Example 10 consists of, in order from the object side to the image side, the front group Gf that has a negative refractive power, the aperture stop St, and the rear group Gr that has a positive refractive power. The front group Gf consists of six lenses L11 to L16 in order from the object side to the image side. The rear group Gr consists of five lenses L21 to L25 in order from the object to the image side.

Figure 22:
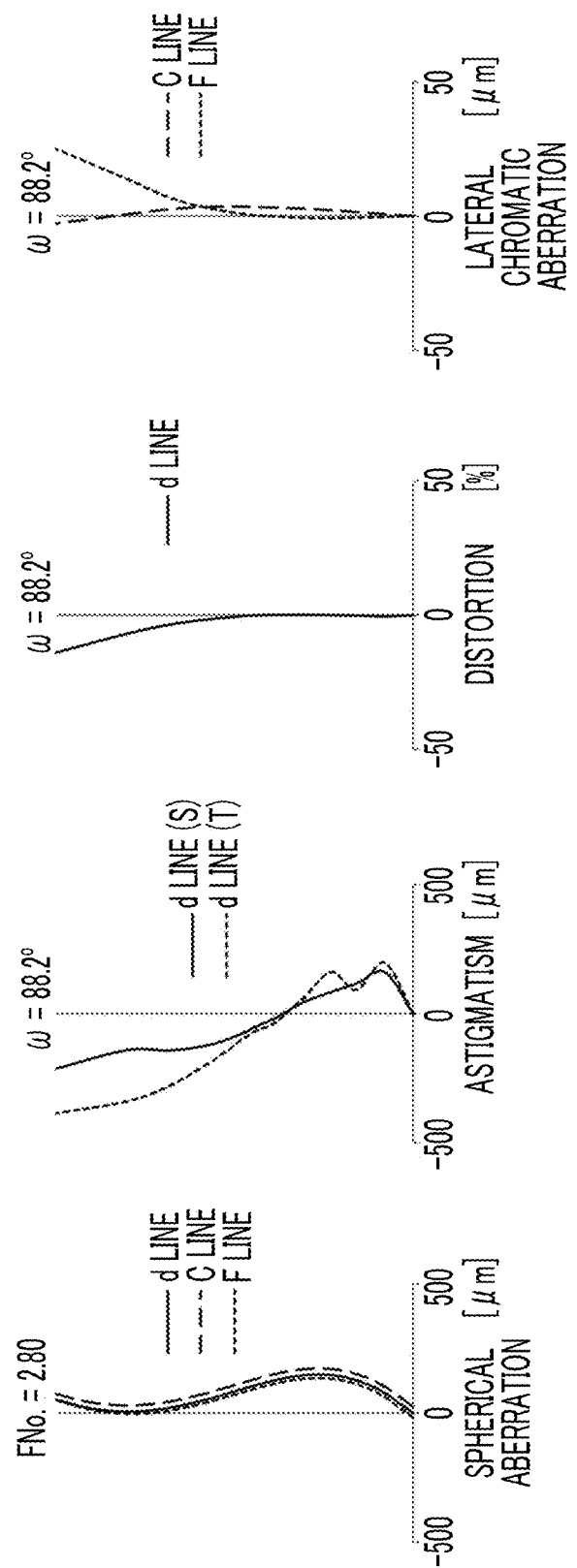
FIG. 22 is a diagram showing aberrations of the imaging lens of Example 10.

Regarding the imaging lens of Example 10, Table 37 shows basic lens data, Table 38 shows specifications, and Table 39 shows aspherical coefficients thereof. Further, FIG. 22 shows aberration diagrams.

TABLE 37

Example 10

| Sn | R | D | Nd | vd | θgF |
|---|---|---|---|---|---|
| 1 | 85.1790 | 2.4434 | 1.65160 | 58.54 | 0.53901 |
| 2 | 21.2131 | 6.1299 | | | |
| *3 | 75.9428 | 1.0229 | 1.73077 | 40.50 | 0.57149 |
| *4 | 13.2766 | 0.6572 | | | |
| 5 | 8.7689 | 3.2215 | 2.00100 | 29.14 | 0.59974 |
| 6 | 8.7021 | 3.1406 | | | |
| * | 98.8820 | 1.0000 | 1.49710 | 81.56 | 0.53848 |
| *8 | 11.6656 | 0.8080 | | | |
| 9 | 15.4110 | 5.4349 | 2.00100 | 29.14 | 0.59974 |
| 10 | 10.6540 | 3.0843 | 1.59522 | 67.73 | 0.54426 |
| 11 | −12.6618 | 0.4000 | | | |
| 12(St) | ∞ | 0.4000 | | | |
| 13 | 11.7858 | 2.5257 | 1.96300 | 24.11 | 0.62126 |
| 14 | 8.0865 | 1.7719 | 1.88300 | 40.76 | 0.56679 |
| 15 | 13.6254 | 0.8416 | | | |
| *16 | −85.0399 | 1.9658 | 1.75500 | 52.32 | 0.54757 |
| *17 | −10.2331 | 4.9938 | | | |
| 18 | −8.5233 | 2.5594 | 1.95906 | 17.47 | 0.65993 |
| 19 | −13.6226 | 2.3271 | 1.72916 | 54.68 | 0.54451 |
| 20 | −11.2286 | 7.5630 | | | |

TABLE 38

Example 10

| | |
|---|---|
| f | 11.85 |
| Bf | 7.56 |
| FNo. | 2.80 |
| 2 ωm[°] | 176.4 |

TABLE 39

Example 10

| Sn | 3 | 4 | 7 |
|---|---|---|---|
| KA | −3.0171168E+00 | 1.3410141E+00 | 3.1546579E+00 |
| A3 | 9.4732436E−06 | 3.1935146E−04 | 1.8982197E−04 |
| A4 | 4.6518092E−04 | 1.2809361E−03 | −1.0274512E−04 |
| A5 | 4.8421176E−04 | −4.5803405E−04 | −8.9164207E−05 |
| A6 | −1.6461903E−04 | 3.9324461E−04 | 3.0431443E−05 |
| A7 | 1.7402169E−05 | −1.4239749E−04 | −1.3679081E−06 |
| A8 | −4.0616349E−07 | 2.3240417E−05 | −4.6822888E−07 |

TABLE 39-continued

| A9 | −1.5167257E−08 | −1.5612811E−06 | −4.6222330E−08 |
|---|---|---|---|
| A10 | −4.4901067E−09 | −2.7037943E−08 | 1.9643320E−08 |
| A11 | 4.2322487E−10 | 1.3972907E−08 | −1.1570392E−09 |
| A12 | −2.4365888E−11 | −2.3347745E−09 | 2.3085237E−09 |
| A13 | 9.5786927E−12 | 3.4448337E−10 | −8.6428095E−10 |
| A14 | −1.3309409E−12 | −3.0121005E−11 | 1.2641834E−10 |
| A15 | 7.3021776E−14 | 1.2783094E−12 | −1.2077379E−11 |
| A16 | −1.4554093E−15 | −2.1079992E−14 | 7.5682926E−13 |

| Sn | 8 | 16 | 17 |
|---|---|---|---|
| KA | −2.1343114E+00 | 6.7397869E+00 | 1.2027737E+00 |
| A3 | 4.4051316E−05 | −4.3800215E−04 | 2.0390005E−04 |
| A4 | 3.3860784E−04 | 6.2322508E−04 | −2.1960222E−05 |
| A5 | −3.3747968E−04 | −2.9005679E−04 | 2.0625316E−04 |
| A6 | 1.6531283E−04 | 9.9883548E−05 | −1.1458810E−04 |
| A7 | −2.7720668E−05 | −1.6513590E−05 | 3.8776522E−05 |
| A8 | −3.2289276E−06 | −6.3045526E−07 | −5.8653906E−06 |
| A9 | 1.6958575E−06 | 6.2991551E−07 | 1.5086067E−08 |
| A10 | −7.7011936E−08 | 1.4400483E−08 | 1.0172521E−07 |
| A11 | −3.5645165E−08 | −8.7272422E−09 | −9.2306264E−10 |
| A12 | 5.7456884E−09 | −5.6185758E−09 | −7.0856141E−10 |
| A13 | −3.3577305E−10 | 1.4854727E−09 | −3.7472007E−10 |
| A14 | −8.1086417E−12 | −1.2509746E−10 | 8.3178014E−11 |
| A15 | −5.4950570E−12 | 2.0810051E−11 | −1.2182586E−12 |
| A16 | 1.3916533E−12 | −2.7292929E−12 | −1.0604634E−13 |

Example 11

Figure 23:
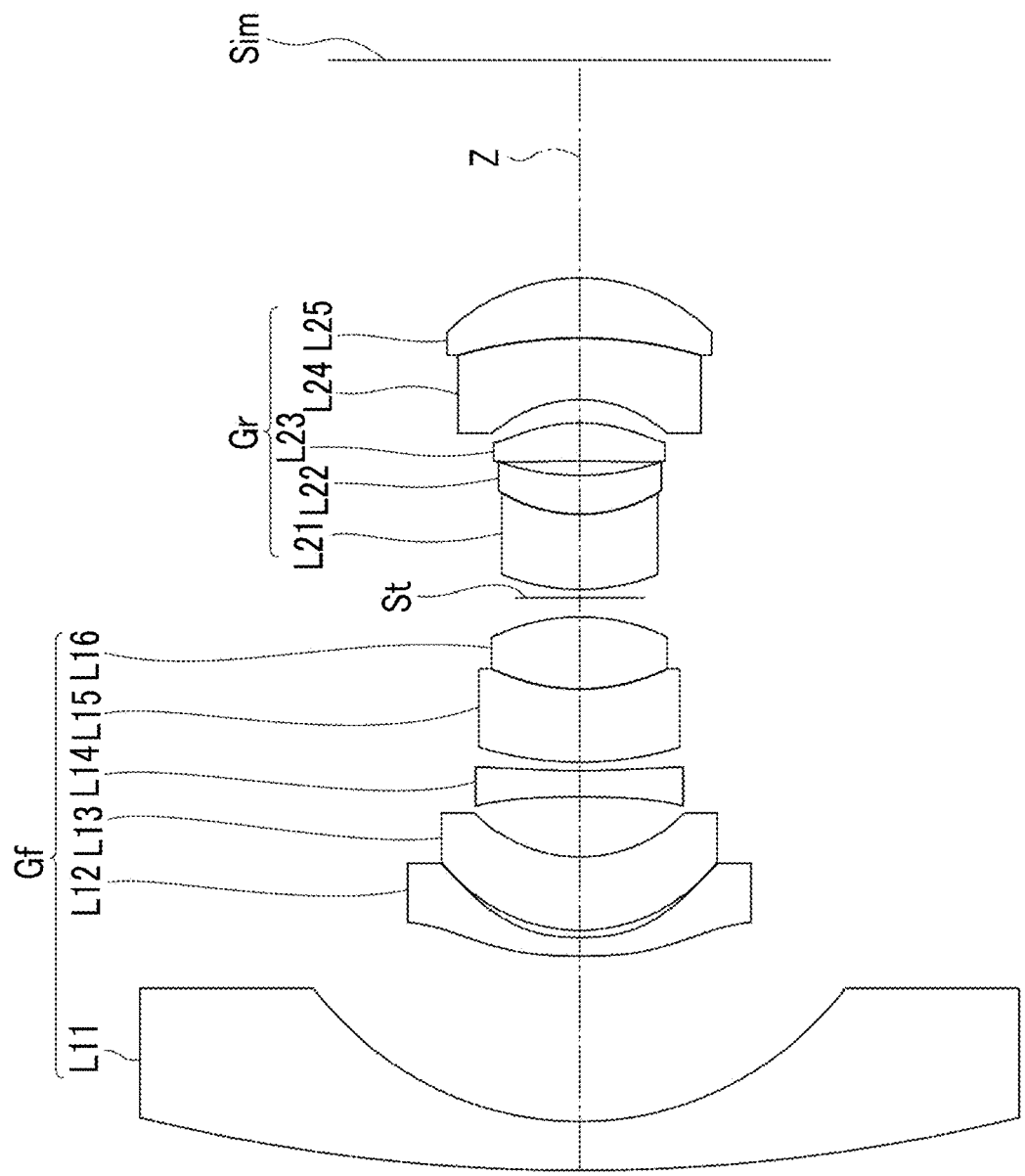
FIG. 23 is a cross-sectional view showing a configuration of an imaging lens of Example 11.

FIG. 23 is a cross-sectional view of a configuration of an imaging lens of Example 11 in a state where the infinite distance object is in focus. The imaging lens of Example 11 consists of, in order from the object side to the image side, the front group Gf that has a negative refractive power, the aperture stop St, and the rear group Gr that has a positive refractive power. The front group Gf consists of six lenses L11 to L16 in order from the object side to the image side. The rear group Gr consists of five lenses L21 to L25 in order from the object to the image side.

Figure 24:
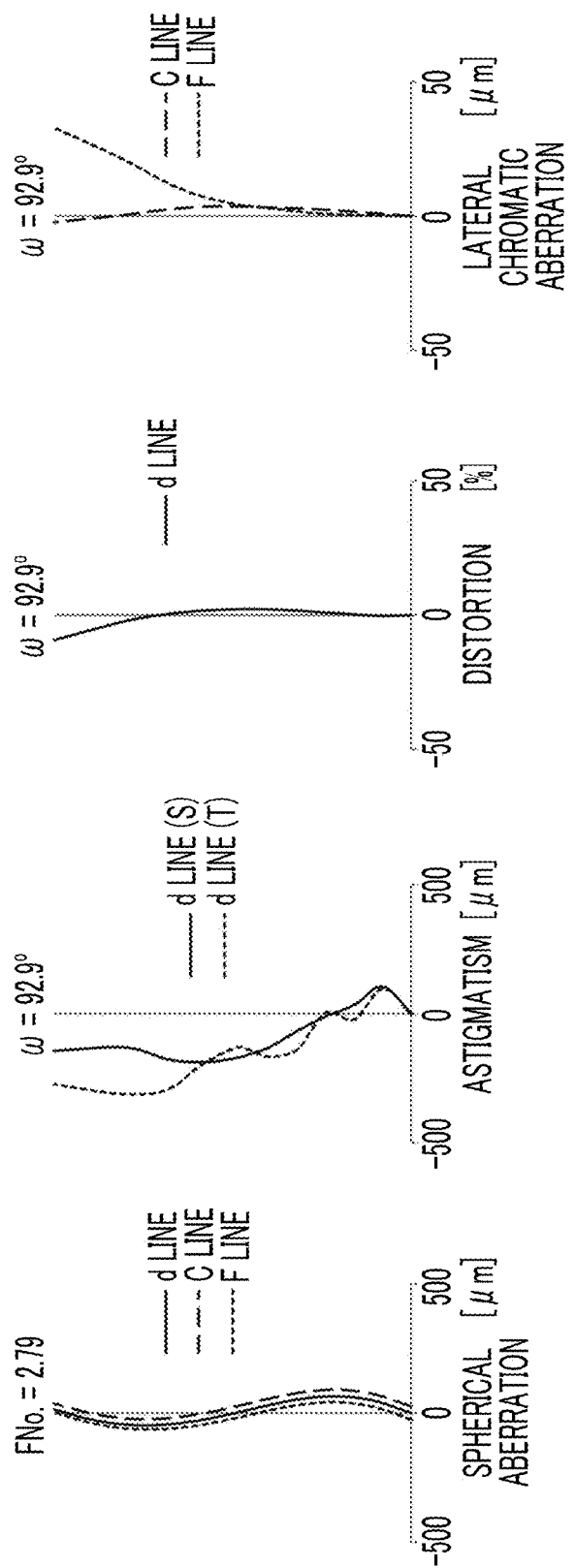
FIG. 24 is a diagram showing aberrations of the imaging lens of Example 11.

Regarding the imaging lens of Example 11, Table 40 shows basic lens data, Table 41 shows specifications, and Table 42 shows aspherical coefficients thereof. Further, FIG. 24 shows aberration diagrams.

TABLE 40

Example 11

| Sn | R | D | Nd | vd | θgF |
|---|---|---|---|---|---|
| 1 | 110.2093 | 2.6650 | 1.48749 | 70.24 | 0.53007 |
| 2 | 19.3776 | 9.0322 | | | |
| *3 | 54.6458 | 1.0014 | 1.82080 | 42.71 | 0.56428 |
| *4 | 13.4917 | 0.3924 | | | |
| 5 | 10.0432 | 4.0033 | 1.95906 | 17.47 | 0.65993 |
| 6 | 8.6657 | 3.2775 | | | |
| *7 | −66.5912 | 1.4283 | 1.62041 | 60.29 | 0.54266 |
| *8 | 45.4350 | 0.4608 | | | |
| 9 | 20.2283 | 3.9912 | 1.85478 | 24.80 | 0.61232 |
| 10 | 11.7984 | 3.9289 | 1.57135 | 52.95 | 0.55544 |
| 11 | −11.8513 | 1.0428 | | | |
| 12(St) | ∞ | 0.4116 | | | |
| 13 | 12.4913 | 4.0986 | 1.95906 | 17.47 | 0.65993 |
| 14 | 9.0381 | 2.1174 | 1.77250 | 49.60 | 0.55212 |
| 15 | 14.9077 | 0.7881 | | | |
| *16 | −71.4133 | 2.0764 | 1.88202 | 37.22 | 0.57699 |
| *17 | −9.4490 | 1.2662 | | | |
| 18 | −7.6282 | 3.3609 | 1.78472 | 25.68 | 0.61621 |
| 19 | −25.5917 | 3.2817 | 1.60300 | 65.44 | 0.54022 |
| 20 | −11.0195 | 11.8703 | | | |

TABLE 41

Example 11

| | |
|---|---|
| f | 10.79 |
| Bf | 11.87 |
| FNo. | 2.79 |
| 2ωm[°] | 185.8 |

TABLE 42

Example 11

| Sn | 3 | 4 | 7 |
|---|---|---|---|
| KA | -3.5872804E+00 | 1.2562021E+00 | 2.9650445E+00 |
| A3 | -1.7723408E-04 | -2.3795720E-05 | 8.3405026E-05 |
| A4 | 4.2601681E-04 | 1.2857153E-03 | -1.2261619E-04 |
| A5 | 4.8830254E-04 | -4.7742259E-04 | -1.3643822E-04 |
| A6 | -1.6440439E-04 | 3.9457371E-04 | 4.3140555E-05 |
| A7 | 1.7427814E-05 | -1.4266173E-04 | -2.1603883E-06 |
| A8 | -4.0732978E-07 | 2.3274116E-05 | -6.9387124E-07 |
| A9 | -1.4854976E-08 | -1.5631983E-06 | -2.6776732E-08 |
| A10 | -4.4968986E-09 | -2.4713984E-08 | 2.2969075E-08 |
| A11 | 4.1663696E-10 | 1.3600302E-08 | -2.0470368E-09 |
| A12 | -2.4214904E-11 | -2.3161044E-09 | 2.6293603E-09 |
| A13 | 9.5712050E-12 | 3.4362093E-10 | -9.3974328E-10 |
| A14 | -1.3291327E-12 | -3.0270355E-11 | 1.2992086E-10 |
| A15 | 7.3059047E-14 | 1.2911591E-12 | -9.0403491E-12 |
| A16 | -1.4566536E-15 | -1.9097262E-14 | 3.3374351E-13 |

| Sn | 8 | 16 | 17 |
|---|---|---|---|
| KA | -2.5253901E+00 | 6.5407719E+00 | 1.0317034E+00 |
| A3 | -9.2880185E-05 | -2.5373787E-04 | 1.4237308E-04 |
| A4 | 1.3661230E-05 | 4.8601159E-04 | 8.6124655E-06 |
| A5 | -3.4719119E-04 | -2.6853242E-04 | 1.9306414E-04 |
| A6 | 1.6907183E-04 | 9.7531853E-05 | -1.1790007E-04 |
| A7 | -2.8486213E-05 | -1.6554934E-05 | 3.9728412E-05 |
| A8 | -2.9110811E-06 | -5.8231026E-07 | -5.8971785E-06 |
| A9 | 1.6007481E-06 | 6.2777783E-07 | -1.2755554E-08 |
| A10 | -5.7209310E-08 | 1.3018601E-08 | 1.0720243E-07 |
| A11 | -3.8303464E-08 | -9.5421032E-09 | -1.0202076E-09 |
| A12 | 4.4035302E-09 | -5.7418238E-09 | -8.5039384E-10 |
| A13 | -6.1278769E-11 | 1.5014439E-09 | -3.7090651E-10 |
| A14 | 6.5269490E-12 | -1.0827026E-10 | 7.5101849E-11 |
| A15 | -5.9557429E-13 | 1.6600214E-11 | -6.5249344E-13 |
| A16 | -1.0257983E-13 | -2.3545287E-12 | 2.8399339E-14 |

Example 12

Figure 25:
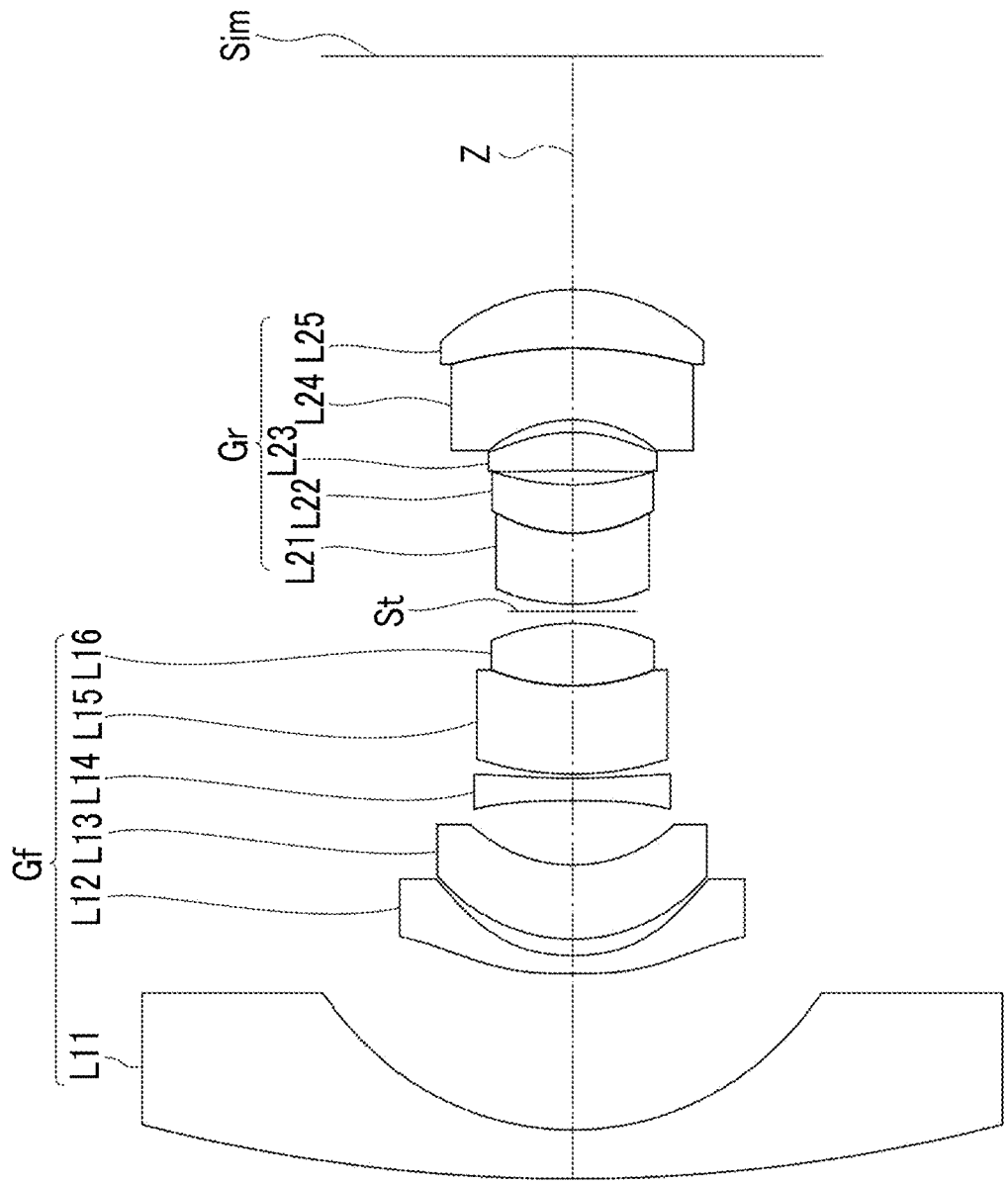
FIG. 25 is a cross-sectional view showing a configuration of an imaging lens of Example 12.

FIG. 25 is a cross-sectional view of a configuration of an imaging lens of Example 12 in a state where the infinite distance object is in focus. The imaging lens of Example 12 consists of, in order from the object side to the image side, the front group Gf that has a negative refractive power, the aperture stop St, and the rear group Gr that has a positive refractive power. The front group Gf consists of six lenses L11 to L16 in order from the object side to the image side. The rear group Gr consists of five lenses L21 to L25 in order from the object to the image side.

Figure 26:
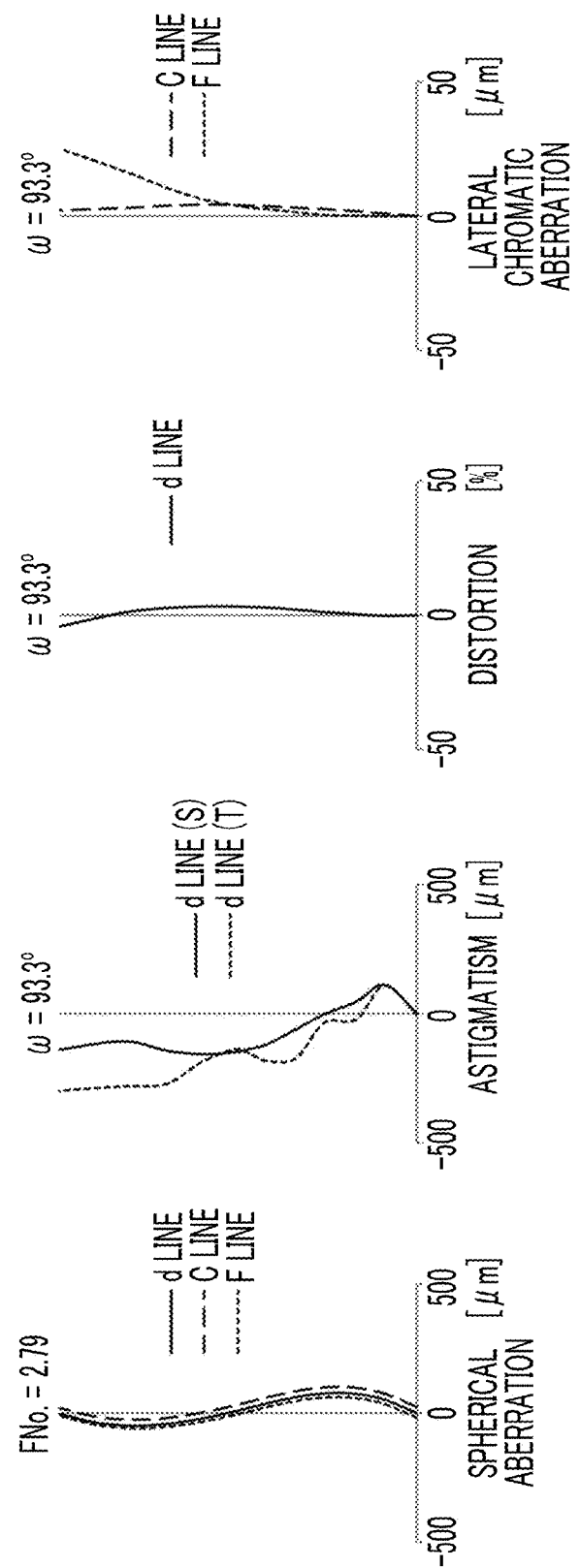
FIG. 26 is a diagram showing aberrations of the imaging lens of Example 12.

Regarding the imaging lens of Example 12, Table 43 shows basic lens data, Table 44 shows specifications, and Table 45 shows aspherical coefficients thereof. Further, FIG. 26 shows aberration diagrams.

TABLE 43

Example 12

| Sn | R | D | Nd | vd | θgF |
|---|---|---|---|---|---|
| 1 | 103.2073 | 2.6640 | 1.48749 | 70.24 | 0.53007 |
| 2 | 17.1999 | 8.5252 | | | |
| *3 | 59.0660 | 1.0000 | 1.82080 | 42.71 | 0.56428 |
| *4 | 13.1330 | 0.8825 | | | |
| 5 | 10.2073 | 4.0473 | 1.95906 | 17.47 | 0.65993 |
| 6 | 8.7171 | 3.5127 | | | |
| *7 | -71.3117 | 1.2180 | 1.62041 | 60.29 | 0.54266 |
| *8 | 35.8892 | 0.2327 | | | |
| 9 | 18.3246 | 4.8269 | 1.85478 | 24.80 | 0.61232 |
| 10 | 12.9682 | 3.3962 | 1.57135 | 52.95 | 0.55544 |
| 11 | -11.9103 | 0.6550 | | | |
| 12(St) | ∞ | 0.4000 | | | |
| 13 | 12.5796 | 3.8248 | 1.95906 | 17.47 | 0.65993 |
| 14 | 9.2055 | 2.6468 | 1.77250 | 49.60 | 0.55212 |
| 15 | 15.1018 | 0.7578 | | | |
| *16 | -78.9453 | 2.0900 | 1.88202 | 37.22 | 0.57699 |
| *17 | -9.3150 | 0.6831 | | | |
| 18 | -7.7849 | 3.9113 | 1.78472 | 25.68 | 0.61621 |
| 19 | -27.5171 | 3.2037 | 1.60300 | 65.44 | 0.54022 |
| 20 | -11.3524 | 12.7351 | | | |

TABLE 44

Example 12

| | |
|---|---|
| f | 10.19 |
| Bf | 12.74 |
| FNo. | 2.79 |
| 2ωm[°] | 186.6 |

TABLE 45

Example 12

| Sn | 3 | 4 | 7 |
|---|---|---|---|
| KA | -3.5856473E+00 | 1.2578371E+00 | 2.9672318E+00 |
| A3 | -4.5247820E-05 | 9.3976928E-05 | 4.9768300E-05 |
| A4 | 4.1600993E-04 | 1.2803454E-03 | -1.2027315E-04 |
| A5 | 4.8883194E-04 | -4.7729574E-04 | -1.4137675E-04 |
| A6 | -1.6431721E-04 | 3.9506482E-04 | 4.1545865E-05 |
| A7 | 1.7432132E-05 | -1.4267565E-04 | -2.3010773E-06 |
| A8 | -4.0757392E-07 | 2.3272093E-05 | -6.9121792E-07 |
| A9 | -1.4804775E-08 | -1.5636892E-06 | -2.3862004E-08 |
| A10 | -4.4795659E-09 | -2.4718570E-08 | 2.3408710E-08 |
| A11 | 4.1628663E-10 | 1.3590166E-08 | -1.6325887E-09 |
| A12 | -2.4263616E-11 | -2.3120106E-09 | 2.5503729E-09 |
| A13 | 9.5695984E-12 | 3.4381545E-10 | -9.4232406E-10 |
| A14 | -1.3293988E-12 | -3.0271075E-11 | 1.3192090E-10 |
| A15 | 7.3053377E-14 | 1.2890126E-12 | -9.1078459E-12 |
| A16 | -1.4578761E-15 | -1.9275888E-14 | 3.1280567E-13 |

| Sn | 8 | 16 | 17 |
|---|---|---|---|
| KA | -2.5237451E+00 | 6.5424169E+00 | 1.0333485E+00 |
| A3 | -4.4857861E-05 | -3.0312190E-04 | 1.4512910E-04 |
| A4 | -4.1476335E-05 | 4.8302270E-04 | -1.9266400E-05 |
| A5 | -3.4459963E-04 | -2.6900809E-04 | 2.0024157E-04 |
| A6 | 1.6793570E-04 | 9.7801337E-05 | -1.1725771E-04 |
| A7 | -2.8795535E-05 | -1.6451784E-05 | 3.9686665E-05 |
| A8 | -2.9540302E-06 | -5.6188140E-07 | -5.9057962E-06 |
| A9 | 1.6031016E-06 | 6.2507775E-07 | -1.9212824E-08 |
| A10 | -5.2920135E-08 | 1.2142990E-08 | 1.0820753E-07 |
| A11 | -3.8031548E-08 | -9.4849844E-09 | -9.0217895E-10 |
| A12 | 4.3829876E-09 | -5.6910012E-09 | -8.2838271E-10 |
| A13 | -6.6858688E-11 | 1.5023175E-09 | -3.6653929E-10 |
| A14 | 4.1474721E-12 | -1.0821051E-10 | 7.5977620E-11 |
| A15 | -7.6090211E-13 | 1.6543771E-11 | -7.1436256E-13 |
| A16 | -4.5346997E-14 | -2.3973487E-12 | -1.4432604E-14 |

Example 13

Figure 27:
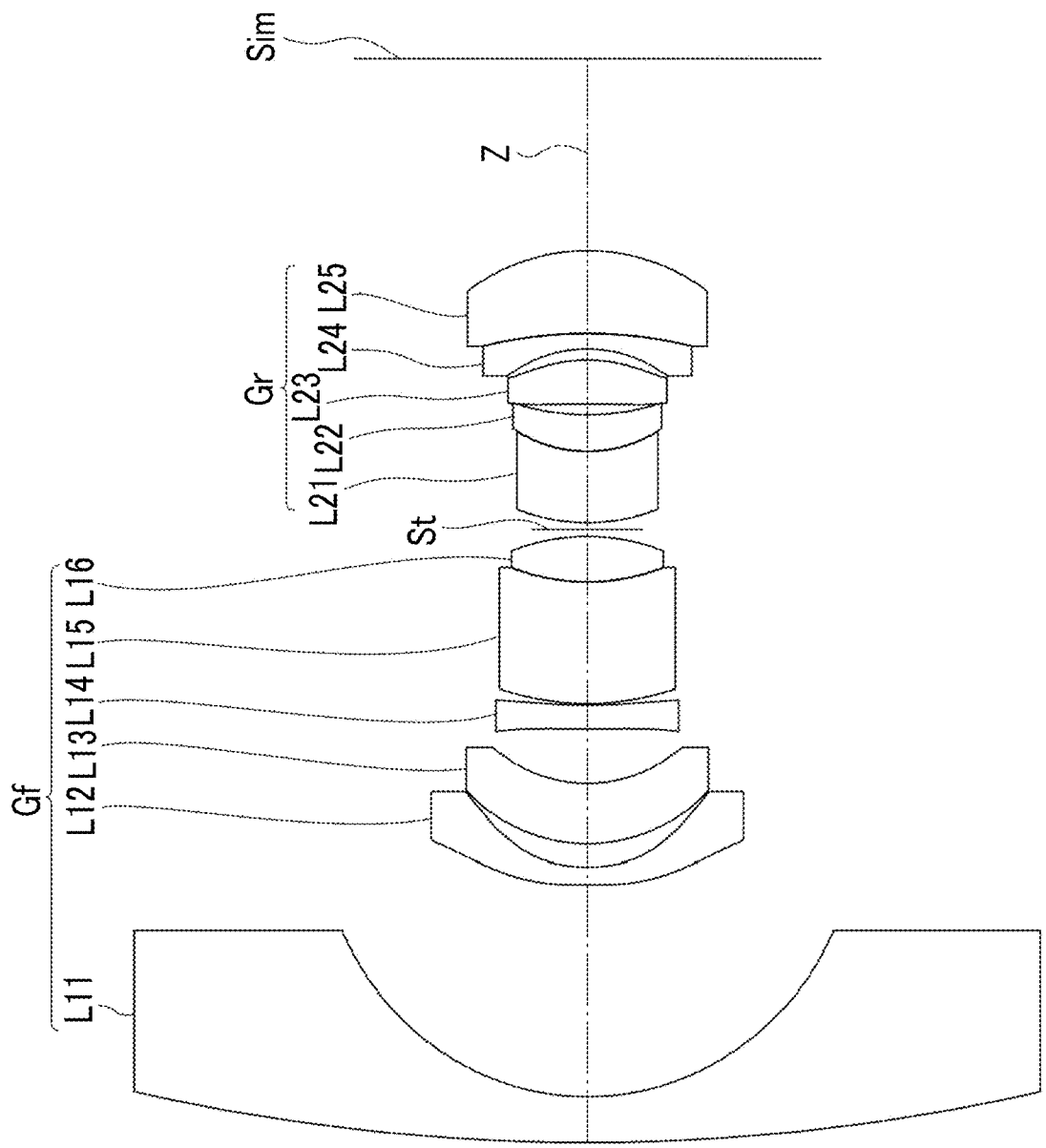
FIG. 27 is a cross-sectional view showing a configuration of an imaging lens of Example 13.

FIG. 27 is a cross-sectional view of a configuration of an imaging lens of Example 13 in a state where the infinite distance object is in focus. The imaging lens of Example 13 consists of, in order from the object side to the image side, the front group Gf that has a negative refractive power, the aperture stop St, and the rear group Gr that has a positive refractive power. The front group Gf consists of six lenses L11 to L16 in order from the object side to the image side. The rear group Gr consists of five lenses L21 to L25 in order from the object to the image side.

Figure 28:
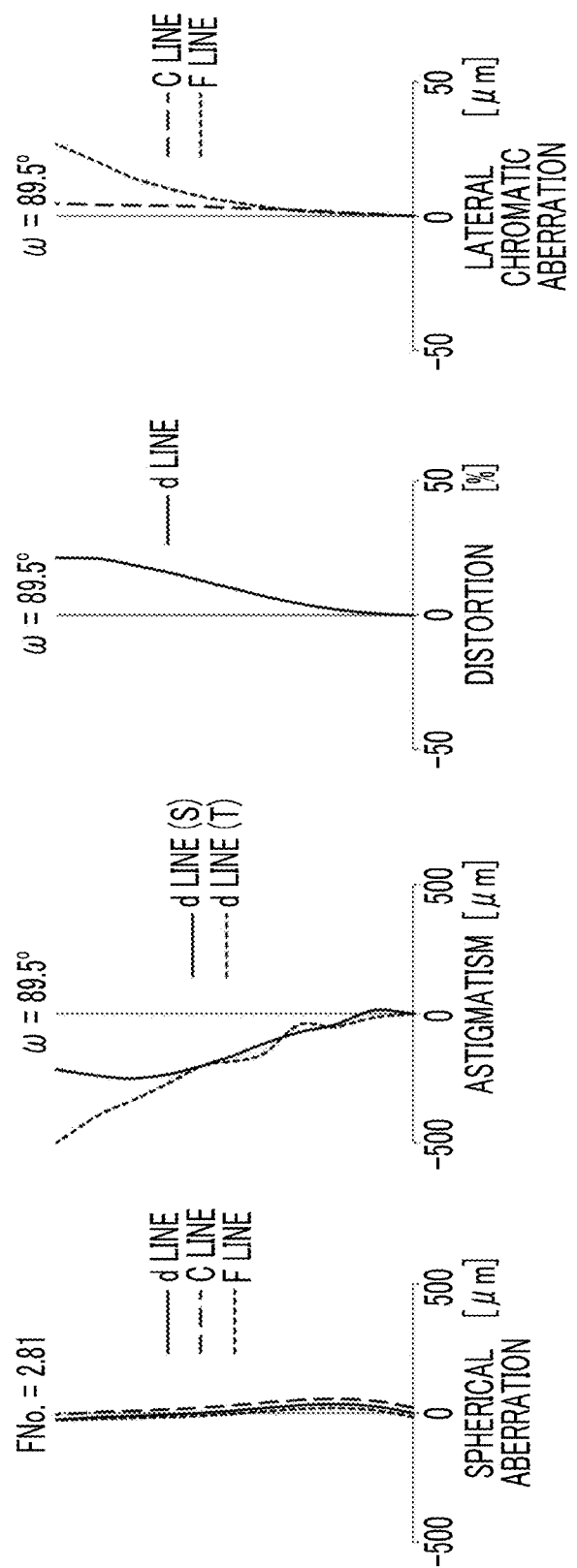
FIG. 28 is a diagram showing aberrations of the imaging lens of Example 13.

Regarding the imaging lens of Example 13, Table 46 shows basic lens data, Table 47 shows specifications, and Table 48 shows aspherical coefficients thereof. Further, FIG. 28 shows aberration diagrams.

TABLE 46

Example 13

| Sn | R | D | Nd | vd | θgF |
|---|---|---|---|---|---|
| 1 | 129.4624 | 2.6651 | 1.48749 | 70.24 | 0.53007 |
| 2 | 16.4247 | 12.3475 | | | |
| *3 | 59.8938 | 1.0419 | 1.82080 | 42.71 | 0.56428 |
| *4 | 11.3810 | 1.3303 | | | |
| 5 | 10.4133 | 3.5140 | 1.95906 | 17.47 | 0.65993 |
| 6 | 8.9278 | 3.1745 | | | |
| *7 | 195.5923 | 1.3908 | 1.62041 | 60.29 | 0.54266 |
| *8 | 32.4418 | 0.0929 | | | |
| 9 | 17.3700 | 7.0906 | 1.85478 | 24.80 | 0.61232 |
| 10 | 13.0695 | 2.6567 | 1.57135 | 52.95 | 0.55544 |
| 11 | −13.1071 | 0.4000 | | | |
| 12(St) | ∞ | 0.4000 | | | |
| 13 | 12.1781 | 4.1660 | 1.95906 | 17.47 | 0.65993 |
| 14 | 8.4610 | 2.1354 | 1.77250 | 49.60 | 0.55212 |
| 15 | 15.1980 | 0.6205 | | | |
| *16 | −116.0786 | 2.5716 | 1.88202 | 37.22 | 0.57699 |
| *17 | −9.2658 | 0.6469 | | | |
| 18 | −8.3021 | 0.9000 | 1.78472 | 25.68 | 0.61621 |
| 19 | −28.0069 | 4.7777 | 1.60300 | 65.44 | 0.54022 |
| 20 | −12.5897 | 11.2066 | | | |

TABLE 47

Example 13

| | |
|---|---|
| f | 8.30 |
| Bf | 11.21 |
| FNo. | 2.81 |
| 2 ωm[°] | 179.0 |

TABLE 48

Example 13

| Sn | 3 | 4 | 7 |
|---|---|---|---|
| KA | −3.5869726E+00 | 1.2565057E+00 | 2.9659138E+00 |
| A3 | 6.0565617E−04 | 3.2731996E−04 | 1.2313533E−04 |
| A4 | 4.0058556E−04 | 1.3732795E−03 | −1.2794717E−04 |
| A5 | 4.9150050E−04 | −4.7462531E−04 | −1.3163346E−04 |
| A6 | −1.6424571E−04 | 3.9334042E−04 | 4.1386666E−05 |
| A7 | 1.7436561E−05 | −1.4273778E−04 | −2.4884962E−06 |
| A8 | −4.0846996E−07 | 2.3264456E−05 | −7.5599122E−07 |
| A9 | −1.4881424E−08 | −1.5635770E−06 | −3.6483641E−08 |
| A10 | −4.4867721E−09 | −2.4600039E−08 | 3.1940004E−08 |
| A11 | 4.1411240E−10 | 1.3611108E−08 | −2.8152336E−09 |
| A12 | −2.3694176E−11 | −2.3128491E−09 | 2.5878396E−09 |
| A13 | 9.5673599E−12 | 3.4382477E−10 | −9.3021411E−10 |
| A14 | −1.3330085E−12 | −3.0293786E−11 | 1.3246380E−10 |

TABLE 48-continued

| A15 | 7.2981485E−14 | 1.2847415E−12 | −9.4173903E−12 |
| A16 | −1.4422800E−15 | −1.9073128E−14 | 3.1878890E−13 |

| Sn | 8 | 16 | 17 |
|---|---|---|---|
| KA | −2.5250994E+00 | 6.5410931E+00 | 1.0320277E+00 |
| A3 | 1.9910093E−07 | −2.7383853E−04 | 1.8791439E−04 |
| A4 | 3.7883573E−05 | 4.6022941E−04 | 1.3917692E−05 |
| A5 | −3.4236498E−04 | −2.6822937E−04 | 2.0671211E−04 |
| A6 | 1.6572313E−04 | 1.0289485E−04 | −1.1669014E−04 |
| A7 | −2.8874989E−05 | −1.6018246E−05 | 3.9732932E−05 |
| A8 | −3.0190377E−06 | −6.0367905E−07 | −5.8479551E−06 |
| A9 | 1.5999190E−06 | 6.1531459E−07 | 1.0266116E−08 |
| A10 | −5.0318247E−08 | 1.2309606E−08 | 1.0201898E−07 |
| A11 | −3.7478459E−08 | −9.5272719E−09 | 1.5352027E−10 |
| A12 | 4.3925484E−09 | −5.7101540E−09 | −9.2734989E−10 |
| A13 | −8.7804113E−11 | 1.4929805E−09 | −3.8133843E−10 |
| A14 | 5.8551798E−12 | −1.0951891E−10 | 7.4832495E−11 |
| A15 | −1.1728234E−12 | 1.6278686E−11 | −8.2764140E−13 |
| A16 | −5.1304679E−16 | −2.4144136E−12 | −5.5276678E−14 |

Example 14

Figure 29:
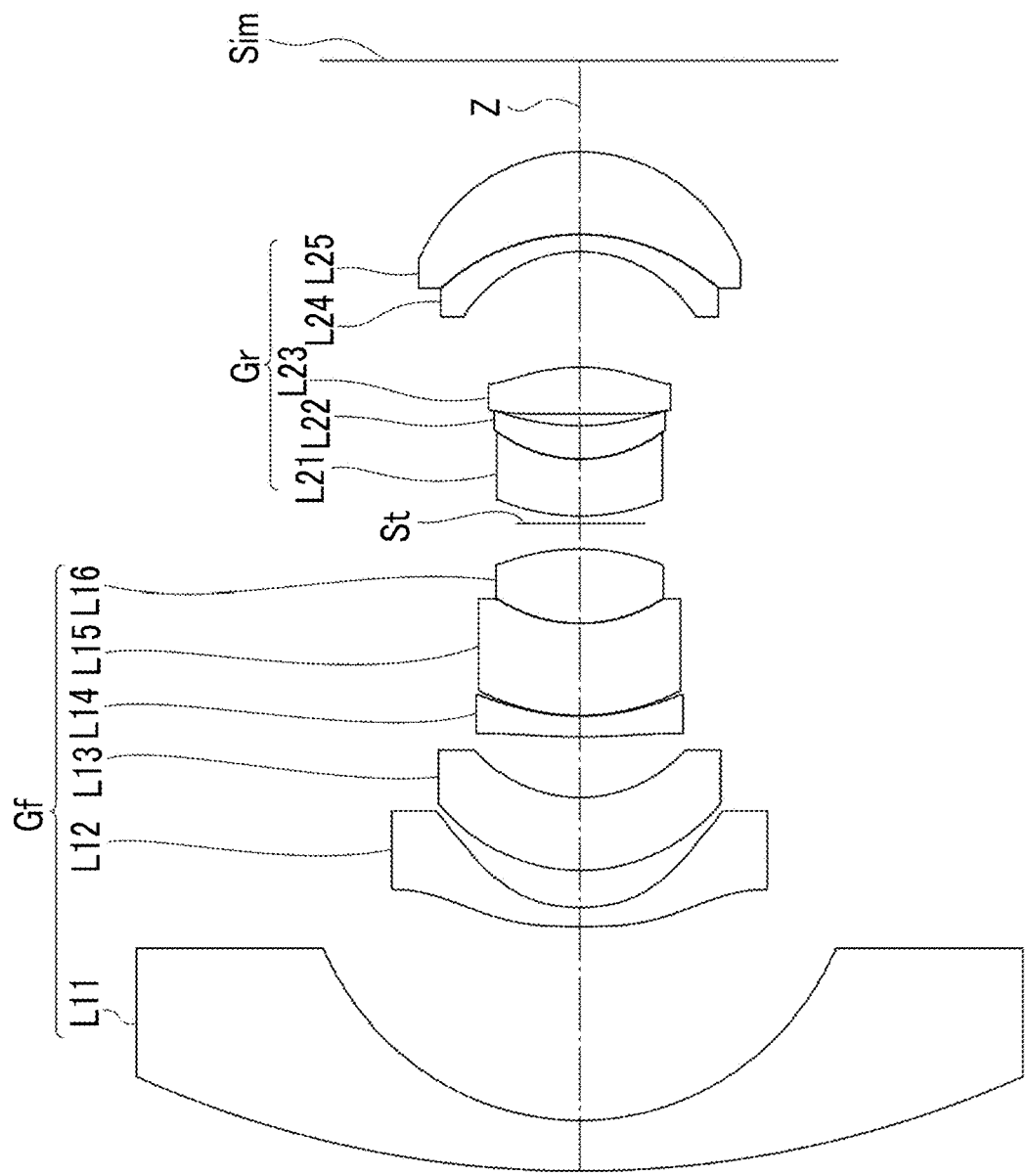
FIG. 29 is a cross-sectional view showing a configuration of an imaging lens of Example 14.

FIG. 29 is a cross-sectional view of a configuration of an imaging lens of Example 14 in a state where the infinite distance object is in focus. The imaging lens of Example 14 consists of, in order from the object side to the image side, the front group Gf that has a negative refractive power, the aperture stop St, and the rear group Gr that has a positive refractive power. The front group Gf consists of six lenses L11 to L16 in order from the object side to the image side. The rear group Gr consists of five lenses L21 to L25 in order from the object to the image side.

Figure 30:
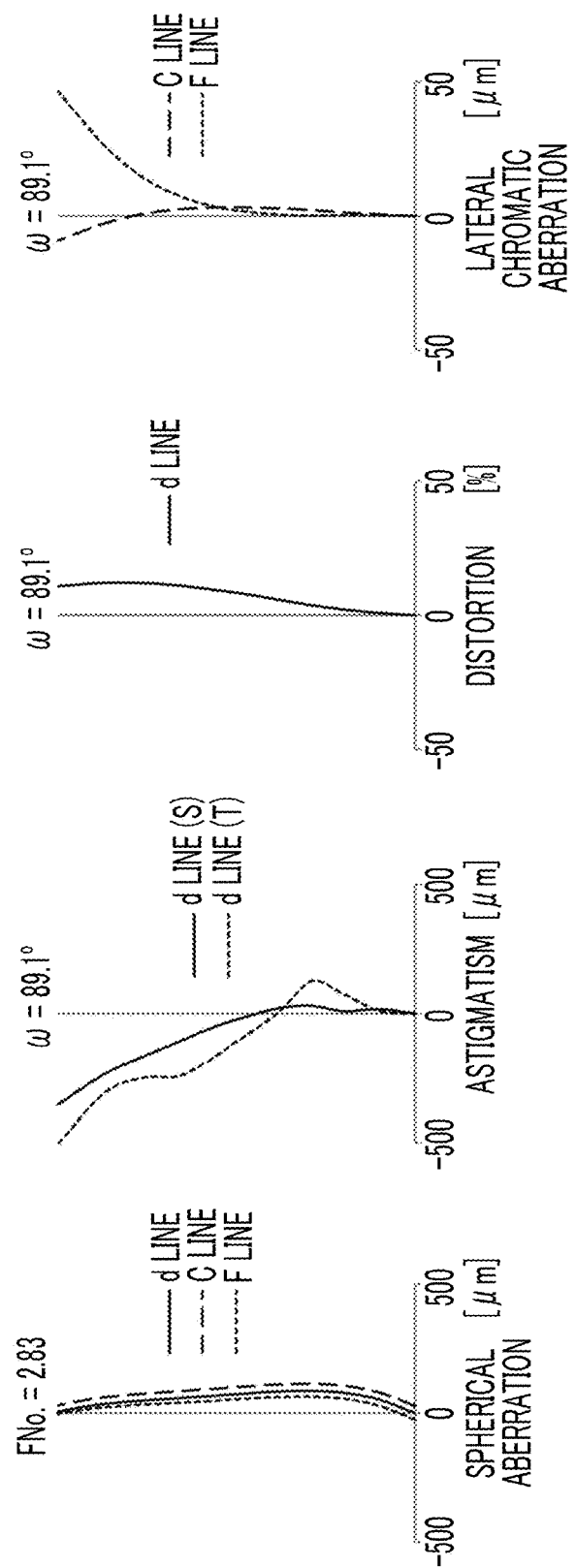
FIG. 30 is a diagram showing aberrations of the imaging lens of Example 14.

Regarding the imaging lens of Example 14, Table 49 shows basic lens data, Table 50 shows specifications, and Table 51 shows aspherical coefficients thereof. Further, FIG. 30 shows aberration diagrams.

TABLE 49

Example 14

| Sn | R | D | Nd | vd | θgF |
|---|---|---|---|---|---|
| 1 | 62.2470 | 2.6667 | 1.65160 | 58.54 | 0.53901 |
| 2 | 15.5016 | 10.2153 | | | |
| *3 | 75.9439 | 1.0085 | 1.49710 | 81.56 | 0.53848 |
| *4 | 10.3863 | 1.9499 | | | |
| 5 | 10.3090 | 3.8452 | 1.89286 | 20.36 | 0.63944 |
| 6 | 7.9843 | 3.1987 | | | |
| *7 | 42.1177 | 1.0802 | 1.49710 | 81.56 | 0.53848 |
| *8 | 12.4214 | 0.0396 | | | |
| 9 | 12.2972 | 4.8497 | 1.95375 | 32.32 | 0.59056 |
| 10 | 8.6745 | 3.8756 | 1.59522 | 67.73 | 0.54426 |
| 11 | −12.7051 | 1.3342 | | | |
| 12(St) | ∞ | 0.4000 | | | |
| 13 | 12.1949 | 3.0045 | 1.96300 | 24.11 | 0.62126 |
| 14 | 7.9499 | 1.7590 | 1.83481 | 42.74 | 0.56490 |
| 15 | 14.2937 | 0.6221 | | | |
| *16 | −982.2347 | 2.4618 | 1.72903 | 54.04 | 0.54474 |
| *17 | −10.4877 | 6.0886 | | | |
| 18 | −7.6369 | 0.9000 | 1.95906 | 17.47 | 0.65993 |
| 19 | −11.6814 | 4.3531 | 1.59551 | 39.24 | 0.58043 |
| 20 | −9.7179 | 4.8126 | | | |

TABLE 50

Example 14

| | |
|---|---|
| f | 9.13 |
| Bf | 4.81 |
| FNo. | 2.83 |
| 2ωm[°] | 178.2 |

TABLE 51

Example 14

| Sn | 3 | 4 | 7 |
|---|---|---|---|
| KA | −3.1691071E+00 | 1.2881258E+00 | 3.9411777E+00 |
| A3 | 7.9481339E−04 | 3.4595237E−04 | 2.8436788E−04 |
| A4 | 4.4898246E−04 | 1.4048355E−03 | −2.6539353E−04 |
| A5 | 4.8044310E−04 | −4.7519366E−04 | −8.9286177E−05 |
| A6 | −1.6441091E−04 | 3.9242054E−04 | 3.3898759E−05 |
| A7 | 1.7397996E−05 | −1.4261593E−04 | −9.3809682E−07 |
| A8 | −4.0735940E−07 | 2.3221122E−05 | −5.5642499E−07 |
| A9 | −1.5121182E−08 | −1.5584289E−06 | −6.3746641E−08 |
| A10 | −4.4932834E−09 | −2.6129092E−08 | 1.4934506E−08 |
| A11 | 4.2233396E−10 | 1.3843113E−08 | −1.2891572E−09 |
| A12 | −2.4120581E−11 | −2.3357555E−09 | 2.4800614E−09 |
| A13 | 9.5957931E−12 | 3.4418006E−10 | −8.6984359E−10 |
| A14 | −1.3307660E−12 | −3.0297897E−11 | 1.3254150E−10 |
| A15 | 7.2463565E−14 | 1.2992241E−12 | −1.1184230E−11 |
| A16 | −1.4264631E−15 | −1.9588795E−14 | 4.7450066E−13 |

| Sn | 8 | 16 | 17 |
|---|---|---|---|
| KA | −2.4034848E+00 | 8.6603234E+02 | 1.0701650E+00 |
| A3 | 5.5519440E−05 | −3.9415314E−04 | 3.6386638E−04 |
| A4 | 3.1339430E−04 | 6.2158307E−04 | −1.2120428E−05 |
| A5 | −3.7828407E−04 | −2.9341452E−04 | 2.1075901E−04 |
| A6 | 1.6627619E−04 | 9.9770170E−05 | −1.1705729E−04 |
| A7 | −2.7020811E−05 | −1.5562253E−05 | 3.9068841E−05 |
| A8 | −3.0370959E−06 | −6.6670270E−07 | −5.8931844E−06 |
| A9 | 1.6516143E−06 | 6.4207500E−07 | 2.4434108E−08 |
| A10 | −7.4182928E−08 | 1.6157367E−08 | 1.0591965E−07 |
| A11 | −4.0627842E−08 | −9.3341793E−09 | 2.6505217E−10 |
| A12 | 5.9545324E−09 | −5.9387070E−09 | −1.1870881E−09 |
| A13 | −3.4920368E−10 | 1.4503493E−09 | −3.7399054E−10 |
| A14 | 3.1141402E−11 | −1.2896523E−10 | 6.4634770E−11 |
| A15 | −1.4429495E−13 | 2.0352998E−11 | 3.8775466E−12 |
| A16 | −2.5824083E−13 | −2.2831914E−12 | −6.4585089E−13 |

Example 15

Figure 31:
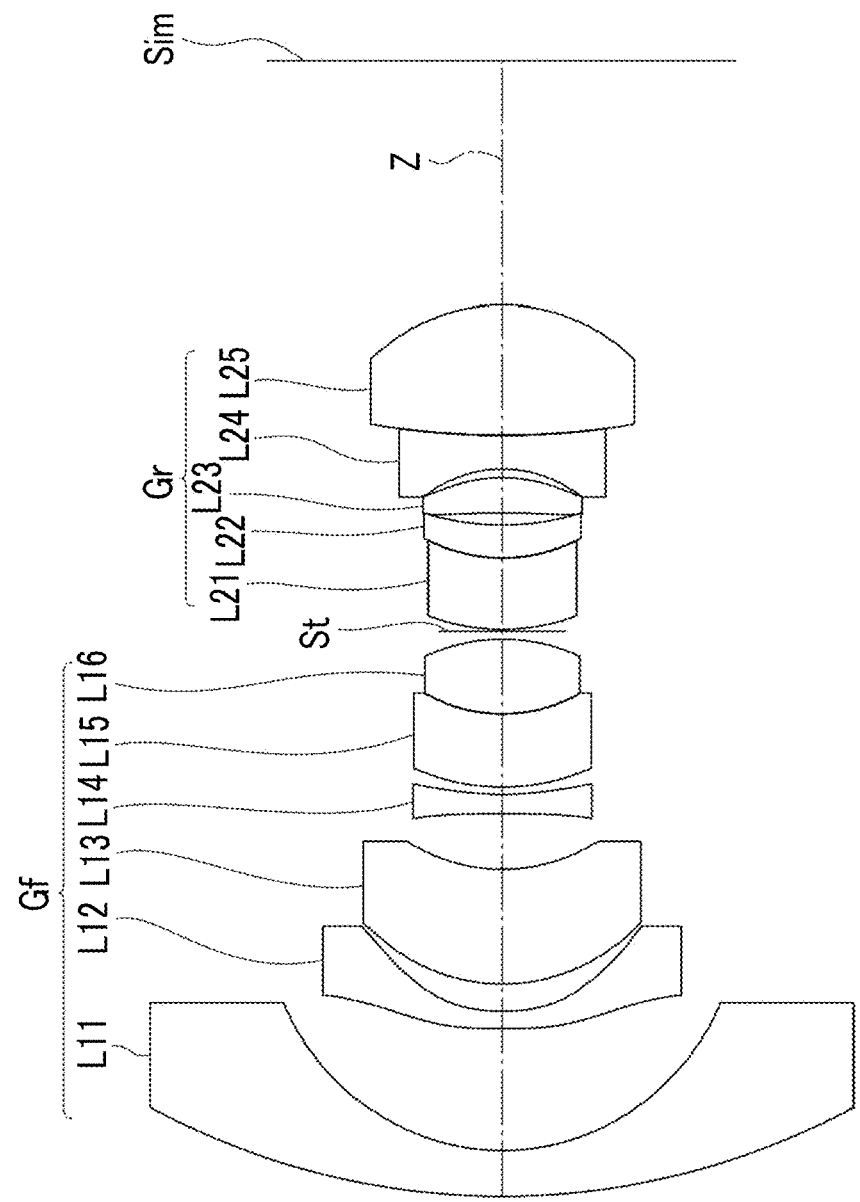
FIG. 31 is a cross-sectional view showing a configuration of an imaging lens of Example 15.

FIG. 31 is a cross-sectional view of a configuration of an imaging lens of Example 15 in a state where the infinite distance object is in focus. The imaging lens of Example 15 consists of, in order from the object side to the image side, the front group Gf that has a negative refractive power, the aperture stop St, and the rear group Gr that has a positive refractive power. The front group Gf consists of six lenses L11 to L16 in order from the object side to the image side. The rear group Gr consists of five lenses L21 to L25 in order from the object to the image side.

Figure 32:
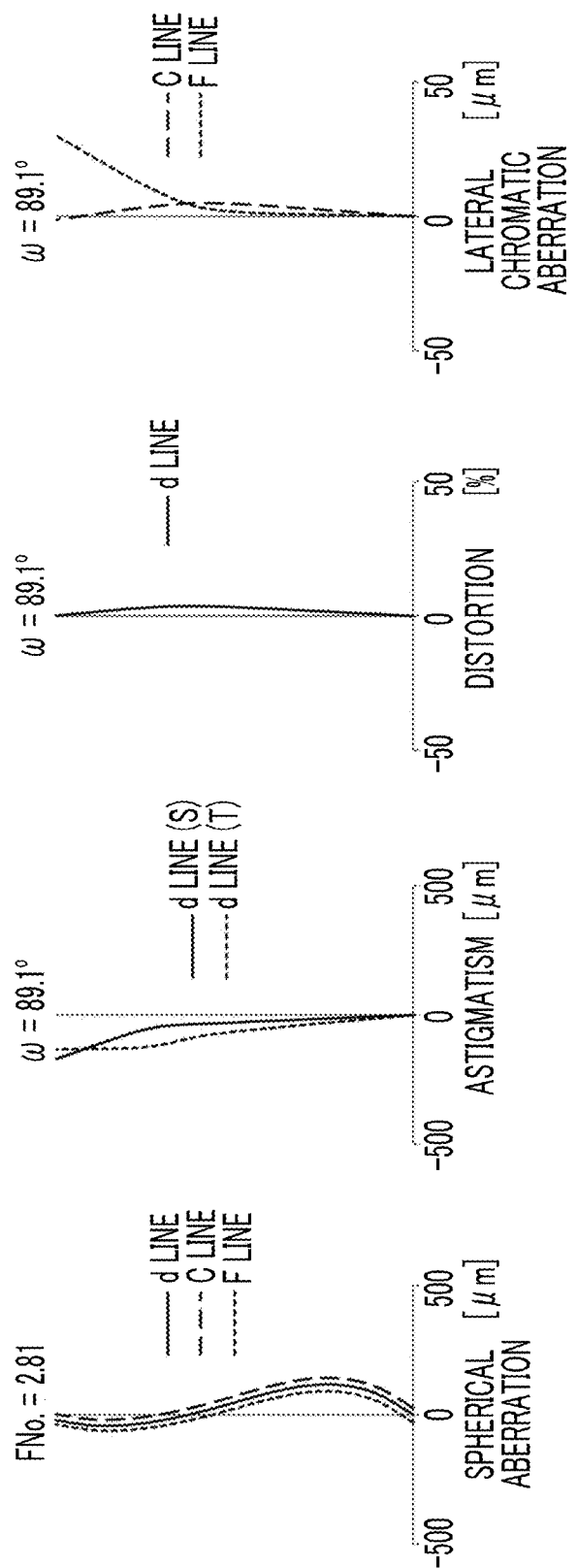
FIG. 32 is a diagram showing aberrations of the imaging lens of Example 15.

Regarding the imaging lens of Example 13, Table 52 shows basic lens data, Table 53 shows specifications, and Table 54 shows aspherical coefficients thereof. Further, FIG. 32 shows aberration diagrams.

TABLE 52

Example 15

| Sn | R | D | Nd | vd | θgF |
|---|---|---|---|---|---|
| 1 | 46.5796 | 2.6650 | 1.80400 | 46.53 | 0.55775 |
| 2 | 14.5286 | 7.0850 | | | |
| *3 | 100.4029 | 1.0000 | 1.71300 | 53.94 | 0.54473 |

TABLE 52-continued

Example 15

| Sn | R | D | Nd | vd | θgF |
|---|---|---|---|---|---|
| *4 | 13.3093 | 1.5859 | | | |
| 5 | 11.6201 | 6.6094 | 1.96300 | 24.11 | 0.62126 |
| 6 | 11.1361 | 3.2225 | | | |
| *7 | −211.5439 | 1.1317 | 1.75501 | 51.16 | 0.54856 |
| *8 | 19.5520 | 0.4207 | | | |
| 9 | 13.6313 | 4.2464 | 2.00100 | 29.14 | 0.59974 |
| 10 | 9.6943 | 4.3411 | 1.60311 | 60.64 | 0.54148 |
| 11 | −11.6694 | 0.4554 | | | |
| 12(St) | ∞ | 0.1210 | | | |
| 13 | 13.2626 | 4.1446 | 1.95906 | 17.47 | 0.65993 |
| 14 | 10.3805 | 1.9193 | 1.69930 | 51.11 | 0.55523 |
| 15 | 16.7511 | 0.7036 | | | |
| *16 | −52.8988 | 2.0500 | 1.88202 | 37.22 | 0.57699 |
| *17 | −9.2953 | 0.4941 | | | |
| 18 | −7.9226 | 1.9557 | 1.68893 | 31.07 | 0.60041 |

TABLE 52-continued

Example 15

| Sn | R | D | Nd | νd | θgF |
|---|---|---|---|---|---|
| 19 | 49.3708 | 7.5555 | 1.59522 | 67.73 | 0.54426 |
| 20 | −11.7741 | 14.1498 | | | |

TABLE 53

Example 15

| | |
|---|---|
| f | 10.11 |
| Bf | 14.15 |
| FNo. | 2.81 |
| 2ωm[°] | 178.2 |

TABLE 54

Example 15

| Sn | 3 | 4 | 7 |
|---|---|---|---|
| KA | −1.9424272E+01 | 1.5705461E+00 | −1.3192227E+01 |
| A3 | 4.1350121E−04 | 4.1221891E−04 | 9.5840494E−05 |
| A4 | 3.7126709E−04 | 1.1745425E−03 | −1.4390999E−04 |
| A5 | 4.9073745E−04 | −4.6700340E−04 | −1.0216400E−04 |
| A6 | −1.6446094E−04 | 3.9394552E−04 | 2.8697851E−05 |
| A7 | 1.7410550E−05 | −1.4263000E−04 | −1.2429873E−06 |
| A8 | −4.0732026E−07 | 2.3258084E−05 | −6.8278086E−07 |
| A9 | −1.4670519E−08 | −1.5630473E−06 | 1.3100234E−08 |
| A10 | −4.4833456E−09 | −2.4923273E−08 | 1.9687314E−08 |
| A11 | 4.2335551E−10 | 1.3549355E−08 | −2.3446223E−09 |
| A12 | −2.4754104E−11 | −2.3078203E−09 | 2.2877255E−09 |
| A13 | 9.5615642E−12 | 3.4497143E−10 | −8.5654087E−10 |
| A14 | −1.3307023E−12 | −3.0243530E−11 | 1.2994780E−10 |
| A15 | 7.3309814E−14 | 1.2827947E−12 | −9.6247446E−12 |
| A16 | −1.4681708E−15 | −1.9990960E−14 | 3.1326229E−13 |

| Sn | 8 | 16 | 17 |
|---|---|---|---|
| KA | −2.4377951E+00 | 5.8949378E+00 | 1.1735212E+00 |
| A3 | −4.1723591E−06 | −3.8662869E−04 | 1.6319367E−04 |
| A4 | 1.2762347E−04 | 5.3886050E−04 | −2.2291241E−05 |
| A5 | −3.6712678E−04 | −2.8013063E−04 | 2.0429936E−04 |
| A6 | 1.6247211E−04 | 1.0195699E−04 | −1.1600962E−04 |
| A7 | −2.6598520E−05 | −1.6970695E−05 | 3.8756835E−05 |
| A8 | −2.8363711E−06 | −4.5389813E−07 | −5.7254814E−06 |
| A9 | 1.5209056E−06 | 6.2251975E−07 | 6.7450662E−09 |
| A10 | −5.9229880E−08 | 9.8167649E−09 | 1.0630220E−07 |
| A11 | −3.7018273E−08 | −1.0124082E−08 | −2.4346747E−09 |
| A12 | 4.9005619E−09 | −5.5540570E−09 | −9.0274487E−10 |
| A13 | −5.3116523E−11 | 1.5154150E−09 | −3.2194027E−10 |
| A14 | −8.5084044E−12 | −1.0902059E−10 | 8.0836665E−11 |
| A15 | −2.1938069E−12 | 1.6262273E−11 | −1.0845132E−12 |
| A16 | 2.1069276E−13 | −2.4621394E−12 | −2.0066424E−13 |

Example 16

Figure 33:
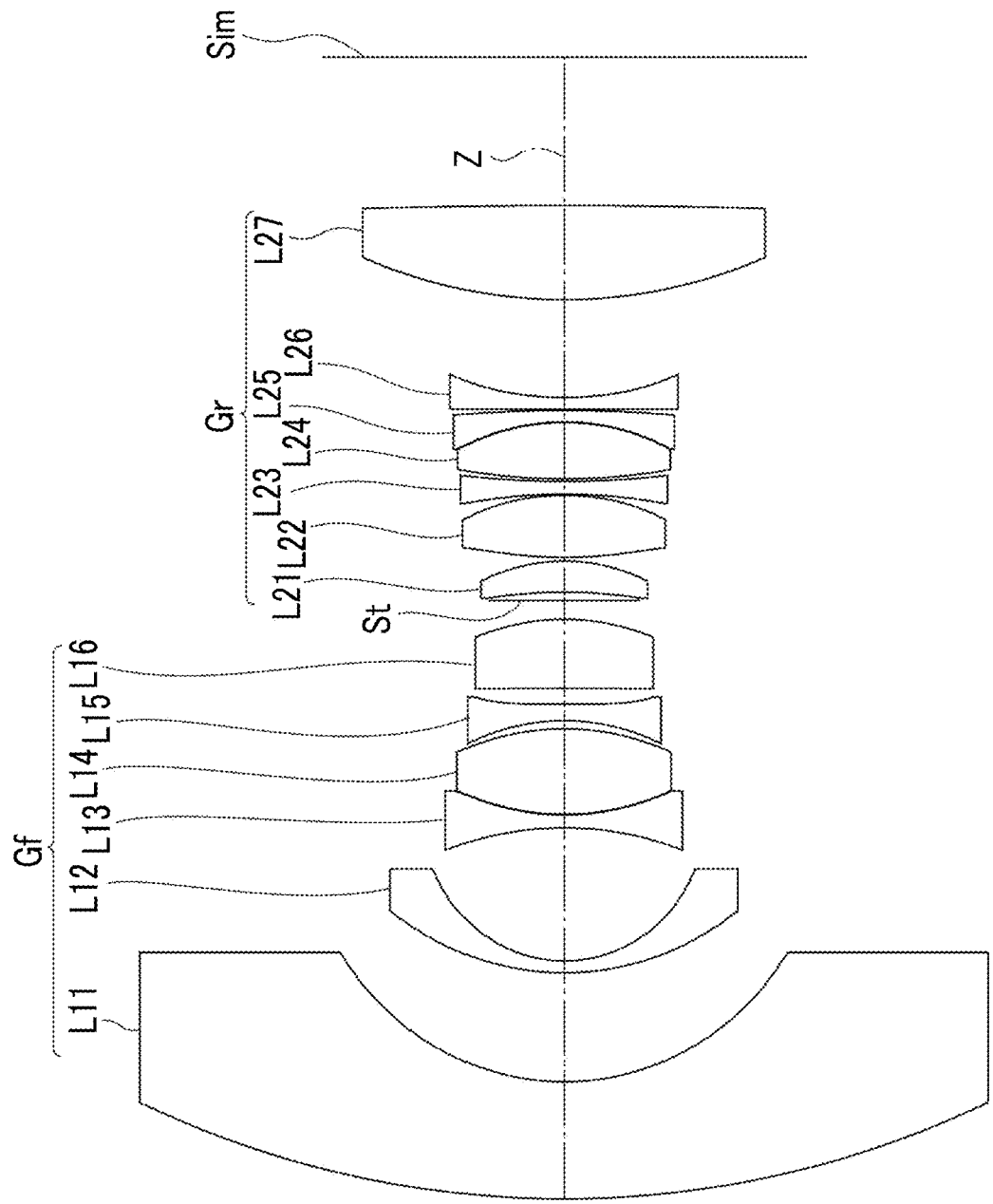
FIG. 33 is a cross-sectional view showing a configuration of an imaging lens of Example 16.

FIG. 33 is a cross-sectional view of a configuration of an imaging lens of Example 16 in a state where the infinite distance object is in focus. The imaging lens of Example 16 consists of, in order from the object side to the image side, the front group Gf that has a negative refractive power, the aperture stop St, and the rear group Gr that has a positive refractive power. The front group Gf consists of six lenses L11 to L16 in order from the object side to the image side. The rear group Gr consists of seven lenses L21 to L27 in order object side to the image side. The rear group Gr consists of five lenses L21 to L25 in order from the object side to the image side.

Figure 34:
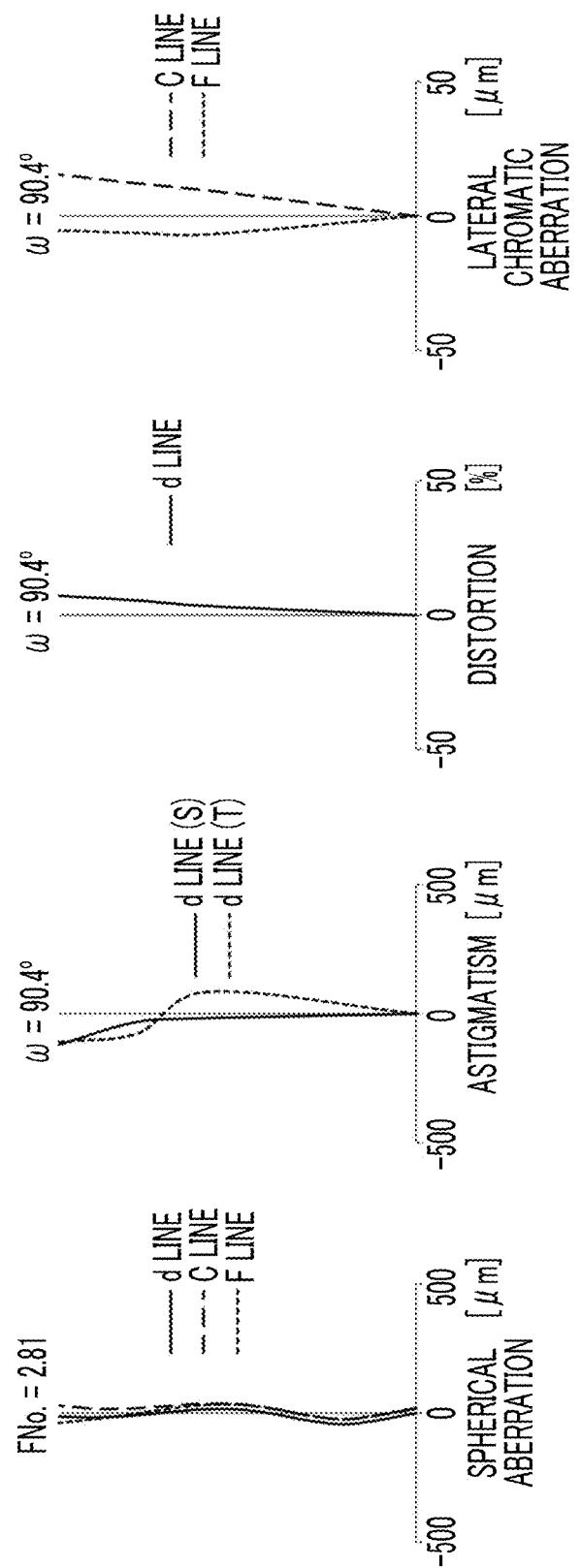
FIG. 34 is a diagram showing aberrations of the imaging lens of Example 16.

Regarding the imaging lens of Example 16, Table 55 shows basic lens data, Table 56 shows specifications, and Table 57 shows aspherical coefficients thereof. Further, FIG. 34 shows aberration diagrams.

TABLE 55

Example 16

| Sn | R | D | Nd | νd | θgF |
|---|---|---|---|---|---|
| 1 | 90.9993 | 10.0000 | 1.83481 | 42.72 | 0.56477 |
| 2 | 23.5045 | 9.3068 | | | |
| 3 | 25.2675 | 1.0000 | 1.49700 | 81.61 | 0.53887 |
| 4 | 12.5852 | 11.3705 | | | |
| 5 | −29.9738 | 1.1211 | 1.49700 | 81.61 | 0.53887 |
| 6 | 23.3671 | 7.3251 | 1.61340 | 44.27 | 0.56340 |
| 7 | −23.5126 | 0.6988 | | | |
| *8 | −18.8883 | 1.4154 | 1.49710 | 81.56 | 0.53848 |
| *9 | −1632.8530 | 1.3327 | | | |
| 10 | −961.1900 | 5.8996 | 1.55032 | 75.50 | 0.54001 |
| 11 | −21.2596 | 1.5319 | | | |
| 12(St) | ∞ | 0.7109 | | | |
| 13 | −44.8641 | 2.6485 | 1.49700 | 81.61 | 0.53887 |
| 14 | −16.9379 | 0.3178 | | | |
| *15 | 38.7705 | 5.2970 | 1.55332 | 71.68 | 0.54029 |
| *16 | −22.9951 | 0.0998 | | | |
| 17 | −49.7712 | 1.0898 | 1.69895 | 30.05 | 0.60290 |
| 18 | 82.3296 | 0.2082 | | | |
| 19 | 56.1459 | 4.8469 | 1.49700 | 81.61 | 0.53887 |
| 20 | −20.5506 | 1.0001 | 1.64769 | 33.84 | 0.59243 |
| 21 | −120.7579 | 0.1055 | | | |
| *22 | 752.7617 | 1.0015 | 1.80610 | 40.73 | 0.56940 |
| *23 | 30.2976 | 8.3457 | | | |
| 24 | 46.3084 | 8.0377 | 1.49700 | 81.61 | 0.53887 |
| 25 | −603.8195 | 12.6651 | | | |

TABLE 56

Example 16

| | |
|---|---|
| f | 14.19 |
| Bf | 12.66 |
| FNo. | 2.81 |
| 2ωm[°] | 180.8 |

TABLE 57

Example 16

| Sn | 8 | 9 | 15 |
|---|---|---|---|
| KA | 1.0000000E+00 | 1.0000000E+00 | 1.0000000E+00 |
| A3 | −1.3322676E−16 | 7.9959910E−20 | 8.6736174E−19 |
| A4 | 1.7144053E−04 | 1.4937138E−04 | −1.8539220E−05 |
| A5 | −9.8905146E−05 | −1.7447544E−07 | −5.6229592E−06 |
| A6 | 3.6030180E−05 | −5.8394544E−07 | 9.4050699E−07 |
| A7 | −7.8194176E−06 | 1.9088421E−07 | 5.6854054E−08 |
| A8 | 1.0269039E−06 | −1.6303516E−08 | −2.6788578E−08 |
| A9 | −7.2446962E−08 | −1.3949566E−09 | −1.7201934E−10 |

TABLE 57-continued

Example 16

| | | | |
|---|---|---|---|
| A10 | −8.9938894E−10 | 2.8071906E−10 | 4.1979110E−10 |
| A11 | 8.1199596E−10 | 5.8384675E−12 | −7.4645021E−12 |
| A12 | −7.2541049E−11 | −2.0491891E−12 | −3.3897391E−12 |
| A13 | −6.6092568E−14 | −1.4712123E−14 | 7.6585334E−14 |
| A14 | 4.2086520E−13 | 8.3021524E−15 | 1.5190150E−14 |
| A15 | −2.0189350E−14 | 2.1119170E−17 | −3.3322049E−16 |
| A16 | −6.8247005E−16 | −1.9345365E−17 | −3.8238864E−17 |
| A17 | 7.3854775E−17 | −1.4776980E−20 | 7.0825301E−19 |
| A18 | −5.9023423E−19 | 2.4298251E−20 | 5.0165310E−20 |
| A19 | −8.2143724E−20 | 2.9487869E−24 | −6.0319791E−22 |
| A20 | 1.9109424E−21 | −1.2766369E−23 | −2.6150539E−23 |

| Sn | 16 | 22 | 23 |
|---|---|---|---|
| KA | 1.0000000E+00 | 1.0000000E+00 | 1.0000000E+00 |
| A3 | 5.2041704E−19 | 0.0000000E+00 | 2.1684043E−20 |
| A4 | −4.0279123E−05 | −7.1334347E−05 | −9.9329091E−06 |
| A5 | −6.3496660E−06 | 9.3123555E−07 | −1.9326437E−06 |
| A6 | 3.7884733E−07 | 1.6002695E−06 | 1.1999578E−06 |
| A7 | 2.5459180E−07 | 1.7847956E−09 | 6.4138630E−08 |
| A8 | −2.2663244E−08 | −1.7289100E−08 | −1.7995176E−08 |
| A9 | −3.8662291E−09 | −1.1164513E−10 | −7.5640785E−10 |
| A10 | 4.6960870E−10 | 9.0633312E−11 | 1.2932337E−10 |
| A11 | 3.0118809E−11 | 8.8878277E−13 | 4.7712598E−12 |
| A12 | −4.5832569E−12 | −1.7072400E−13 | −5.2647983E−13 |
| A13 | −1.4932005E−13 | −3.6775802E−15 | −1.7771406E−14 |
| A14 | 2.5163159E−14 | −4.2949162E−16 | 1.2512494E−15 |
| A15 | 4.6632996E−16 | 8.6207862E−18 | 3.9080079E−17 |
| A16 | −8.0855981E−17 | 2.7786832E−18 | −1.6561487E−18 |
| A17 | −8.2800931E−19 | −1.0791923E−20 | −4.6899542E−20 |
| A18 | 1.4301038E−19 | −5.1558772E−21 | 1.0312072E−21 |
| A19 | 6.3347762E−22 | 5.5924922E−24 | 2.3676402E−23 |
| A20 | −1.0787440E−22 | 3.3976679E−24 | −1.5949256E−25 |

Example 17

Figure 35:
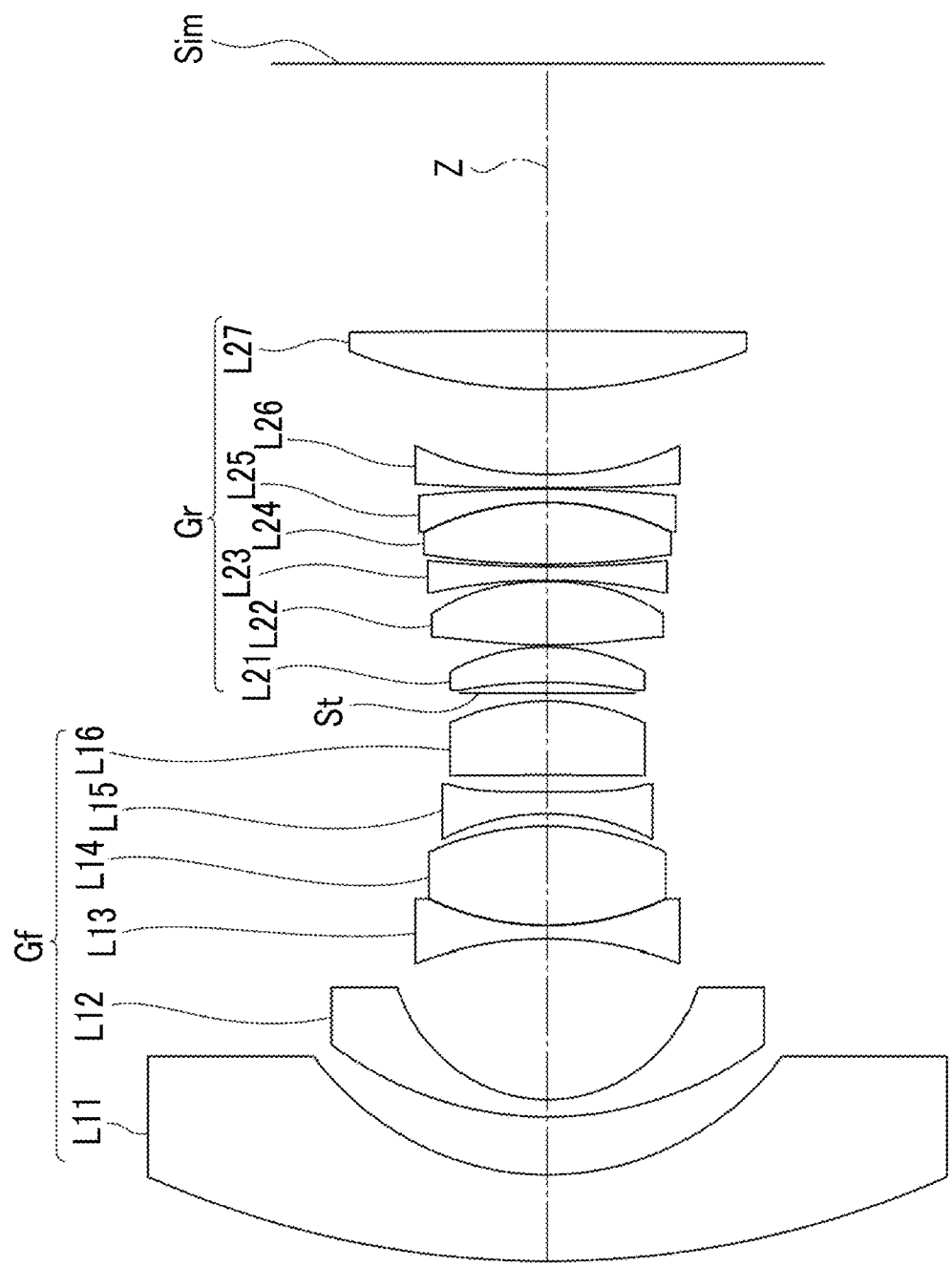
FIG. 35 is a cross-sectional view showing a configuration of an imaging lens of Example 17.

FIG. 35 is a cross-sectional view of a configuration of an imaging lens of Example 17 in a state where the infinite distance object is in focus. The imaging lens of Example 17 negative refractive power, the aperture stop St, and the rear group Gr that has a positive refractive power. The front group Gf consists of six lenses L11 to L16 in order from the object side to the image side. The rear group Gr consists of seven lenses L21 to L27 in order from the object side to the image side.

Figure 36:
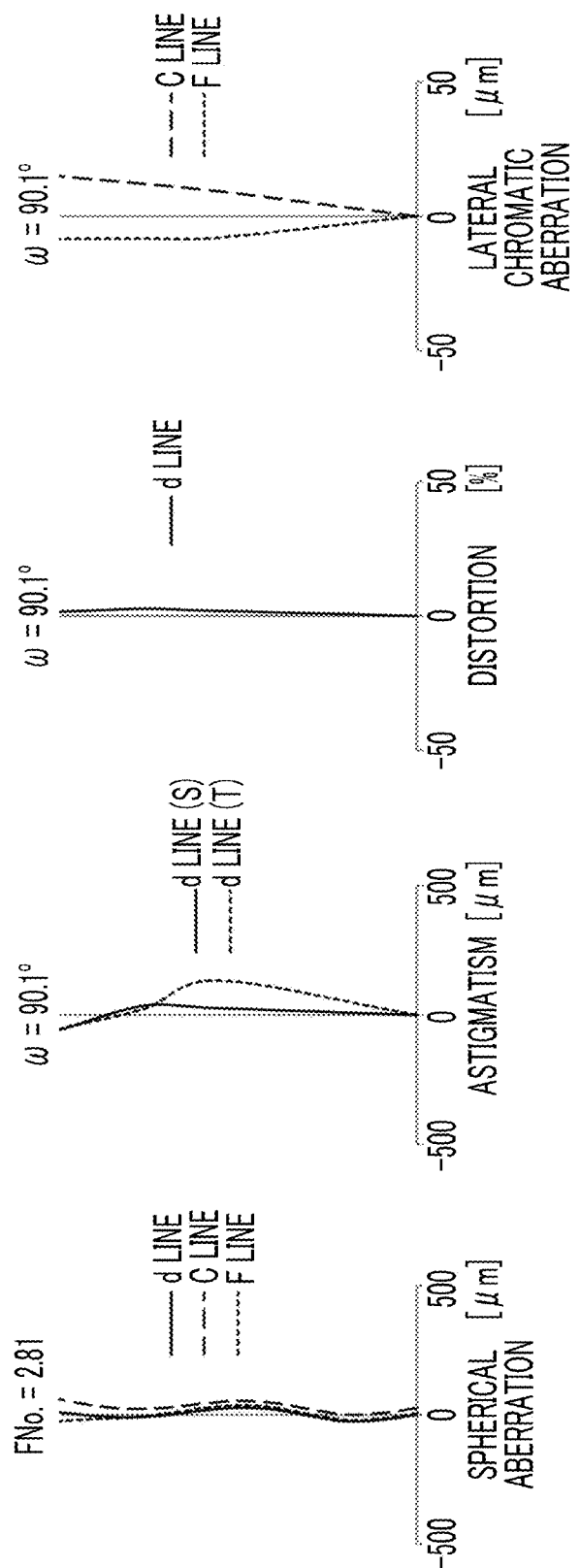
FIG. 36 is a diagram showing aberrations of the imaging lens of Example 17.

Regarding the imaging lens of Example 17, Table 58 shows basic lens data, Table 59 shows specifications, and Table 60 shows aspherical coefficients thereof. Further, FIG. 36 shows aberration diagrams.

TABLE 58

Example 17

| Sn | R | D | Nd | vd | θgF |
|---|---|---|---|---|---|
| 1 | 80.6071 | 6.4833 | 1.72916 | 54.67 | 0.54534 |
| 2 | 23.4306 | 4.3493 | | | |
| 3 | 29.1642 | 1.2988 | 1.49700 | 81.61 | 0.53887 |
| 4 | 12.4814 | 12.0030 | | | |
| 5 | −30.7204 | 1.0000 | 1.49700 | 81.61 | 0.53887 |
| 6 | 22.6502 | 7.4504 | 1.54814 | 45.78 | 0.56859 |
| 7 | −23.0352 | 0.9229 | | | |
| *8 | −18.6408 | 1.6624 | 1.49710 | 81.56 | 0.53848 |
| *9 | −1056.2254 | 1.2379 | | | |
| 10 | −854.6292 | 5.5630 | 1.52841 | 76.45 | 0.53954 |
| 11 | −18.6329 | 0.5920 | | | |
| 12(St) | ∞ | 0.8205 | | | |
| 13 | −40.0257 | 2.6584 | 1.49700 | 81.61 | 0.53887 |

TABLE 58-continued

Example 17

| Sn | R | D | Nd | vd | θgF |
|---|---|---|---|---|---|
| 14 | −16.7871 | 0.1310 | | | |
| *15 | 42.9238 | 4.7756 | 1.49710 | 81.56 | 0.53848 |
| *16 | −22.4309 | 0.1002 | | | |
| 17 | −44.3181 | 1.0002 | 1.64769 | 33.79 | 0.59393 |
| 18 | 94.8318 | 0.1869 | | | |
| 19 | 62.9022 | 4.6410 | 1.49700 | 81.61 | 0.53887 |
| 20 | −22.3275 | 1.0080 | 1.62004 | 36.26 | 0.58800 |
| 21 | −103.1231 | 0.1002 | | | |
| *22 | 234.3020 | 1.0001 | 1.80610 | 40.73 | 0.56940 |
| *23 | 31.3188 | 6.3776 | | | |
| 24 | 43.1948 | 4.3929 | 1.51823 | 58.90 | 0.54567 |
| 25 | −1086.9454 | 19.9894 | | | |

TABLE 59

Example 17

| | |
|---|---|
| f | 15.02 |
| Bf | 19.99 |
| FNo. | 2.81 |
| 2ωm[°] | 180.2 |

TABLE 60

Example 17

| Sn  | 8 | 9 | 15 |
|-----|---|---|----|
| KA  | 1.0000000E+00 | 1.0000000E+00 | 1.0000000E+00 |
| A3  | 3.1086245E−16 | −7.0473141E−20 | −1.0408341E−18 |
| A4  | 1.2411544E−04 | 1.3215225E−04 | −2.7511284E−05 |
| A5  | −9.6902475E−05 | 4.6641105E−07 | −8.9574492E−06 |
| A6  | 3.6810433E−05 | 1.7991075E−07 | 1.1579624E−06 |
| A7  | −7.8610042E−06 | 2.2650806E−07 | 1.0273952E−07 |
| A8  | 1.0162272E−06 | −2.8807615E−08 | −3.1868311E−08 |
| A9  | −7.2074663E−08 | −1.8211724E−09 | −5.4863739E−10 |
| A10 | −8.0801248E−10 | 3.9255909E−10 | 4.8065431E−10 |
| A11 | 8.1017292E−10 | 8.4923683E−12 | −5.3940975E−12 |
| A12 | −7.3026793E−11 | −2.6630780E−12 | −3.7905346E−12 |
| A13 | −6.0737784E−14 | −2.4441984E−14 | 6.9200653E−14 |
| A14 | 4.2247544E−13 | 1.0410969E−14 | 1.6731695E−14 |
| A15 | −2.0199090E−14 | 4.2192318E−17 | −3.1700935E−16 |
| A16 | −6.8571529E−16 | −2.3762747E−17 | −4.1705094E−17 |
| A17 | 7.3864920E−17 | −3.9738778E−20 | 6.8845442E−19 |
| A18 | −5.8659202E−19 | 2.9456477E−20 | 5.4396107E−20 |
| A19 | −8.2148296E−20 | 1.5391310E−23 | −5.9292881E−22 |
| A20 | 1.9091948E−21 | −1.5339651E−23 | −2.8318770E−23 |

| Sn  | 16 | 22 | 23 |
|-----|----|----|----|
| KA  | 1.0000000E+00 | 1.0000000E+00 | 1.0000000E+00 |
| A3  | 6.9388939E−19 | 2.4394549E−20 | −1.0842022E−20 |
| A4  | −7.7142176E−05 | −4.7488480E−05 | 2.7887359E−05 |
| A5  | −1.2319076E−05 | 2.5708522E−06 | −2.6884282E−06 |
| A6  | 1.1921638E−06 | 9.8416902E−07 | 8.3489995E−07 |
| A7  | 3.2313770E−07 | −1.8371805E−08 | 8.2484952E−08 |
| A8  | −3.3540579E−08 | −5.3278501E−09 | −1.5317106E−08 |
| A9  | −4.4271248E−09 | −2.9274433E−11 | −1.0049862E−09 |
| A10 | 5.6230700E−10 | −4.3406466E−11 | 1.1471676E−10 |
| A11 | 3.3040108E−11 | 8.4733917E−13 | 6.3837507E−12 |
| A12 | −5.0931025E−12 | 7.1007013E−13 | −4.7584856E−13 |
| A13 | −1.5891047E−13 | −4.5659311E−15 | −2.3716922E−14 |
| A14 | 2.6956337E−14 | −3.8988260E−15 | 1.1616547E−15 |
| A15 | 4.8555965E−16 | 1.2015524E−17 | 5.1845233E−17 |
| A16 | −8.4736867E−17 | 1.0843937E−17 | −1.6366255E−18 |
| A17 | −8.4950425E−19 | −1.5983013E−20 | −6.1783078E−20 |
| A18 | 1.4770663E−19 | −1.5359740E−20 | 1.1996977E−21 |
| A19 | 6.4373381E−22 | 8.5717302E−24 | 3.0962511E−23 |
| A20 | −1.1030227E−22 | 8.8153100E−24 | −3.3581783E−25 |

Example 18

Figure 37:
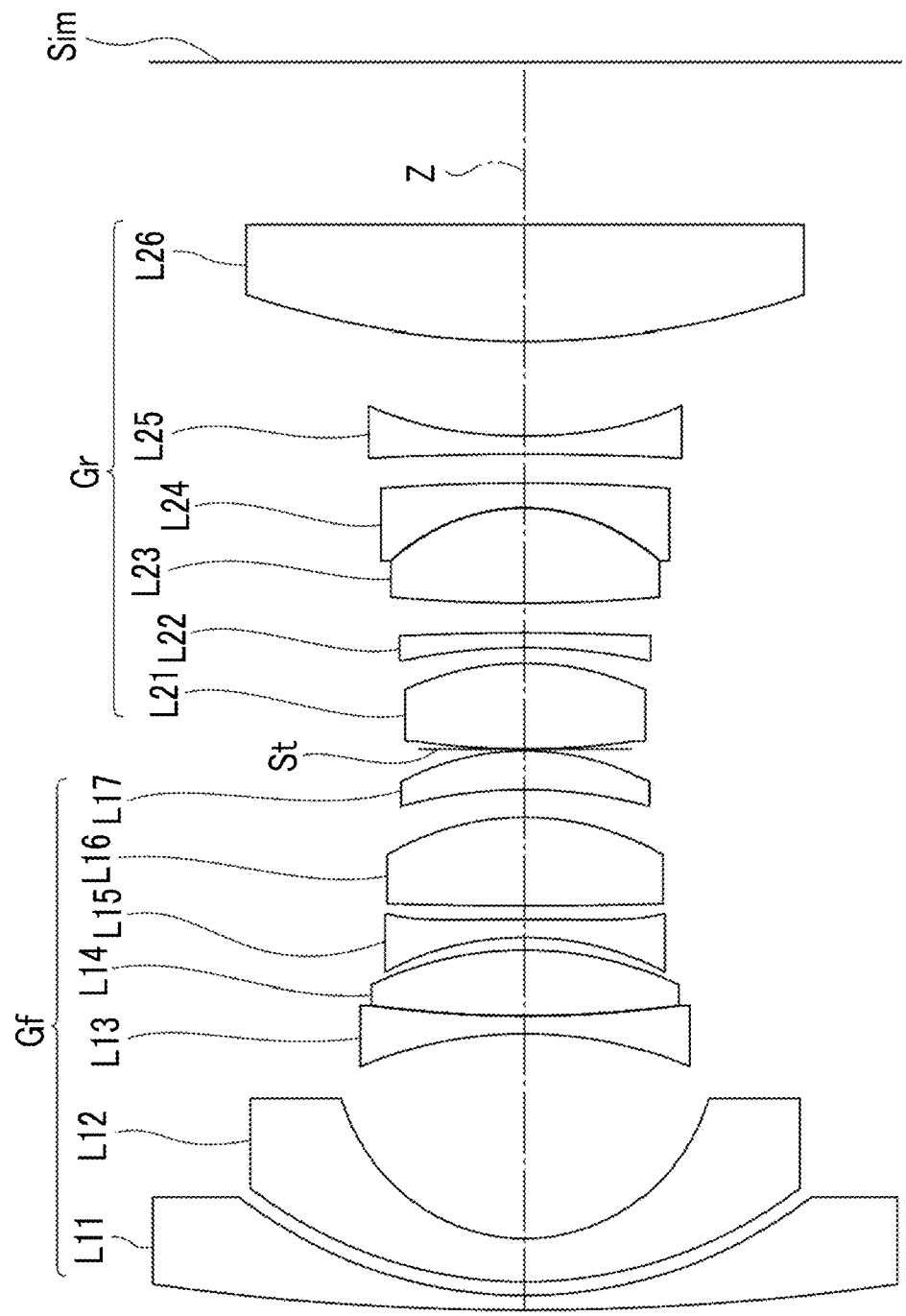
FIG. 37 is a cross-sectional view showing a configuration of an imaging lens of Example 18.

FIG. 37 is a cross-sectional view of a configuration of an imaging lens of Example 18 in a state where the infinite distance object is in focus. The imaging lens of Example 18 positive refractive power, the aperture stop St, and the rear group Gr that has a positive refractive power. The front group Gf consists of seven lenses L11 to L17 in order from the object side to the image side. The rear group Gr consists of six lenses L21 to L26 in order from the object side to the image side.

Figure 38:
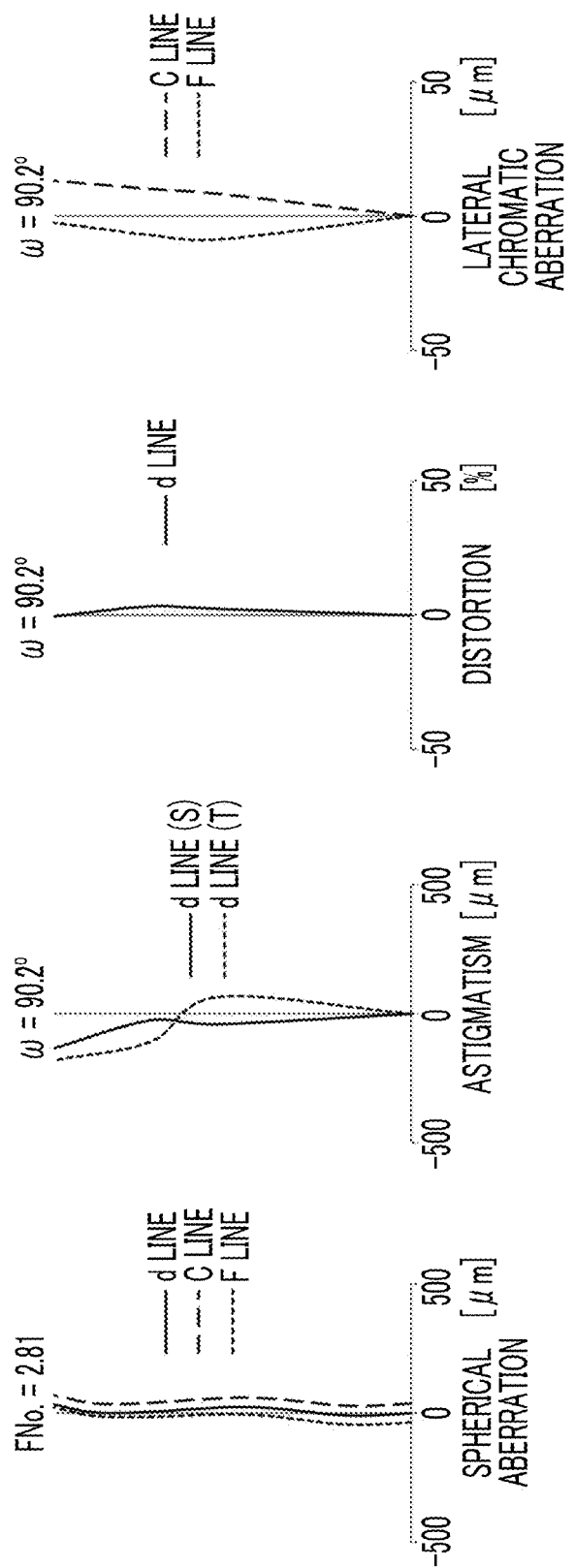
FIG. 38 is a diagram showing aberrations of the imaging lens of Example 18.

Regarding the imaging lens of Example 18, Table 61 shows basic lens data, Table 62 shows specifications, and Table 63 shows aspherical coefficients thereof. Further, FIG. 38 shows aberration diagrams.

TABLE 61

Example 18

| Sn | R | D | Nd | vd | θgF |
|----|---|---|----|----|----|
| 1 | 162.4622 | 0.8001 | 1.59282 | 68.62 | 0.54414 |
| 2 | 27.6196 | 0.7576 | | | |
| 3 | 26.7663 | 2.3734 | 1.49700 | 81.61 | 0.53887 |
| 4 | 11.0818 | 11.2736 | | | |
| 5 | −25.7535 | 0.9822 | 1.49700 | 81.61 | 0.53887 |
| 6 | 68.0331 | 3.5700 | 1.63930 | 44.87 | 0.56843 |

TABLE 61-continued

Example 18

| Sn | R | D | Nd | vd | θgF |
|----|---|---|----|----|----|
| 7 | −21.3003 | 0.6851 | | | |
| *8 | −20.0971 | 1.0002 | 1.80610 | 40.73 | 0.56940 |
| *9 | −233.8098 | 0.7392 | | | |
| 10 | 246.1223 | 4.8800 | 1.55200 | 70.70 | 0.54219 |
| 11 | −16.1532 | 1.5222 | | | |
| 12 | −28.1253 | 2.1369 | 1.49700 | 81.61 | 0.53887 |
| 13 | −15.6125 | 0.1001 | | | |
| 14(St) | ∞ | 0.0000 | | | |
| *15 | 47.1587 | 4.7160 | 1.49710 | 81.56 | 0.53848 |
| *16 | −17.4558 | 0.8561 | | | |
| 17 | −35.2786 | 0.8214 | 1.51742 | 52.43 | 0.55649 |
| 18 | −149.4807 | 1.6382 | | | |
| 19 | 89.2620 | 5.2322 | 1.49700 | 81.61 | 0.53887 |
| 20 | −11.6241 | 1.3708 | 1.62004 | 36.26 | 0.58800 |
| 21 | −116.5394 | 1.5964 | | | |
| *22 | −120.9774 | 1.0000 | 1.61881 | 63.85 | 0.54182 |
| *23 | 33.5887 | 5.1949 | | | |
| 24 | 52.1161 | 6.3753 | 1.49700 | 81.61 | 0.53887 |
| 25 | −28977110.1633 | 8.9391 | | | |

TABLE 62

Example 18

| | |
|---|---|
| f | 15.30 |
| Bf | 8.94 |
| FNo. | 2.81 |
| 2ωm[°] | 180.4 |

TABLE 63

Example 18

| Sn | 8 | 9 | 15 |
|---|---|---|---|
| KA | 1.0000000E+00 | 1.0000000E+00 | 1.0000000E+00 |
| A3 | −1.1102230E−16 | 9.5409791E−19 | −8.6736174E−19 |
| A4 | −6.7581904E−05 | −3.2556471E−05 | −2.4560846E−05 |
| A5 | −8.6045310E−05 | 2.2402360E−06 | 8.1936357E−06 |
| A6 | 3.9656193E−05 | 4.7218892E−06 | −6.5783167E−07 |
| A7 | −7.9837570E−06 | 3.5889751E−08 | −7.1205649E−08 |
| A8 | 9.6706399E−07 | −9.8636572E−08 | 9.5481248E−09 |
| A9 | −7.0836379E−08 | 1.4065345E−09 | 9.1141825E−10 |
| A10 | −2.4330585E−10 | 1.0876440E−09 | 3.6568570E−11 |
| A11 | 8.0212456E−10 | −1.6967536E−11 | −1.3874089E−11 |
| A12 | −7.6763585E−11 | −6.9171968E−12 | −1.0615800E−12 |
| A13 | −2.6650770E−14 | 8.6648791E−14 | 1.0130126E−13 |
| A14 | 4.3703638E−13 | 2.6316602E−14 | 6.6221575E−15 |
| A15 | −2.0286612E−14 | −2.3428888E−16 | −3.9188362E−16 |
| A16 | −7.1892024E−16 | −5.9196138E−17 | −1.9384011E−17 |
| A17 | 7.3985874E−17 | 3.2866788E−19 | 7.8595986E−19 |
| A18 | −5.4549945E−19 | 7.2668129E−20 | 2.7336827E−20 |
| A19 | −8.2216541E−20 | −1.8879518E−22 | −6.4709532E−22 |
| A20 | 1.8878515E−21 | −3.7549808E−23 | −1.4454538E−23 |

| Sn | 16 | 22 | 23 |
|---|---|---|---|
| KA | 1.0000000E+00 | 1.0000000E+00 | 1.0000000E+00 |
| A3 | −1.5612511E−18 | 1.8431437E−19 | 2.1684043E−20 |
| A4 | −7.0931151E−06 | 5.6646755E−05 | 1.4126479E−04 |
| A5 | −7.2588217E−06 | 2.3894133E−06 | −2.2109078E−06 |
| A6 | 2.2914362E−07 | −1.1100955E−06 | −1.4039837E−06 |
| A7 | 2.9097326E−07 | −2.0138149E−08 | 3.7406652E−08 |
| A8 | −2.7788112E−08 | 7.6542137E−09 | 8.4779263E−09 |
| A9 | −3.7944944E−09 | −2.2742023E−10 | −1.6850722E−10 |
| A10 | 5.8550454E−10 | 1.8757499E−13 | −3.8485026E−11 |
| A11 | 2.8034333E−11 | 3.1118968E−12 | −5.5427308E−13 |
| A12 | −5.5613322E−12 | −3.6192397E−13 | 1.2616400E−13 |
| A13 | −1.3743424E−13 | −1.6069200E−14 | 8.4818733E−15 |
| A14 | 2.9516223E−14 | 2.3810524E−15 | −2.7032531E−16 |
| A15 | 4.3283106E−16 | 4.2835502E−17 | −3.3611648E−17 |
| A16 | −9.1686562E−17 | −7.0729309E−18 | 3.1095413E−19 |
| A17 | −7.7995670E−19 | −5.8329673E−20 | 5.9492816E−20 |
| A18 | 1.5727683E−19 | 1.0349109E−20 | −8.7660418E−23 |
| A19 | 6.0547893E−22 | 3.2130481E−23 | −4.0434544E−23 |
| A20 | −1.1564039E−22 | −6.0541512E−24 | −9.7495202E−26 |

Example 19

Figure 39:
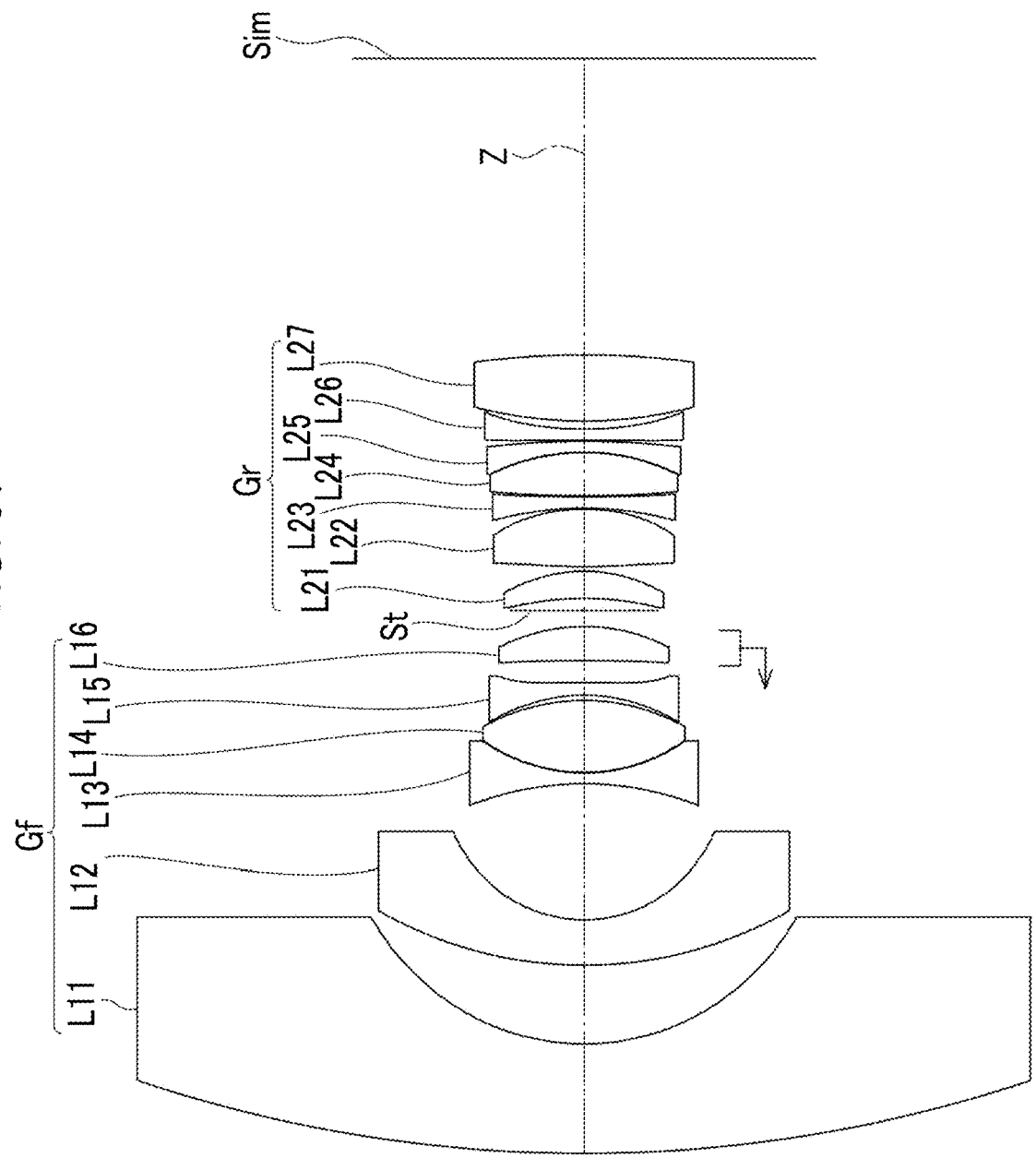
FIG. 39 is a cross-sectional view showing a configuration of an imaging lens of Example 19.

FIG. 39 is a cross-sectional view of a configuration of an imaging lens of Example 19 in a state where the infinite distance object is in focus. The imaging lens of Example 19 negative refractive power, the aperture stop St, and the rear group Gr that has a positive refractive power. The front group Gf consists of six lenses L11 to L16 in order from the object side to the image side. The rear group Gr consists of seven lenses L21 to L27 in order from the object side to the image side. During focusing from the infinite distance object to the closest object, the lens L16 moves toward the object side along the optical axis Z.

Figure 40:
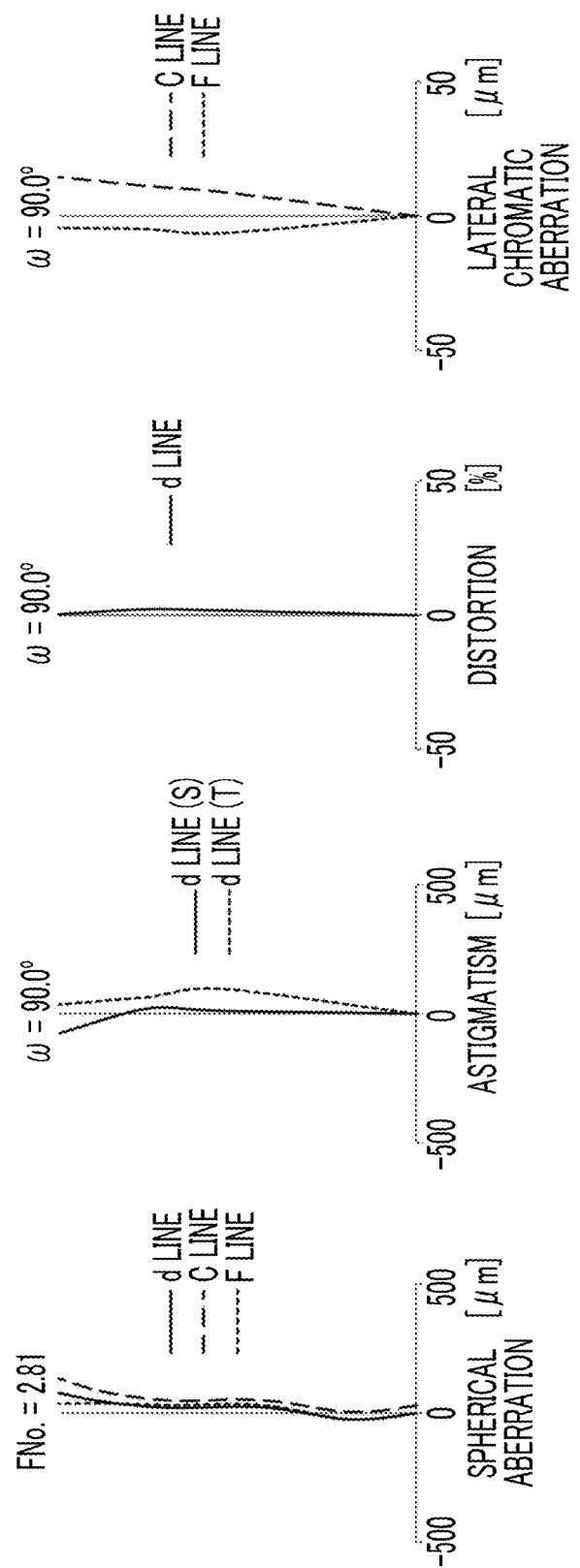
FIG. 40 is a diagram showing aberrations of the imaging lens of Example 19.

Regarding the imaging lens of Example 19, Table 64 shows basic lens data, Table 65 shows specifications, Table 66 shows variable surface spacings, and Table 67 shows aspherical coefficients thereof. Further, FIG. 40 shows aberration diagrams.

TABLE 64

Example 19

| Sn | R | D | Nd | νd | θgF |
|---|---|---|---|---|---|
| 1 | 139.6006 | 10.0000 | 1.55200 | 70.70 | 0.54219 |
| 2 | 23.5476 | 7.1845 | | | |
| 3 | 41.0046 | 4.1476 | 1.49700 | 81.61 | 0.53887 |
| 4 | 13.7327 | 12.3541 | | | |
| 5 | −30.9445 | 1.0133 | 1.49700 | 81.61 | 0.53887 |
| 6 | 17.3392 | 6.5981 | 1.51742 | 52.43 | 0.55649 |
| 7 | −20.4165 | 0.4858 | | | |
| *8 | −16.5031 | 1.1435 | 1.49710 | 81.56 | 0.53848 |
| *9 | −122.8217 | DD[9] | | | |
| 10 | −165.0115 | 3.1178 | 1.52841 | 76.45 | 0.53954 |
| 11 | −18.0269 | DD[11] | | | |
| 12(St) | ∞ | 1.1271 | | | |
| 13 | −29.8215 | 2.4719 | 1.49700 | 81.61 | 0.53887 |
| 14 | −15.4532 | 0.4270 | | | |
| *15 | 60.8094 | 5.2456 | 1.49710 | 81.56 | 0.53848 |
| *16 | −20.2003 | 0.0998 | | | |
| 17 | −33.3448 | 1.0154 | 1.60342 | 38.01 | 0.58283 |
| 18 | 149.6263 | 0.1042 | | | |
| 19 | 101.4636 | 3.9773 | 1.49700 | 81.61 | 0.53887 |
| 20 | −20.6514 | 1.0031 | 1.58144 | 40.89 | 0.57680 |
| 21 | −83.7135 | 0.1000 | | | |
| *22 | −10355.5657 | 1.0127 | 1.80610 | 40.73 | 0.56940 |
| *23 | 34.7040 | 0.7376 | | | |
| 24 | 42.9371 | 6.0487 | 1.53775 | 74.70 | 0.53936 |
| 25 | −81.0146 | 26.9959 | | | |

TABLE 65

Example 19

| | |
|---|---|
| f | 15.22 |
| Bf | 27.00 |
| FNo. | 2.81 |
| 2ωm[°] | 180.0 |

TABLE 66

Example 19

| | Infinity | 0.03 times |
|---|---|---|
| DD[9] | 2.0056 | 2.3664 |
| DD[11] | 1.4476 | 1.0868 |

TABLE 67

Example 19

| Sn | 8 | 9 | 15 |
|---|---|---|---|
| KA | 1.0000000E+00 | 1.0000000E+00 | 1.0000000E+00 |
| A3 | −8.8817842E−17 | 7.8062556E−19 | 3.4694470E−19 |
| A4 | 1.5394326E−04 | 1.5444263E−04 | −4.2345303E−05 |
| A5 | −9.8495094E−05 | −1.8002309E−06 | −6.5304808E−06 |
| A6 | 3.7182637E−05 | 1.0115293E−06 | 9.9065871E−07 |

TABLE 67-continued

| | Example 19 | | |
|---|---|---|---|
| A7 | −7.8113486E−06 | 2.1455976E−07 | 6.1454016E−08 |
| A8 | 1.0026418E−06 | −4.7246635E−08 | −2.5606067E−08 |
| A9 | −7.2514676E−08 | −1.1954475E−09 | −9.9702085E−11 |
| A10 | −6.3796721E−10 | 5.8886385E−10 | 4.0761249E−10 |
| A11 | 8.1311065E−10 | 3.6279306E−12 | −8.2153505E−12 |
| A12 | −7.4136554E−11 | −3.8544631E−12 | −3.3274151E−12 |
| A13 | −7.3000752E−14 | −4.2148137E−15 | 7.9983108E−14 |
| A14 | 4.2667172E−13 | 1.4757521E−14 | 1.4985079E−14 |
| A15 | −2.0169129E−14 | −6.1566862E−18 | −3.4170361E−16 |
| A16 | −6.9500091E−16 | −3.3195866E−17 | −3.7795850E−17 |
| A17 | 7.3825932E−17 | 2.2791486E−20 | 7.1961688E−19 |
| A18 | −5.7540207E−19 | 4.0684753E−20 | 4.9599459E−20 |
| A19 | −8.2127499E−20 | −1.8507241E−23 | −6.0958976E−22 |
| A20 | 1.9035125E−21 | −2.0985855E−23 | −2.5832745E−23 |
| Sn | 16 | 22 | 23 |
| KA | 1.0000000E+00 | 1.0000000E+00 | 1.0000000E+00 |
| A3 | −1.5612511E−18 | 9.4867690E−21 | 0.0000000E+00 |
| A4 | −1.0984325E−04 | −9.7712303E−05 | −2.0349166E−05 |
| A5 | −1.2199858E−05 | 4.1635049E−06 | 1.1571785E−06 |
| A6 | 1.7441433E−06 | 2.2684736E−06 | 1.8170550E−06 |
| A7 | 3.2445458E−07 | −3.9894861E−08 | 9.4556197E−09 |
| A8 | −3.9017801E−08 | −2.2760535E−08 | −2.7403856E−08 |
| A9 | −4.3976865E−09 | 1.4930896E−10 | −2.5270279E−10 |
| A10 | 6.0167568E−10 | 1.0537538E−10 | 2.0754868E−10 |
| A11 | 3.2690445E−11 | −1.2703517E−13 | 1.7624732E−12 |
| A12 | −5.3033277E−12 | −1.1203715E−13 | −9.3206416E−13 |
| A13 | −1.5711598E−13 | −1.1516849E−15 | −6.3103099E−15 |
| A14 | 2.7735422E−14 | −9.9120205E−16 | 2.6036621E−15 |
| A15 | 4.8061907E−16 | 4.6572240E−18 | 1.2466489E−17 |
| A16 | −8.6564207E−17 | 4.5297552E−18 | −4.4808379E−18 |
| A17 | −8.4239089E−19 | −7.0959669E−21 | −1.2685821E−20 |
| A18 | 1.5010551E−19 | −7.7191799E−21 | 4.3893005E−21 |
| A19 | 6.3952066E−22 | 3.9626259E−24 | 5.0341983E−24 |
| A20 | −1.1163592E−22 | 4.8788834E−24 | −1.8890327E−24 |

Example 20

Figure 41:
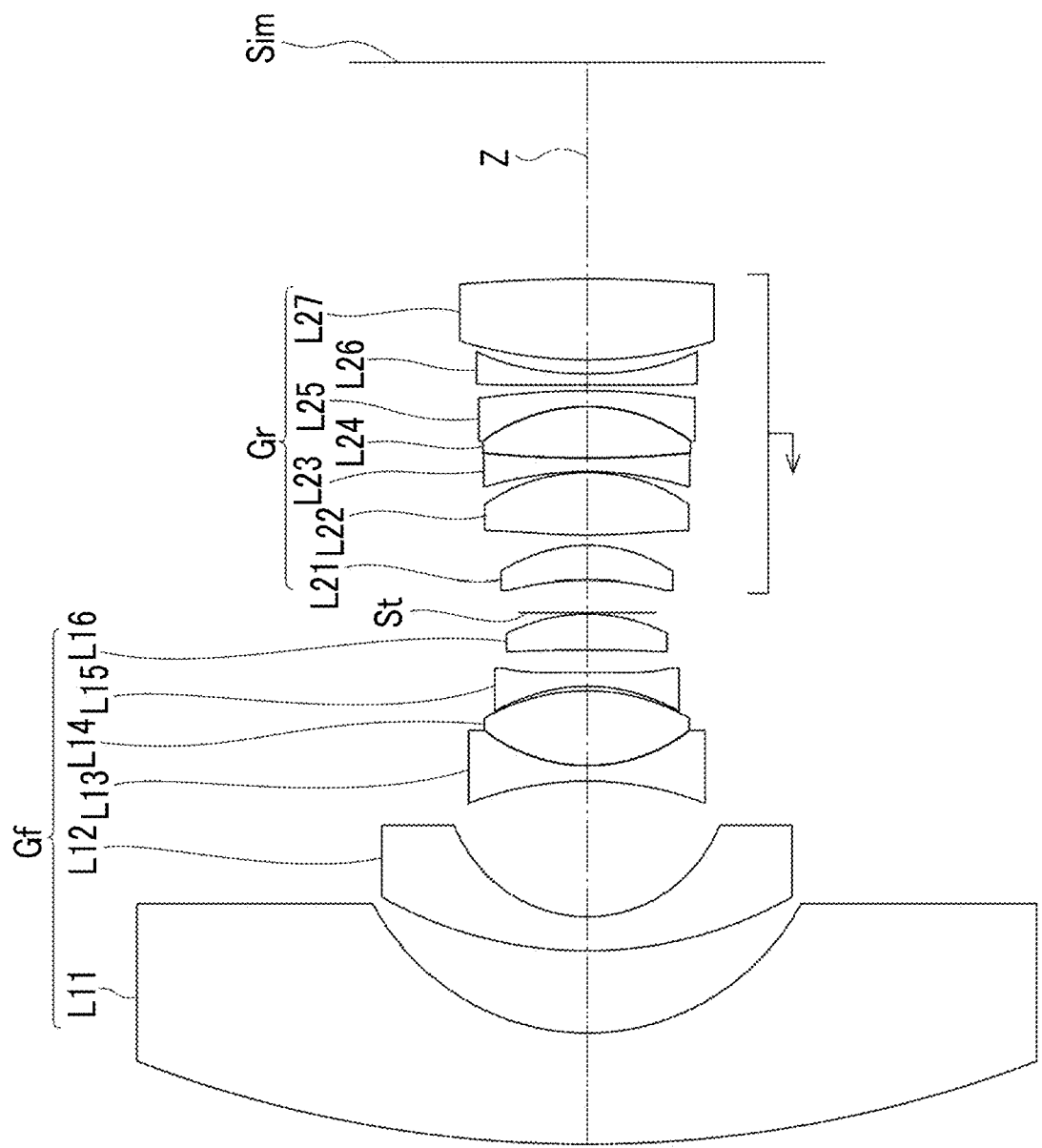
FIG. 41 is a cross-sectional view showing a configuration of an imaging lens of Example 20.

FIG. 41 is a cross-sectional view of a configuration of an imaging lens of Example 20 in a state where the infinite distance object is in focus. The imaging lens of Example 20 positive refractive power, the aperture stop St, and the rear group Gr that has a positive refractive power. The front group Gf consists of six lenses L11 to L16 in order from the object side to the image side. The rear group Gr consists of seven lenses L21 to L27 in order from the object side to the image side. During focusing from the infinite distance object to the closest object, the rear group Gr (lenses L21 to L27) moves integrally toward the object side along the optical axis Z.

Figure 42:
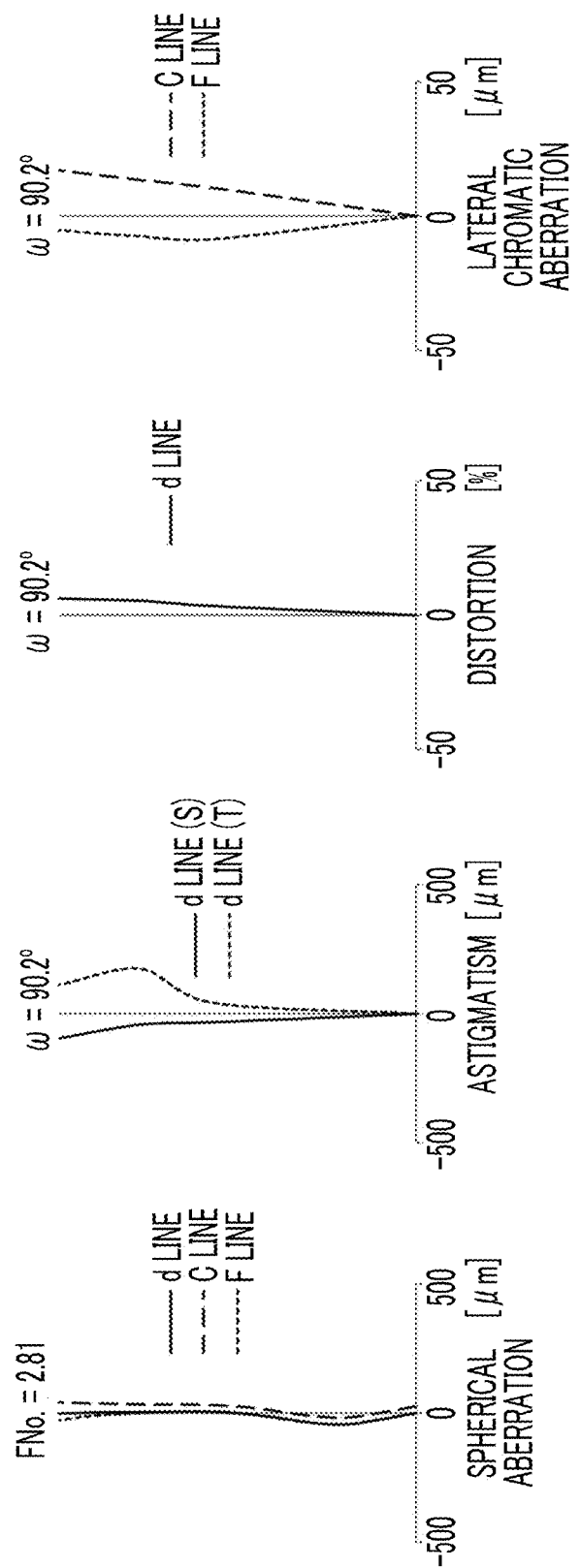
FIG. 42 is a diagram showing aberrations of the imaging lens of Example 20.

Regarding the imaging lens of Example 20, Table 68 shows basic lens data, Table 69 shows specifications, Table 70 shows variable surface spacings, and Table 71 shows aspherical coefficients thereof. Further, FIG. 42 shows aberration diagrams.

TABLE 68

| | Example 20 | | | | |
|---|---|---|---|---|---|
| Sn | R | D | Nd | νd | θgF |
| 1 | 123.3553 | 10.0002 | 1.55032 | 75.50 | 0.54001 |
| 2 | 23.2287 | 7.4110 | | | |
| 3 | 40.7226 | 3.0626 | 1.49700 | 81.61 | 0.53887 |
| 4 | 13.5631 | 12.2197 | | | |
| 5 | −31.6657 | 1.4047 | 1.49700 | 81.61 | 0.53887 |
| 6 | 16.2191 | 6.7350 | 1.51680 | 64.20 | 0.53430 |
| 7 | −19.9465 | 0.4056 | | | |
| *8 | −16.7628 | 1.2582 | 1.49710 | 81.56 | 0.53848 |

TABLE 68-continued

| | Example 20 | | | | |
|---|---|---|---|---|---|
| Sn | R | D | Nd | νd | θgF |
| *9 | −109.3056 | 2.0033 | | | |
| 10 | −172.3988 | 3.2466 | 1.52841 | 76.45 | 0.53954 |
| 11 | −16.9852 | 0.1162 | | | |
| 12(St) | ∞ | DD[12] | | | |
| 13 | −30.3087 | 3.0814 | 1.49700 | 81.61 | 0.53887 |
| 14 | −14.7905 | 0.9121 | | | |
| *15 | 56.7531 | 5.6194 | 1.49710 | 81.56 | 0.53848 |
| *16 | −19.9679 | 0.1001 | | | |
| 17 | −33.2777 | 1.2157 | 1.58144 | 40.89 | 0.57680 |
| 18 | 102.8252 | 4.6423 | 1.49700 | 81.61 | 0.53887 |
| 19 | −16.7519 | 1.4181 | 1.56732 | 42.84 | 0.57436 |
| 20 | −74.9691 | 0.5265 | | | |
| *21 | −2296.8563 | 1.0000 | 1.80610 | 40.73 | 0.56940 |
| *22 | 34.2026 | 1.2535 | | | |
| 23 | 42.9421 | 7.2892 | 1.49700 | 81.61 | 0.53887 |
| 24 | −148.5060 | DD[24] | | | |

TABLE 69

| Example 20 | |
|---|---|
| f | 14.35 |
| Bf | 19.50 |
| FNo. | 2.81 |
| 2ωm[°] | 180.4 |

TABLE 70

Example 20

|  | Infinity | 0.03 times |
|---|---|---|
| DD[12] | 2.9189 | 2.5226 |
| DD[24] | 19.5048 | 19.9011 |

TABLE 71

Example 20

| Sn | 8 | 9 | 15 |
|---|---|---|---|
| KA | 1.0000000E+00 | 1.0000000E+00 | 1.0000000E+00 |
| A3 | −4.4408921E−17 | −7.1557343E−19 | 6.9388939E−19 |
| A4 | 1.4167460E−04 | 1.3896225E−04 | −4.4263309E−05 |
| A5 | −9.8181091E−05 | 1.8460676E−06 | −3.8935103E−06 |
| A6 | 3.7353955E−05 | 9.6262520E−07 | 8.9347507E−07 |
| A7 | −7.8381722E−06 | 1.2860857E−07 | 3.1516543E−08 |
| A8 | 1.0010487E−06 | −4.5148047E−08 | −2.4731951E−08 |
| A9 | −7.2125748E−08 | −3.0619264E−10 | 3.3874977E−11 |
| A10 | −6.2692338E−10 | 5.6702735E−10 | 4.0491572E−10 |
| A11 | 8.1028819E−10 | −1.7549767E−12 | −8.4895943E−12 |
| A12 | −7.4188695E−11 | −3.7344961E−12 | −3.3324326E−12 |
| A13 | −6.1294722E−14 | 1.5713920E−14 | 7.9604776E−14 |
| A14 | 4.2682887E−13 | 1.4366583E−14 | 1.5045581E−14 |
| A15 | −2.0197269E−14 | −5.0477891E−17 | −3.3820047E−16 |
| A16 | −6.9528391E−16 | −3.2437610E−17 | −3.7960252E−17 |
| A17 | 7.3862443E−17 | 7.7099272E−20 | 7.1229766E−19 |
| A18 | −5.7513055E−19 | 3.9877308E−20 | 4.9778284E−20 |
| A19 | −8.2147282E−20 | −4.6654824E−23 | −6.0428960E−22 |
| A20 | 1.9034091E−21 | −2.0622097E−23 | −2.5890578E−23 |

| Sn | 16 | 21 | 22 |
|---|---|---|---|
| KA | 1.0000000E+00 | 1.0000000E+00 | 1.0000000E+00 |
| A3 | −3.4694470E−19 | −9.1479558E−20 | −1.0842022E−20 |
| A4 | −7.4868457E−05 | −7.9215388E−05 | −1.4068064E−05 |
| A5 | −7.7071747E−06 | 4.5910947E−06 | 1.4404869E−06 |
| A6 | 1.0511055E−06 | 1.7564737E−06 | 1.3572614E−06 |
| A7 | 2.6066228E−07 | −5.1952284E−08 | 1.4431773E−08 |
| A8 | −3.1092319E−08 | −1.4717002E−08 | −1.7813421E−08 |
| A9 | −3.8484757E−09 | 2.9676974E−10 | −3.2660067E−10 |
| A10 | 5.4413327E−10 | 3.4032362E−11 | 1.0771744E−10 |
| A11 | 2.9774721E−11 | −1.1292912E−12 | 2.2625675E−12 |
| A12 | −5.0330165E−12 | 2.7218510E−13 | −3.3130003E−12 |
| A13 | −1.4728843E−13 | 2.8513201E−15 | −8.2445499E−15 |
| A14 | 2.6914178E−14 | −2.2759815E−15 | 4.1688457E−16 |
| A15 | 4.6026957E−16 | −4.7103466E−18 | 1.6829049E−17 |
| A16 | −8.4999311E−17 | 7.1383885E−18 | 2.7490922E−19 |
| A17 | −8.1882305E−19 | 4.7981754E−21 | −1.8022891E−20 |
| A18 | 1.4839846E−19 | −1.0665447E−20 | −1.3021965E−21 |
| A19 | 6.2784202E−22 | −2.3663963E−24 | 7.7710977E−24 |
| A20 | −1.1082038E−22 | 6.2991796E−24 | 9.9619043E−25 |

Example 21

Figure 43:
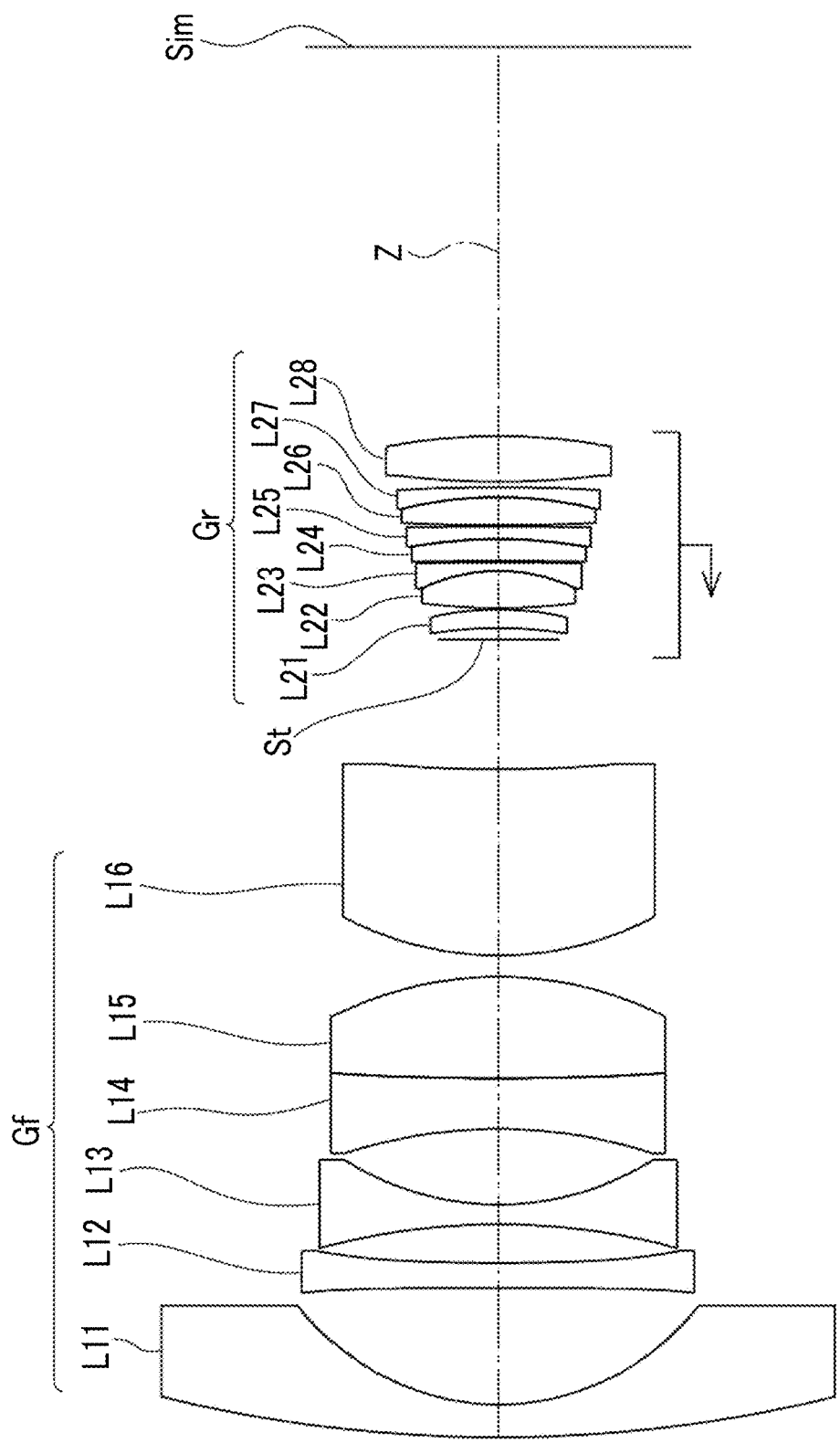
FIG. 43 is a cross-sectional view showing a configuration of an imaging lens of Example 21.

FIG. 43 is a cross-sectional view of a configuration of an imaging lens of Example 21 in a state where the infinite distance object is in focus. The imaging lens of Example 1 positive refractive power, the aperture stop St, and the rear group Gr that has a positive refractive power. The front group Gf consists of six lenses L11 to L16 in order from the object side to the image side. The rear group Gr consists of eight lenses L21 to L28 in order from the object side to the image side. During focusing from the infinite distance object to the closest object, the aperture stop St and the rear group Gr (lenses L21 to L28) move integrally toward the object side along the optical axis Z.

Figure 44:
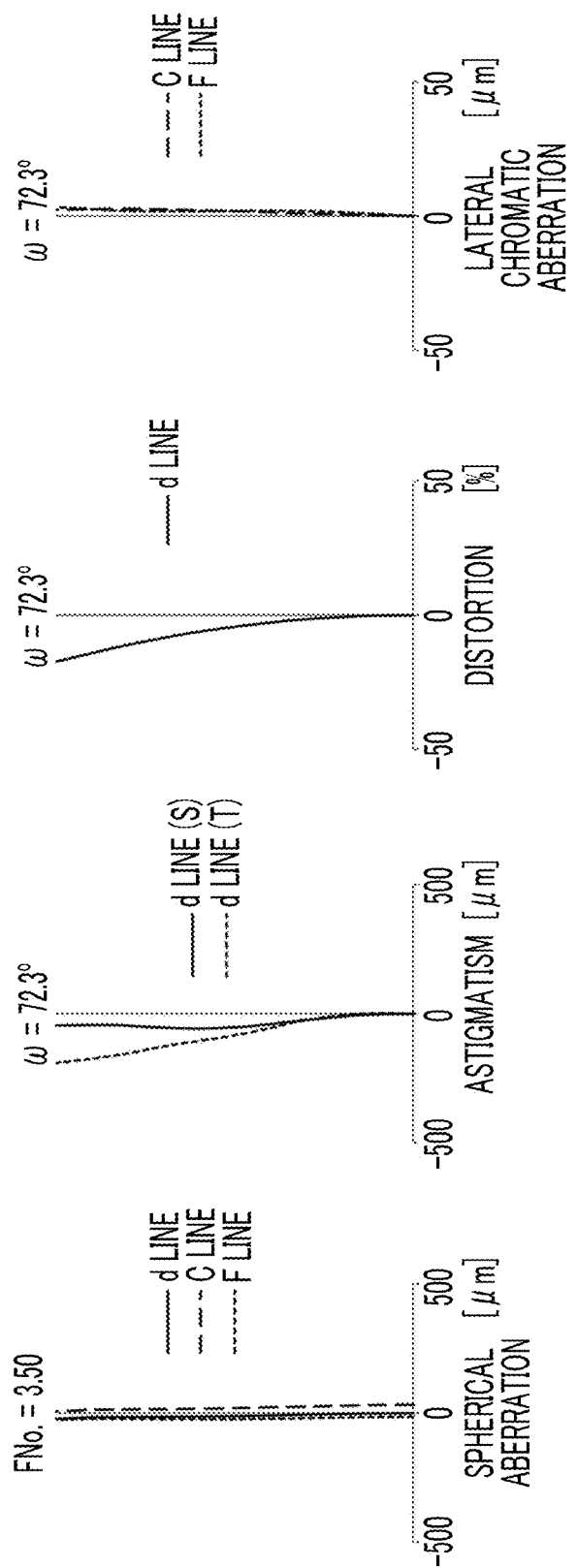
FIG. 44 is a diagram showing aberrations of the imaging lens of Example 21.

Regarding the imaging lens of Example 21, Table 72 shows basic lens data, Table 73 shows specifications, Table 74 shows variable surface spacings, and Table 75 shows aspherical coefficients thereof. Further, FIG. 44 shows aberration diagrams.

TABLE 72

Example 21

| Sn | R | D | Nd | νd | θgF |
|---|---|---|---|---|---|
| 1 | 109.6979 | 2.3318 | 1.51633 | 64.14 | 0.53531 |
| 2 | 19.2901 | 8.2748 |  |  |  |
| *3 | 2328.9879 | 1.8101 | 1.82165 | 24.04 | 0.62380 |
| *4 | 210.8889 | 2.7374 |  |  |  |
| 5 | −53.0304 | 1.4075 | 1.43875 | 94.66 | 0.53402 |
| 6 | 22.2919 | 5.3840 |  |  |  |
| 7 | −38.5129 | 3.5250 | 1.96300 | 24.11 | 0.62126 |
| 8 | 211.2769 | 7.2238 | 1.67790 | 55.35 | 0.54339 |
| 9 | −28.4567 | 1.5307 |  |  |  |
| *10 | 26.3685 | 13.2384 | 1.82165 | 24.04 | 0.62380 |
| *11 | 113.9076 | DD[11] |  |  |  |
| 12(St) | ∞ | 0.8113 |  |  |  |
| *13 | −39.7573 | 1.3192 | 1.88202 | 37.22 | 0.57699 |
| *14 | −27.2914 | 0.1228 |  |  |  |
| 15 | 47.9007 | 2.6451 | 1.49700 | 81.54 | 0.53748 |
| 16 | −13.6127 | 0.6095 | 1.85478 | 24.80 | 0.61232 |
| 17 | −235.8595 | 0.1072 |  |  |  |
| 18 | −386.3795 | 1.5461 | 1.89286 | 20.36 | 0.63944 |
| 19 | −38.7874 | 0.8851 | 1.43875 | 94.66 | 0.53402 |
| 20 | −511.3926 | 0.1012 |  |  |  |
| 21 | 171.2970 | 1.9952 | 1.43875 | 94.66 | 0.53402 |
| 22 | −31.7381 | 0.7105 | 1.67270 | 32.10 | 0.59891 |
| 23 | −135.3271 | 0.3781 |  |  |  |
| *24 | 55.2660 | 3.2643 | 1.55332 | 71.68 | 0.54029 |
| *25 | −45.9618 | DD[25] |  |  |  |

TABLE 73

Example 21

| f | 14.56 |
|---|---|
| Bf | 27.61 |
| FNo. | 3.50 |
| 2ωm[°] | 144.6 |

TABLE 74

Example 21

|  | Infinity | 0.05 times |
|---|---|---|
| DD[11] | 9.2304 | 8.4979 |
| DD[25] | 27.6135 | 28.3460 |

TABLE 75

Example 21

| Sn | 3 | 4 | 24 | 25 |
|---|---|---|---|---|
| KA | 7.9567369E+01 | −8.0944373E+02 | −1.3431704E+00 | −3.1615601E+00 |
| A3 | 1.3042852E−19 | −2.8023737E−19 | 9.5368852E−21 | 2.4788029E−20 |

TABLE 75-continued

Example 21

| | | | | |
|---|---|---|---|---|
| A4 | −6.9134979E−06 | 2.2658286E−05 | −2.3218631E−05 | 1.0392956E−07 |
| A5 | −1.0885753E−06 | −1.7124845E−06 | −8.2234250E−07 | −7.8766143E−07 |
| A6 | 1.4432784E−07 | 1.6104726E−07 | 1.2707932E−07 | 1.6959868E−08 |
| A7 | 4.7009722E−09 | 2.3467291E−09 | 5.2119979E−09 | 2.6669118E−09 |
| A8 | −1.1098140E−09 | −7.0672871E−10 | −9.1866079E−10 | −9.3635735E−11 |
| A9 | −7.2401770E−12 | 1.4062054E−12 | −2.6330736E−11 | −6.6629525E−12 |
| A10 | 3.2772507E−12 | 8.1881438E−13 | 7.5311345E−12 | 2.5002243E−13 |
| A11 | 7.0936900E−15 | 2.6677359E−15 | 1.2422798E−13 | 1.0843096E−14 |
| A12 | −5.0655832E−15 | 8.3906998E−16 | −4.3744325E−14 | −3.8246661E−16 |
| A13 | −5.3973666E−18 | −2.1923741E−17 | −3.8617878E−16 | −1.1109860E−17 |
| A14 | 4.4842420E−18 | −2.9721024E−18 | 1.4954532E−16 | 3.3283571E−19 |
| A15 | 3.3882870E−21 | 3.0228274E−20 | 6.6850276E−19 | 6.8410800E−21 |
| A16 | −2.2814673E−21 | 2.9665189E−21 | −2.9051956E−19 | −1.5056716E−22 |
| A17 | −1.4049180E−24 | −1.6665997E−23 | −5.8151658E−22 | −2.2790276E−24 |
| A18 | 6.1828676E−25 | −1.3315037E−24 | 2.9786513E−22 | 2.6110709E−26 |
| A19 | 2.5476258E−28 | 3.3230355E−27 | 1.9427683E−25 | 3.0869703E−28 |
| A20 | −6.8766924E−29 | 2.2956120E−28 | −1.2514076E−25 | 7.6318083E−31 |

| Sn | 10 | 11 | 13 | 14 |
|---|---|---|---|---|
| KA | 9.4292722E−01 | 1.1649454E+00 | 1.0130454E+00 | 6.2709228E−01 |
| A3 | 4.3470177E−25 | −3.8985865E−23 | −1.8782679E−23 | 4.8583004E−24 |
| A4 | 4.8629942E−06 | 8.7697005E−06 | −8.5613902E−05 | −1.0420834E−04 |
| A5 | −1.5036258E−08 | 1.7163879E−07 | 8.0627591E−07 | 1.3845792E−08 |
| A6 | −2.6136006E−09 | 9.0848965E−09 | −1.1222191E−06 | −4.8476560E−07 |
| A7 | 1.7207157E−09 | −6.1128228E−09 | 3.1668276E−08 | −1.2001436E−07 |
| A8 | −1.0204808E−10 | −4.9835155E−10 | 8.1970365E−10 | 1.3456046E−08 |
| A9 | −1.6113837E−11 | 1.9237031E−10 | −4.5859393E−09 | −1.6660310E−09 |
| A10 | 1.7769442E−12 | −2.0987143E−11 | 5.5988130E−10 | 2.5602303E−12 |
| A11 | −6.6765939E−14 | 7.2410746E−13 | −3.4463076E−11 | −7.4185477E−12 |

Example 22

Figure 45:
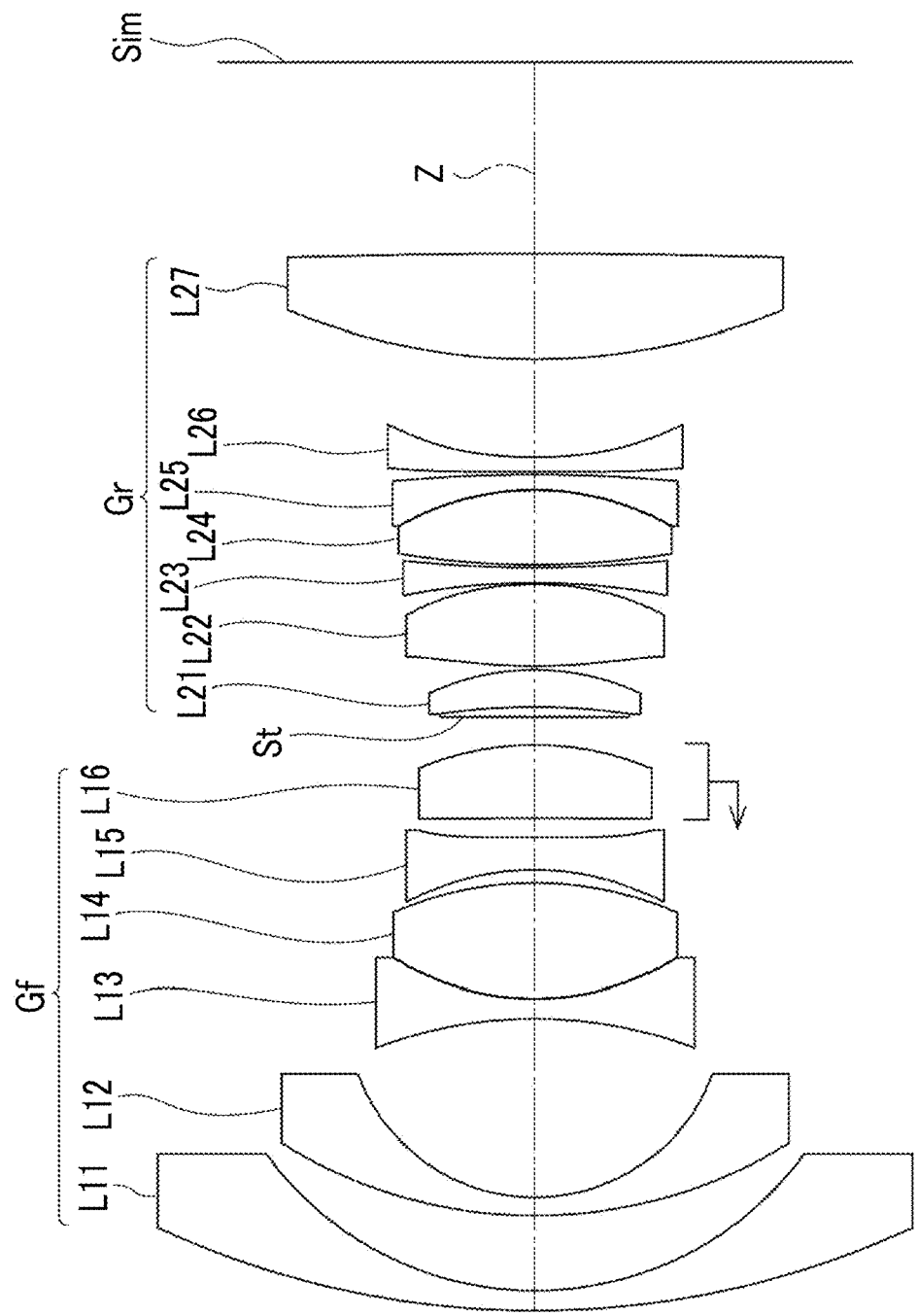
FIG. 45 is a cross-sectional view showing a configuration of an imaging lens of Example 22.

FIG. 45 is a cross-sectional view of a configuration of an imaging lens of Example 22 in a state where the infinite distance object is in focus. The imaging lens of Example 22 consists of, in order from the object side to the image side, the front group Gf that has a negative refractive power, the aperture stop St, and the rear group Gr that has a positive refractive power. The front group Gf consists of six lenses L11 to L16 in order from the object side to the image side. The rear group Gr consists of seven lenses L21 to L27 in order the closest object, the lens L16 moves toward the object side along the optical axis Z.

Figure 46:
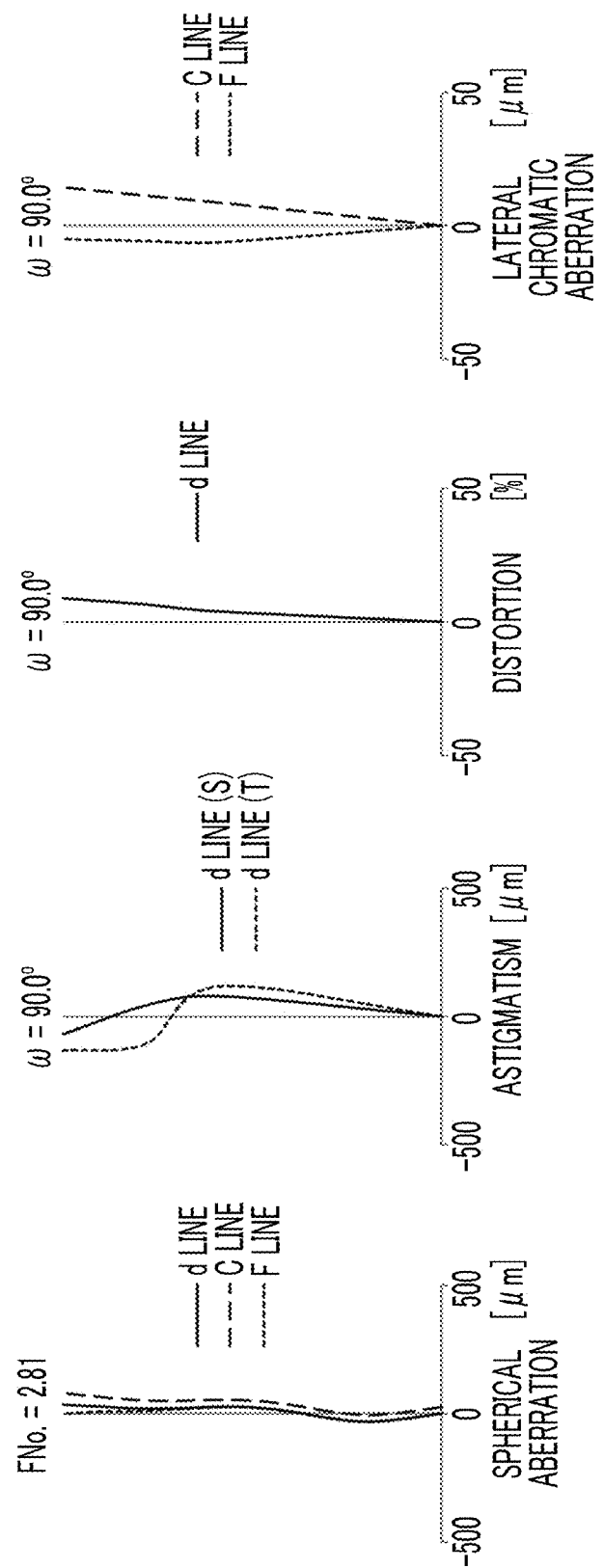
FIG. 46 is a diagram showing aberrations of the imaging lens of Example 22.

Regarding the imaging lens of Example 22, Table 76 shows basic lens data, Table 77 shows specifications, Table 78 shows variable surface spacings, and Table 79 shows aspherical coefficients thereof. Further, FIG. 46 shows aberration diagrams.

TABLE 76

Example 22

| Sn | R | D | Nd | νd | θgF |
|---|---|---|---|---|---|
| 1 | 61.6697 | 1.3710 | 1.80610 | 33.27 | 0.58845 |
| 2 | 22.8102 | 5.1694 | | | |
| 3 | 32.8022 | 1.2542 | 1.49700 | 81.61 | 0.53887 |
| 4 | 12.9381 | 12.2963 | | | |
| 5 | −30.7584 | 1.3648 | 1.49700 | 81.61 | 0.53887 |
| 6 | 18.2376 | 7.9311 | 1.61340 | 44.27 | 0.56340 |
| 7 | −24.0956 | 0.8969 | | | |
| *8 | −18.4051 | 2.2303 | 1.49710 | 81.56 | 0.53848 |
| *9 | −1538.0001 | DD[9] | | | |
| 10 | −764.5954 | 5.0542 | 1.55032 | 75.50 | 0.54001 |
| 11 | −20.5859 | DD[11] | | | |
| 12(St) | ∞ | 0.6832 | | | |
| 13 | −45.5809 | 2.5617 | 1.49700 | 81.61 | 0.53887 |
| 14 | −17.0830 | 0.2601 | | | |
| *15 | 39.0770 | 5.6250 | 1.55332 | 71.68 | 0.54029 |

TABLE 76-continued

Example 22

| Sn | R | D | Nd | νd | θgF |
|---|---|---|---|---|---|
| *16 | −22.8042 | 0.1013 | | | |
| 17 | −47.3977 | 1.0602 | 1.69895 | 30.05 | 0.60290 |
| 18 | 88.1307 | 0.1914 | | | |
| 19 | 57.8963 | 5.1431 | 1.49700 | 81.61 | 0.53887 |
| 20 | −18.7891 | 1.0557 | 1.64769 | 33.84 | 0.59243 |
| 21 | −106.0861 | 0.2024 | | | |
| *22 | 1828.8469 | 1.0016 | 1.80610 | 40.73 | 0.56940 |
| *23 | 29.8340 | 6.7443 | | | |
| 24 | 45.1373 | 7.1983 | 1.49700 | 81.61 | 0.53887 |
| 25 | −547.3601 | 13.1759 | | | |

TABLE 77

Example 22

| | |
|---|---|
| f | 14.03 |
| Bf | 13.18 |
| FNo. | 2.81 |
| 2ωm[°] | 180.0 |

TABLE 78

Example 22

| | Infinity | 0.03 times |
|---|---|---|
| DD[9] | 1.3094 | 1.7408 |
| DD[11] | 1.9309 | 1.4995 |

TABLE 79

| | Example 22 | | |
|---|---|---|---|
| Sn | 8 | 9 | 15 |
| KA | 1.0000000E+00 | 1.0000000E+00 | 1.0000000E+00 |
| A3 | 5.9952043E−16 | 8.4025668E−19 | −2.2551405E−18 |
| A4 | 9.1410533E−05 | 7.1792174E−05 | −2.7974362E−05 |
| A5 | −9.9228389E−05 | −5.5460945E−06 | −9.4617945E−06 |
| A6 | 3.7456690E−05 | 1.6201378E−06 | 1.1877916E−06 |
| A7 | −7.7509270E−06 | 2.7642392E−07 | 9.7780036E−08 |
| A8 | 1.0086862E−06 | −4.7353843E−08 | −3.1385285E−08 |
| A9 | −7.3239213E−08 | −2.0994290E−09 | −5.1428290E−10 |
| A10 | −7.5423232E−10 | 5.4520625E−10 | 4.6598640E−10 |
| A11 | 8.1720996E−10 | 9.6171314E−12 | −5.5442933E−12 |
| A12 | −7.3260893E−11 | −3.4559141E−12 | −3.6543335E−12 |
| A13 | −8.6667532E−14 | −2.7584117E−14 | 6.9650265E−14 |
| A14 | 4.2309007E−13 | 1.3003172E−14 | 1.6089183E−14 |
| A15 | −2.0141351E−14 | 4.8289023E−17 | −3.1787697E−16 |
| A16 | −6.8662911E−16 | −2.8926033E−17 | −4.0032472E−17 |
| A17 | 7.3793734E−17 | −4.7388261E−20 | 6.8940019E−19 |
| A18 | −5.8593945E−19 | 3.5170643E−20 | 5.2103373E−20 |
| A19 | −8.2111067E−20 | 2.0037595E−23 | −5.9335748E−22 |
| A20 | 1.9090657E−21 | −1.8029619E−23 | −2.7023669E−23 |
| Sn | 16 | 22 | 23 |
| KA | 1.0000000E+00 | 1.0000000E+00 | 1.0000000E+00 |
| A3 | −1.7347235E−19 | 2.2700483E−20 | 5.4210109E−20 |
| A4 | −5.4345474E−05 | −6.0483323E−05 | 3.0835006E−05 |
| A5 | −1.1838783E−05 | 7.3307199E−06 | −2.0587118E−06 |
| A6 | 1.0459218E−06 | 1.5094928E−06 | 1.3639661E−06 |
| A7 | 3.4078785E−07 | −7.8060212E−08 | 7.4219438E−08 |
| A8 | −3.5678185E−08 | −1.4769523E−08 | −2.4847238E−08 |
| A9 | −4.6845736E−09 | 4.3843629E−10 | −9.7957956E−10 |
| A10 | 6.0676443E−10 | 4.6310261E−11 | 1.9658709E−10 |
| A11 | 3.4857315E−11 | −1.4947814E−12 | 6.5855010E−12 |
| A12 | −5.4350458E−12 | 2.0596182E−13 | −8.8748990E−13 |
| A13 | −1.6631594E−13 | 2.9004924E−15 | −2.5546294E−14 |
| A14 | 2.8370761E−14 | −2.1601485E−15 | 2.4392020E−15 |
| A15 | 5.0317459E−16 | −2.6120552E−18 | 5.7788720E−17 |
| A16 | −8.8054179E−17 | 7.2218605E−18 | −4.0521074E−18 |
| A17 | −8.7223034E−19 | 5.0044477E−23 | −7.0842463E−20 |
| A18 | 1.5186516E−19 | −1.1172113E−20 | 3.7562276E−21 |
| A19 | 6.5603440E−22 | 1.0542324E−24 | 3.6385308E−23 |
| A20 | −1.1247014E−22 | 6.7508314E−24 | −1.4992952E−24 |

Tables 80 and 81 show corresponding values of Conditional Expressions (1) to (13) and (15) of the imaging lenses of Examples 1 to 22. The number of positive lenses included in the rear group Gr satisfying Conditional Expression (14) is 0 in Examples 1 and 3 to 22 and is 1 in Example 2.

TABLE 80

| Expression Number | Conditional Expression | Example 1 | Example 2 | Example 3 | Example 4 | Example 5 | Example 6 |
|---|---|---|---|---|---|---|---|
| (1) | ωm | 90.0 | 85.9 | 89.3 | 89.2 | 89.3 | 89.7 |
| (2) | $Bf/(2 \times f \times \sin(\omega m/2))$ | 0.898 | 1.099 | 1.037 | 0.849 | 1.067 | 1.002 |
| (3) | TL/f | 5.264 | 6.101 | 5.889 | 4.658 | 6.461 | 6.492 |
| (4) | Bf/TL | 0.241 | 0.245 | 0.248 | 0.256 | 0.232 | 0.218 |
| (5) | f/ff | 0.008 | −0.256 | −0.265 | −0.007 | −0.001 | −0.002 |
| (6) | f/fr | 0.422 | 0.516 | 0.534 | 0.565 | 0.556 | 0.475 |
| (7) | Ts/TL | 0.405 | 0.372 | 0.461 | 0.400 | 0.338 | 0.496 |
| (8) | f/fL1 | −0.283 | −0.250 | −0.301 | −0.363 | −0.337 | −0.334 |
| (9) | f/fL2 | −0.413 | −0.714 | −0.511 | −0.483 | −0.562 | −0.486 |
| (10) | (RL1f + RL1r)/(RL1f − RL1r) | 1.601 | 1.628 | 1.298 | 1.511 | 1.576 | 2.100 |
| (11) | (RL2f + RL2r)/(RL2f − RL2r) | 1.951 | 1.165 | 1.469 | 1.567 | 1.302 | 1.265 |
| (12) | NdL1 | 1.55032 | 1.43599 | 1.51633 | 1.57135 | 1.61997 | 1.80400 |
| (13) | FNo/sin(ωm/2) | 3.988 | 5.885 | 3.984 | 3.988 | 3.984 | 3.984 |
| (15) | $ED/(2 \times f \times \sin(\omega m/2))$ | 2.268 | 2.728 | 2.556 | 1.788 | 2.102 | 2.944 |

TABLE 80-continued

| Expression Number | Conditional Expression | Example 7 | Example 8 | Example 9 | Example 10 | Example 11 | Example 12 |
|---|---|---|---|---|---|---|---|
| (1) | ωm | 89.0 | 88.4 | 88.6 | 88.2 | 92.9 | 93.3 |
| (2) | $Bf/(2 \times f \times \sin(\omega m/2))$ | 1.041 | 0.925 | 0.664 | 0.458 | 0.759 | 0.860 |
| (3) | TL/f | 4.818 | 4.301 | 4.735 | 4.413 | 5.607 | 6.007 |
| (4) | Bf/TL | 0.303 | 0.300 | 0.196 | 0.145 | 0.196 | 0.208 |
| (5) | f/ff | −0.077 | −0.017 | −0.015 | −0.020 | −0.011 | −0.017 |
| (6) | f/fr | 0.617 | 0.568 | 0.577 | 0.623 | 0.536 | 0.508 |
| (7) | Ts/TL | 0.455 | 0.403 | 0.475 | 0.523 | 0.516 | 0.506 |
| (8) | f/fL1 | −0.333 | −0.270 | −0.281 | −0.269 | −0.222 | −0.238 |
| (9) | f/fL2 | −0.350 | −0.361 | −0.476 | −0.535 | −0.489 | −0.490 |
| (10) | (RL1f + RL1r)/(RL1f − RL1r) | 1.351 | 1.594 | 1.750 | 1.663 | 1.427 | 1.400 |
| (11) | (RL2f + RL2r)/(RL2f − RL2r) | 1.363 | 0.940 | 1.608 | 1.424 | 1.656 | 1.572 |
| (12) | NdL1 | 1.48749 | 1.57135 | 1.49700 | 1.65160 | 1.48749 | 1.48749 |
| (13) | FNo/sin(ωm/2) | 3.995 | 4.031 | 3.995 | 4.023 | 3.849 | 3.837 |
| (15) | $ED/(2 \times f \times \sin(\omega m/2))$ | 2.444 | 1.601 | 2.189 | 2.309 | 1.934 | 3.305 |

TABLE 81

| Expression Number | Conditional Expression | Example 13 | Example 14 | Example 15 | Example 16 | Example 17 | Example 18 |
|---|---|---|---|---|---|---|---|
| (1) | ωm | 89.5 | 89.1 | 89.1 | 90.4 | 90.1 | 90.2 |
| (2) | $Bf/(2 \times f \times \sin(\omega m/2))$ | 0.959 | 0.375 | 0.998 | 0.629 | 0.940 | 0.412 |
| (3) | TL/f | 7.606 | 6.404 | 6.514 | 6.862 | 5.975 | 4.481 |
| (4) | Bf/TL | 0.178 | 0.082 | 0.215 | 0.130 | 0.223 | 0.130 |
| (5) | f/ff | −0.023 | −0.012 | −0.003 | −0.055 | −0.074 | 0.379 |
| (6) | f/fr | 0.447 | 0.473 | 0.468 | 0.416 | 0.436 | 0.277 |
| (7) | Ts/TL | 0.566 | 0.583 | 0.497 | 0.524 | 0.474 | 0.450 |
| (8) | f/fL1 | −0.213 | −0.282 | −0.371 | −0.349 | −0.316 | −0.272 |
| (9) | f/fL2 | −0.480 | −0.375 | −0.468 | −0.274 | −0.333 | −0.382 |
| (10) | (RL1f + RL1r)/(RL1f − RL1r) | 1.291 | 1.663 | 1.907 | 1.696 | 1.820 | 1.410 |
| (11) | (RL2f + RL2r)/(RL2f − RL2r) | 1.469 | 1.317 | 1.306 | 2.985 | 2.496 | 2.413 |
| (12) | NdL1 | 1.48749 | 1.65160 | 1.80400 | 1.83481 | 1.72916 | 1.59282 |
| (13) | FNo/sin(ωm/2) | 3.991 | 4.034 | 4.006 | 3.960 | 3.970 | 3.967 |
| (15) | $ED/(2 \times f \times \sin(\omega m/2))$ | 4.719 | 3.807 | 2.905 | 3.755 | 2.943 | 1.972 |

| Expression Number | Conditional Expression | Example 19 | Example 20 | Example 21 | Example 22 |
|---|---|---|---|---|---|
| (1) | ωm | 90.0 | 90.2 | 72.3 | 90.0 |
| (2) | $Bf/(2 \times f \times \sin(\omega m/2))$ | 1.254 | 0.959 | 1.607 | 0.664 |
| (3) | TL/f | 6.561 | 6.784 | 6.786 | 6.116 |
| (4) | Bf/TL | 0.270 | 0.200 | 0.279 | 0.154 |
| (5) | f/ff | −0.132 | 0.003 | 0.090 | −0.022 |
| (6) | f/fr | 0.453 | 0.410 | 0.434 | 0.408 |
| (7) | Ts/TL | 0.496 | 0.492 | 0.574 | 0.476 |
| (8) | f/fL1 | −0.288 | −0.266 | −0.318 | −0.308 |
| (9) | f/fL2 | −0.348 | −0.338 | −0.052 | −0.320 |
| (10) | (RL1f + RL1r)/(RL1f − RL1r) | 1.406 | 1.464 | 1.406 | 2.174 |
| (11) | (RL2f + RL2r)/(RL2f − RL2r) | 2.007 | 1.999 | 2.007 | 2.303 |
| (12) | NdL1 | 1.55200 | 1.55032 | 1.51633 | 1.80610 |
| (13) | FNo/sin(ωm/2) | 3.974 | 3.967 | 5.933 | 3.974 |
| (15) | $ED/(2 \times f \times \sin(\omega m/2))$ | 3.961 | 4.159 | 2.613 | 2.610 |

As can be seen from the data described above, the imaging lenses of Examples 1 to 22 each maintain favorable optical performance while having a small size. Further, the imaging lenses of Examples 1 to 22 each have a full angle of view of greater than 140 degrees, which is a wide angle of view.

Figure 47:
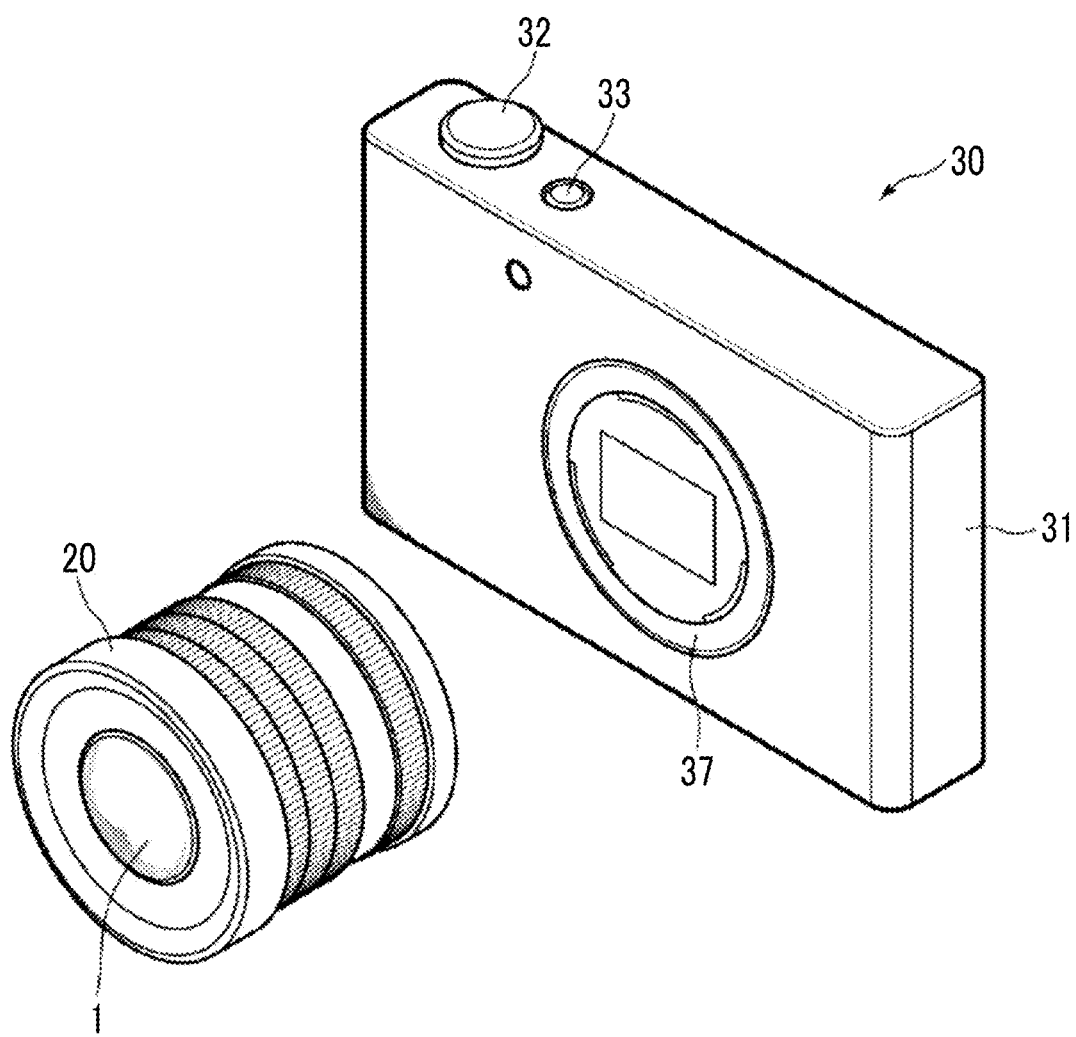
FIG. 47 is a perspective view of a front side of the imaging apparatus according to the embodiment.
Figure 48:
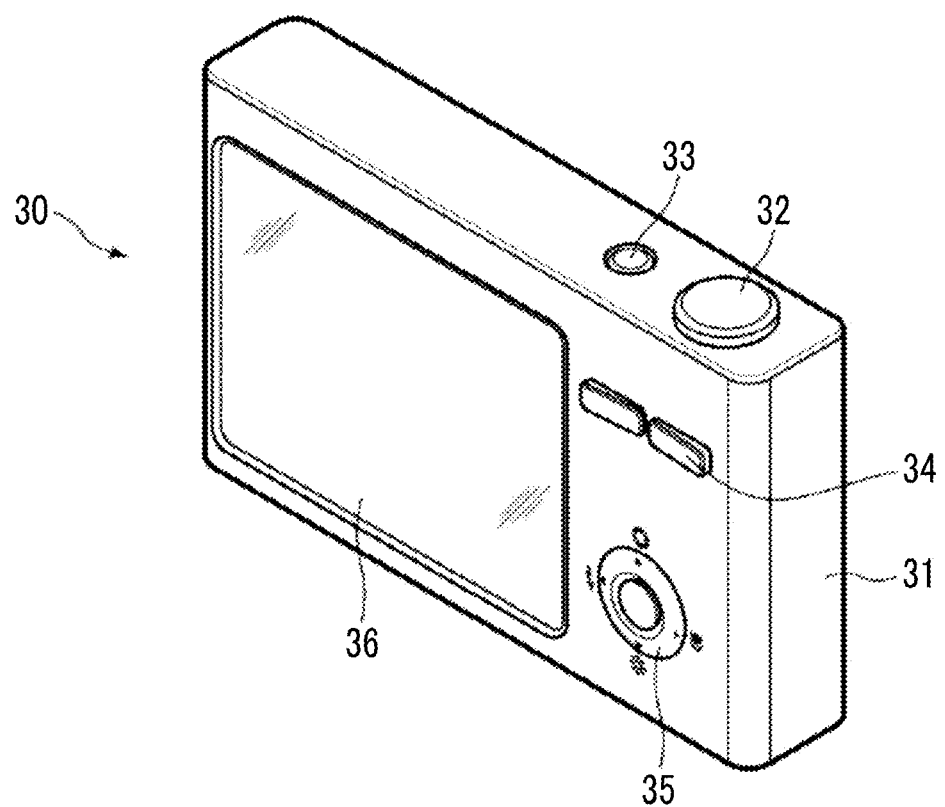
FIG. 48 is a perspective view of a rear side of the imaging apparatus according to the embodiment.

Next, an imaging apparatus according to an embodiment of the present disclosure will be described. FIGS. 47 and 48 are external views of a camera 30 which is the imaging apparatus according to the embodiment of the present disclosure. FIG. 47 is a perspective view of the camera 30 viewed from a front side, and FIG. 48 is a perspective view of the camera 30 viewed from a rear side. The camera 30 is a so-called mirrorless type digital camera, and the interchangeable lens 20 can be removably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video in a case where the shutter button 32 is pressed, and is able to store image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

Regarding the above-mentioned embodiments and examples, the following supplementary notes will be further disclosed.

Supplementary Note 1

An imaging lens consisting of, in order from an object side to an image side: a front group; a stop; and a rear group that has a refractive power, wherein the front group and the rear group are combined and include at least five negative lenses and at least three positive lenses, a lens closest to the object side in the front group is a first lens as a negative meniscus lens which has a convex surface facing toward the object side, a lens, which is second from the object side in the front group, is a second lens as a negative lens which has a concave surface facing toward the image side, the front group includes at least three negative lenses, which include the first lens and the second lens, and at least one positive lens, and assuming that a maximum half angle of view in a state where an infinite distance object is in focus is $\omega m$, a back focal length of a whole system at an air-equivalent distance in a state where the infinite distance object is in focus is Bf, a focal length of the whole system in a state where the infinite distance object is in focus is f, a sum of a distance on an optical axis from a lens surface closest to the object side to a lens surface closest to the image side and the back focal length at the air-equivalent distance in a state where the infinite distance object is in focus is TL, and a unit of $\omega m$ is degree, Conditional Expressions (1), (2), (3), and (4) are satisfied, which are represented by $$65 < \omega m < 130 \quad (1),$$

$$0.25 < Bf/(2 \times f \times \sin(\omega m/2)) < 2 \quad (2),$$

$$4 < TL/f < 8.5 \quad (3), \text{ and}$$

$$0.05 < Bf/TL < 0.35 \quad (4).$$

Supplementary Note 2

The imaging lens according to Supplementary Note 1, wherein assuming that a focal length of the front group in a state where the infinite distance object is in focus is ff, Conditional Expression (5) is satisfied, which is represented by $$-0.4 < f/ff < 0.4 \quad (5).$$

Supplementary Note 3

The imaging lens according to Supplementary Note 1 or 2, wherein assuming that a focal length of the rear group in a state where the infinite distance object is in focus is fr, Conditional Expression (6) is satisfied, which is represented by $$0.1 < f/fr < 1.3 \quad (6).$$

Supplementary Note 4

The imaging lens according to any one of Supplementary Notes 1 to 3, wherein assuming that a distance on the optical axis from the lens surface closest to the object side to the stop in a state where the infinite distance object is in focus is Ts, Conditional Expression (7) is satisfied, which is represented by $$0.1 < Ts/TL < 0.9 \quad (7).$$

Supplementary Note 5

The imaging lens according to any one of Supplementary Notes 1 to 4, wherein assuming that a focal length of the first lens is fL1, Conditional Expression (8) is satisfied, which is represented by $$-0.6 < f/fL1 < -0.1 \quad (8).$$

Supplementary Note 6

The imaging lens according to any one of Supplementary Notes 1 to 5, wherein assuming that a focal length of the second lens is fL2, Conditional Expression (9) is satisfied, which is represented by $$-1 < f/fL2 < -0.1 \quad (9).$$

Supplementary Note 7

The imaging lens according to any one of Supplementary Notes 1 to 6, wherein assuming that
- a paraxial curvature radius of an object side surface of the first lens is RL1f, and
- a paraxial curvature radius of an image side surface of the first lens is RL1r,
- Conditional Expression (10) is satisfied, which is represented by $$1<(RL1f+RL1r)/(RL1f-RL1r)<3.5 \quad (10).$$

Supplementary Note 8

The imaging lens according to any one of Supplementary Notes 1 to 7, wherein the second lens is a negative meniscus lens which has a convex surface facing toward the object side.

Supplementary Note 9

The imaging lens according to Supplementary Note 8, wherein assuming that
- a paraxial curvature radius of an object side surface of the second lens is RL2f, and
- a paraxial curvature radius of an image side surface of the second lens is RL2r,
- Conditional Expression (11) is satisfied, which is represented by $$1<(RL2f+RL2r)/(RL2f-RL2r)<4.5 \quad (11).$$

Supplementary Note 10

The imaging lens according to any one of Supplementary Notes 1 to 9, wherein assuming that a refractive index of the first lens at a d line is NdL1, Conditional Expression (12) is satisfied, which is represented by $$1.43<NdL1<1.95 \quad (12).$$

Supplementary Note 11

The imaging lens according to any one of Supplementary Notes 1 to 10, wherein assuming that an open F number of the imaging lens in a state where the infinite distance object is in focus is FNo, Conditional Expression (13) is satisfied, which is represented by $$2.5<FNo/\sin(\omega m/2)<6 \quad (13).$$

Supplementary Note 12

The imaging lens according to any one of Supplementary Notes 1 to 11, wherein assuming that a central thickness of each lens included in the rear group is D, Conditional Expression (14) is represented by $$0.155<D/TL \quad (14), \text{ and}$$

the number of lenses, each of which satisfies Conditional Expression (14) and has a positive refractive power, is equal to or less than 1.

Supplementary Note 13

The imaging lens according to Supplementary Note 12, wherein Conditional Expression (3-1) is satisfied, which is represented by $$4.4<TL/f<6.7 \quad (3-1).$$

Supplementary Note 14

The imaging lens according to any one of Supplementary Notes 1 to 13, wherein a lens closest to the image side in the rear group is a lens which has a convex surface facing toward the image side.

Supplementary Note 15

The imaging lens according to any one of Supplementary Notes 1 to 14, wherein assuming that an effective diameter of an object side surface of the first lens is ED, Conditional Expression (15) is satisfied, which is represented by $$1.5<ED/(2\times f\times\sin(\omega m/2))<5 \quad (15).$$

Supplementary Note 16

The imaging lens according to any one of Supplementary Notes 1 to 15, wherein the front group includes a cemented lens.

Supplementary Note 17

The imaging lens according to any one of Supplementary Notes 1 to 16, wherein a lens closest to the image side in the front group is a lens which has a concave surface facing toward the object side.

Supplementary Note 18

The imaging lens according to any one of Supplementary Notes 1 to 17, wherein in the rear group, the number of cemented surfaces to which lenses adjacent to each other are cemented is equal to or less than 2.

Supplementary Note 19

The imaging lens according to any one of Supplementary Notes 1 to 18, wherein the front group or the rear group includes at least one lens which moves along the optical axis during focusing.

Supplementary Note 20

An imaging apparatus comprising the imaging lens according to any one of Supplementary Notes 1 to 19.

What is claimed is:

1. An imaging lens consisting of, in order from an object side to an image side: a front group; a stop; and a rear group that has a refractive power, wherein:
   - the front group and the rear group are combined and include at least five negative lenses and at least three positive lenses,
   - a lens closest to the object side in the front group is a first lens as a negative meniscus lens which has a convex surface facing toward the object side,
   - a lens, which is second from the object side in the front group, is a second lens as a negative lens which has a concave surface facing toward the image side,
   - the front group includes at least three negative lenses, which include the first lens and the second lens, and at least one positive lens, and
   - assuming that
     - a maximum half angle of view in a state where an infinite distance object is in focus is ωm,
     - a back focal length of the imaging lens at an air-equivalent distance in a state where the infinite distance object is in focus is Bf,
     - a focal length of the imaging lens in a state where the infinite distance object is in focus is f,
     - a sum of a distance on an optical axis from a lens surface closest to the object side to a lens surface closest to the image side and the back focal length at the air-equivalent distance in a state where the infinite distance object is in focus is TL, and
     - a unit of ωm is degree,
   - Conditional Expressions (1), (2), (3), and (4) are satisfied, which are represented by $$65<\omega m<130 \quad (1),$$

$$0.25<Bf/(2\times f\times\sin(\omega m/2))<2 \quad (2),$$

$$4<TL/f<8.5 \quad (3), \text{ and}$$

$$0.05<Bf/TL<0.35 \quad (4).$$

2. The imaging lens according to claim 1, wherein assuming that a focal length of the front group in a state where the infinite distance object is in focus is ff, Conditional Expression (5) is satisfied, which is represented by $$-0.4 < f/f\!f < 0.4 \tag{5}$$

3. The imaging lens according to claim 1, wherein assuming that a focal length of the rear group in a state where the infinite distance object is in focus is fr, Conditional Expression (6) is satisfied, which is represented by $$0.1 < f/fr < 1.3 \tag{6}$$

4. The imaging lens according to claim 1, wherein assuming that a distance on the optical axis from the lens surface closest to the object side to the stop in a state where the infinite distance object is in focus is Ts, Conditional Expression (7) is satisfied, which is represented by $$0.1 < Ts/TL < 0.9 \tag{7}$$

5. The imaging lens according to claim 1, wherein assuming that a focal length of the first lens is fL1, Conditional Expression (8) is satisfied, which is represented by $$-0.6 < f/fL1 < -0.1 \tag{8}$$

6. The imaging lens according to claim 1, wherein assuming that a focal length of the second lens is fL2, Conditional Expression (9) is satisfied, which is represented by $$-1 < f/fL2 < -0.1 \tag{9}$$

7. The imaging lens according to claim 1, wherein assuming that
   a paraxial curvature radius of an object side surface of the first lens is RL1f, and
   a paraxial curvature radius of an image side surface of the first lens is RL1r,
   Conditional Expression (10) is satisfied, which is represented by $$1 < (RL1f+RL1r)/(RL1f-RL1r) < 3.5 \tag{10}$$

8. The imaging lens according to claim 1, wherein the second lens is a negative meniscus lens which has a convex surface facing toward the object side.

9. The imaging lens according to claim 8, wherein assuming that
   a paraxial curvature radius of an object side surface of the second lens is RL2f, and
   a paraxial curvature radius of an image side surface of the second lens is RL2r,
   Conditional Expression (11) is satisfied, which is represented by $$1 < (RL2f+RL2r)/(RL2f-RL2r) < 4.5 \tag{11}$$

10. The imaging lens according to claim 1, wherein assuming that a refractive index of the first lens at a d line is NdL1, Conditional Expression (12) is satisfied, which is represented by $$1.43 < NdL1 < 1.95 \tag{12}$$

11. The imaging lens according to claim 1, wherein assuming that an open F number of the imaging lens in a state where the infinite distance object is in focus is FNo, Conditional Expression (13) is satisfied, which is represented by $$2.5 < FNo/\sin(\omega m/2) < 6 \tag{13}$$

12. The imaging lens according to claim 1, wherein:
    assuming that a central thickness of each lens included in the rear group is D, Conditional Expression (14) is represented by $$0.155 < D/TL \tag{14}$$

and
    the number of lenses, each of which satisfies Conditional Expression (14) and has a positive refractive power, is equal to or less than 1.

13. The imaging lens according to claim 12, wherein Conditional Expression (3-1) is satisfied, which is represented by $$4.4 < TL/f < 6.7 \tag{3-1}$$

14. The imaging lens according to claim 1, wherein a lens closest to the image side in the rear group is a lens which has a convex surface facing toward the image side.

15. The imaging lens according to claim 1, wherein assuming that an effective diameter of an object side surface of the first lens is ED, Conditional Expression (15) is satisfied, which is represented by $$1.5 < ED/(2 \times f \times \sin(\omega m/2)) < 5 \tag{15}$$

16. The imaging lens according to claim 1, wherein the front group includes a cemented lens.

17. The imaging lens according to claim 1, wherein a lens closest to the image side in the front group is a lens which has a concave surface facing toward the object side.

18. The imaging lens according to claim 1, wherein in the rear group, the number of cemented surfaces to which lenses adjacent to each other are cemented is equal to or less than 2.

19. The imaging lens according to claim 1, wherein the front group or the rear group includes at least one lens which moves along the optical axis during focusing.

20. An imaging apparatus comprising the imaging lens according to claim 1.

* * * * *